(12) United States Patent
Raichelgauz et al.

(10) Patent No.: US 12,718,546 B2
(45) Date of Patent: Aug. 25, 2026

(54) SIGNATURE GENERATION

(71) Applicant: AUTOBRAINS TECHNOLOGIES LTD, Tel Aviv-Jaffa (IL)

(72) Inventors: Igal Raichelgauz, Tel Aviv (IL); Ran Bakalo, Tel Aviv-Jaffa (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 271 days.

(21) Appl. No.: 18/466,788

(22) Filed: Sep. 13, 2023

(65) Prior Publication Data

US 2025/0086957 A1 Mar. 13, 2025

(51) Int. Cl.
*G06V 10/00* (2022.01)
*G06V 10/82* (2022.01)
*G06V 20/56* (2022.01)

(52) U.S. Cl.
CPC .............. *G06V 10/82* (2022.01); *G06V 20/56* (2022.01)

(58) Field of Classification Search
CPC ........ G06V 10/82; G06V 20/56; G06V 10/25; G06V 10/764; G06V 20/58
See application file for complete search history.

(56) References Cited

U.S. PATENT DOCUMENTS

2021/0053573 A1* 2/2021 Raichelgauz ......... B60W 30/08

OTHER PUBLICATIONS

Aletnberger et al, A Non-Technical Survey on Deep Convolutional Neural Network Architectures, arXiv:1803.02129v1 6 Mar. 6, 2018.*
Xu et al, Learning Receptive Fields for Pooling from Tensors of Feature Response, IEEE Conference on Computer Vision and Pattern Recognition, pp. 835-842 (Year: 2014).*
Alrasheedi et al, Padding Module: Learning the Padding in Deep Neural Networks, IEEE Access, vol. 11, Jan. 19, 2023.*

* cited by examiner

*Primary Examiner* — Xiao Liu
(74) *Attorney, Agent, or Firm* — RECHES PATENTS

(57) ABSTRACT

A method that is computer implemented and is for signature generation, the method includes receiving readout information, by a signature generator, the readout information is provided by a readout circuit and was extracted from a deep neural network (DNN) that was fed by a processed sensed information unit (SIU); wherein the processed SIU consists essentially of (i) SIU elements that are located within a region that is related to a bounding shape and has a desired receptive field, and (ii) padding SIU elements; and generating, by the signature generator and based on the readout information, a signature of the processed SIU for use in an at least partially autonomous driving of a vehicle.

20 Claims, 43 Drawing Sheets

Figure 21:
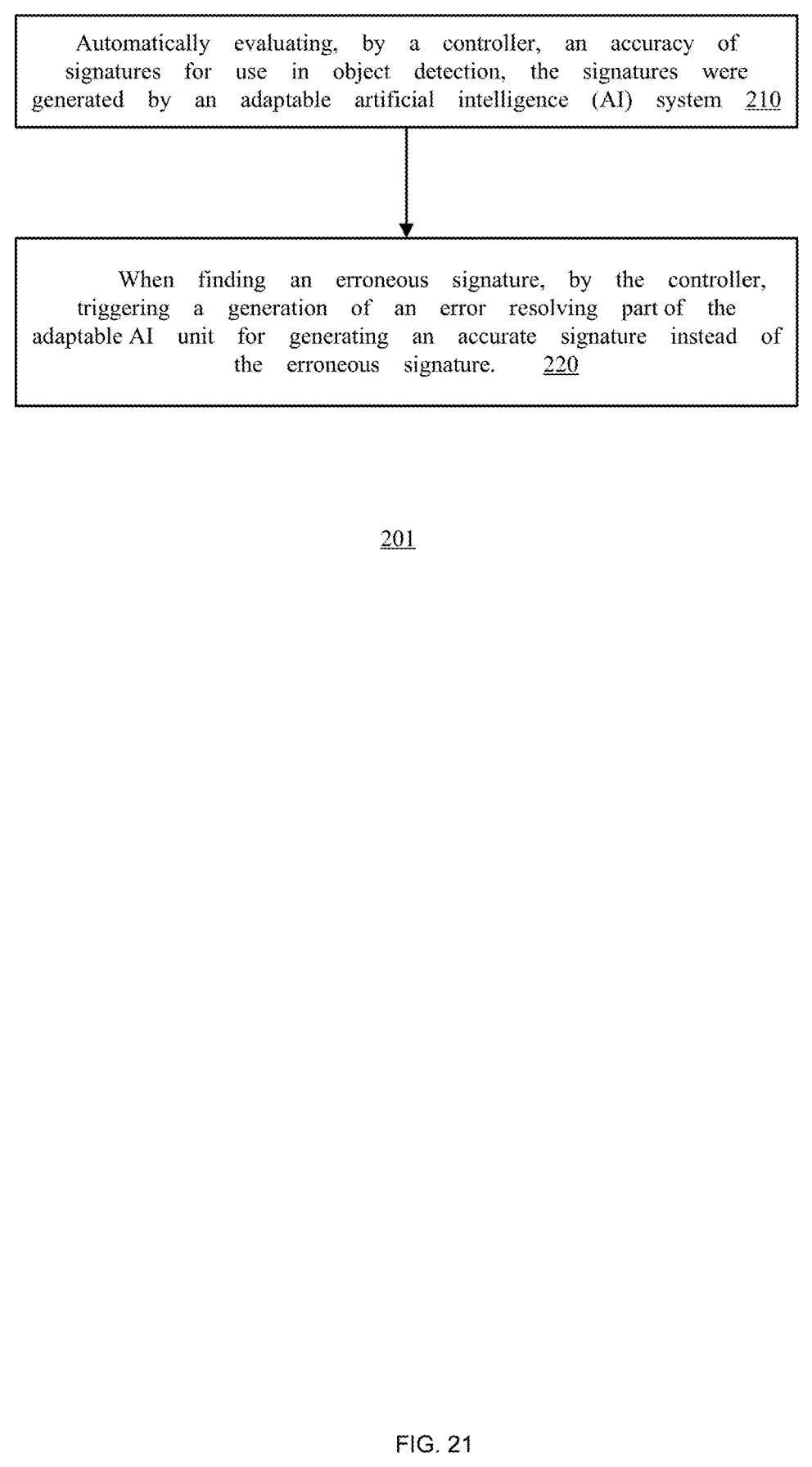

Automatically evaluating, by a controller, an accuracy of signatures for use in object detection, the signatures were generated by an adaptable artificial intelligence (AI) system 210

When finding an erroneous signature, by the controller, triggering a generation of an error resolving part of the adaptable AI unit for generating an accurate signature instead of the erroneous signature. 220

Figure 23:
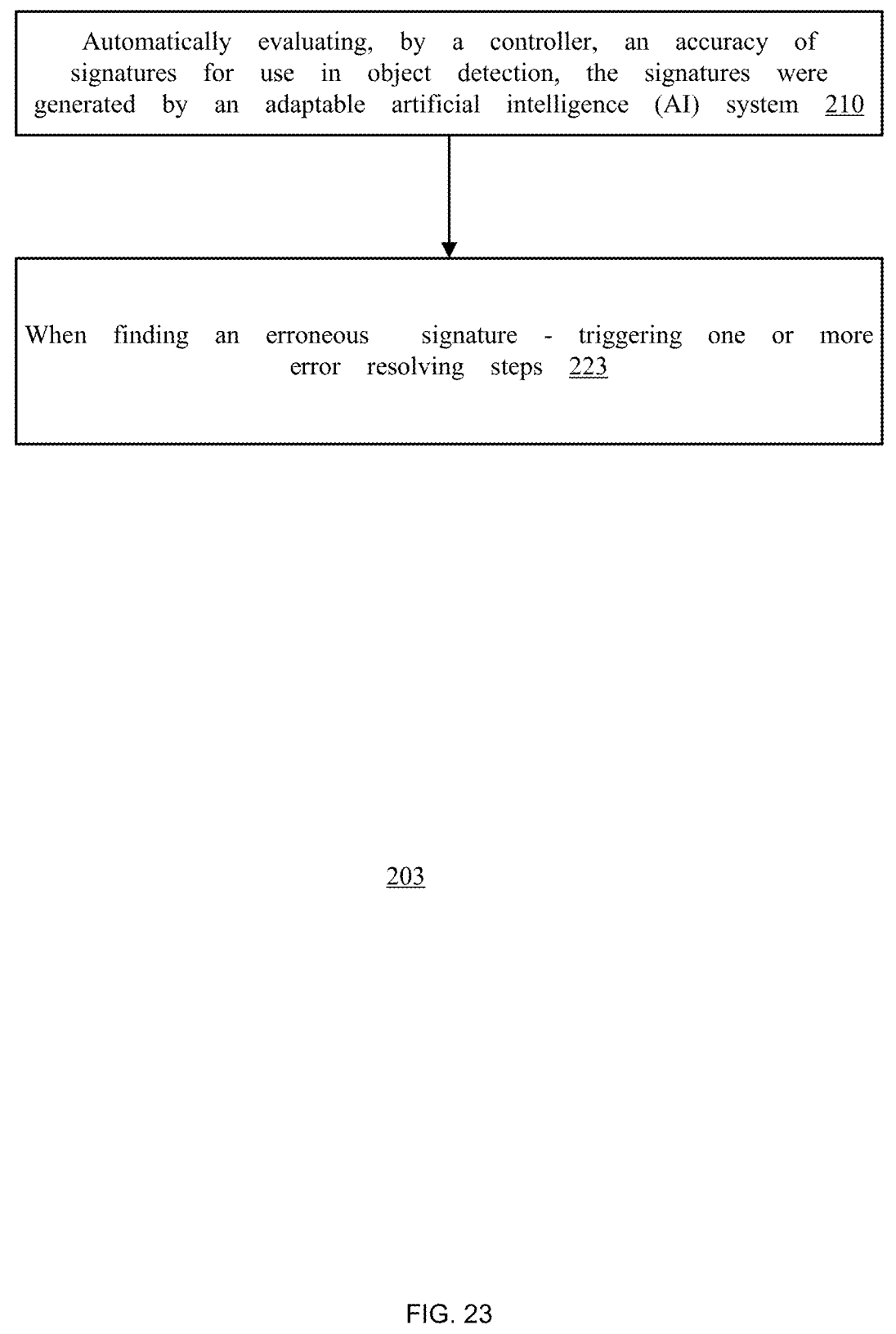

Automatically evaluating, by a controller, an accuracy of signatures for use in object detection, the signatures were generated by an adaptable artificial intelligence (AI) system 210

When finding an erroneous signature - triggering one or more error resolving steps 223

Figure 25:
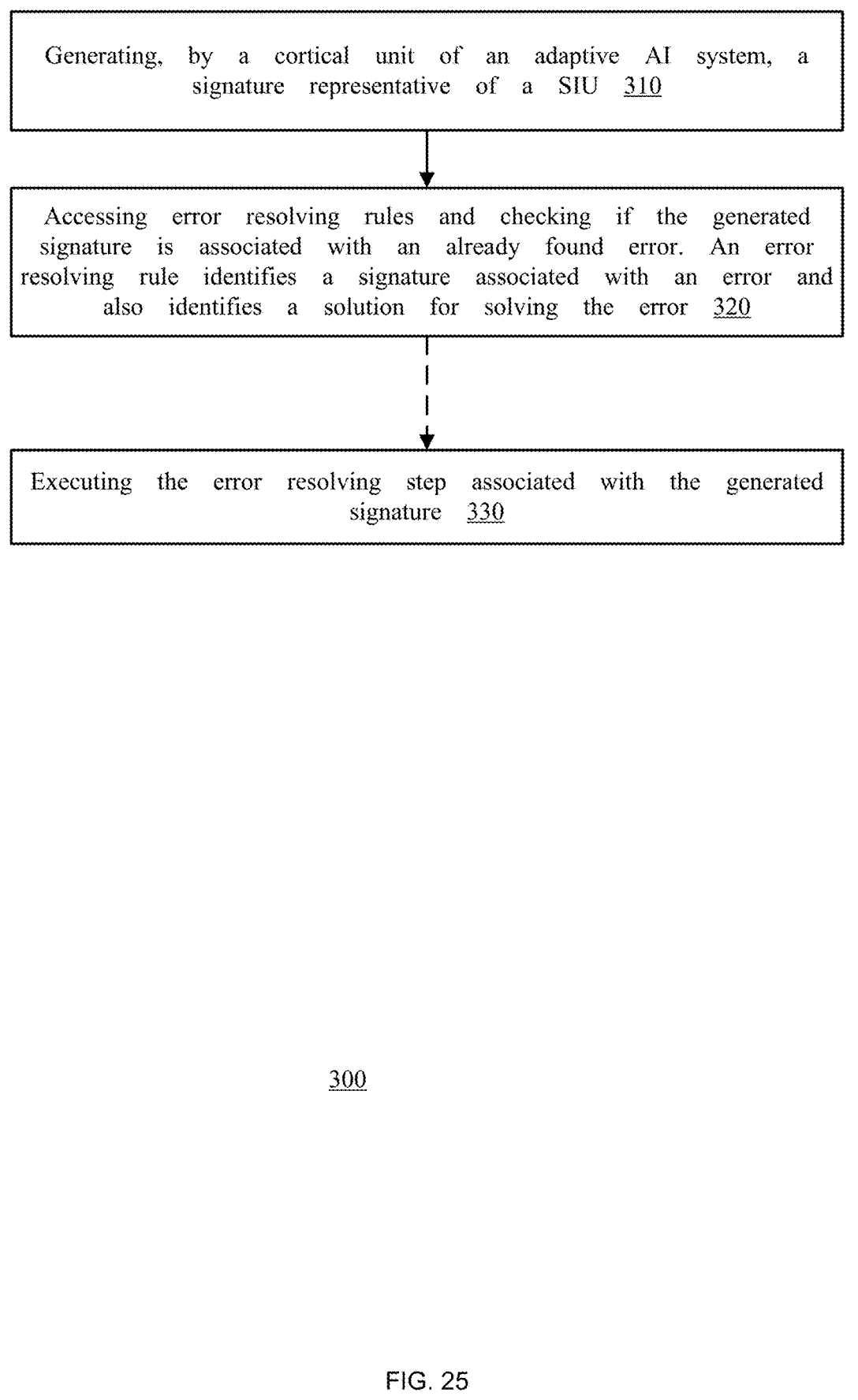

Generating, by a cortical unit of an adaptive AI system, a signature representative of a SIU 310

Accessing error resolving rules and checking if the generated signature is associated with an already found error. An error resolving rule identifies a signature associated with an error and also identifies a solution for solving the error 320

Executing the error resolving step associated with the generated signature 330

Figure 26:
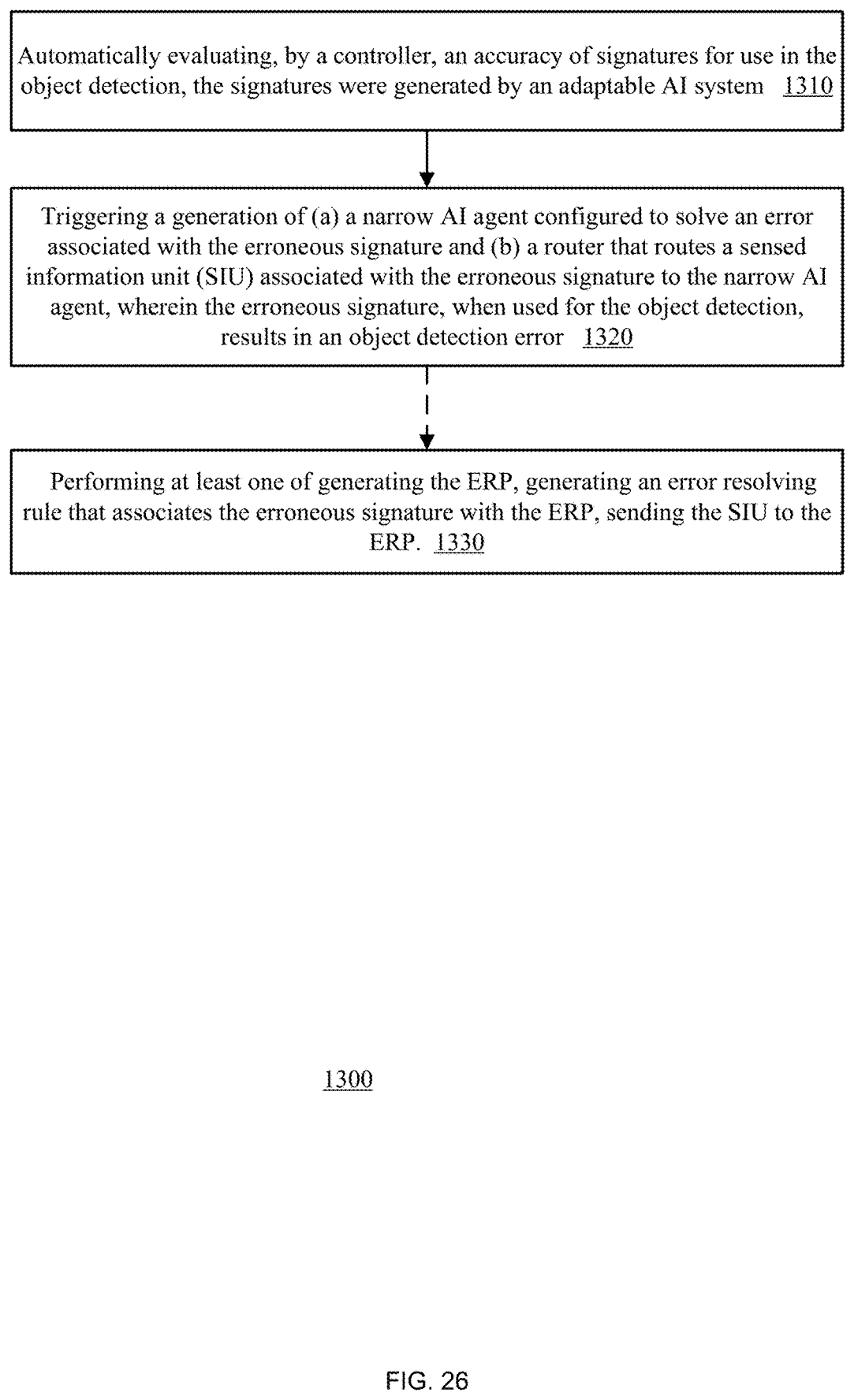

Automatically evaluating, by a controller, an accuracy of signatures for use in the object detection, the signatures were generated by an adaptable AI system 1310

Triggering a generation of (a) a narrow AI agent configured to solve an error associated with the erroneous signature and (b) a router that routes a sensed information unit (SIU) associated with the erroneous signature to the narrow AI agent, wherein the erroneous signature, when used for the object detection, results in an object detection error 1320

Performing at least one of generating the ERP, generating an error resolving rule that associates the erroneous signature with the ERP, sending the SIU to the ERP. 1330

Figure 27:
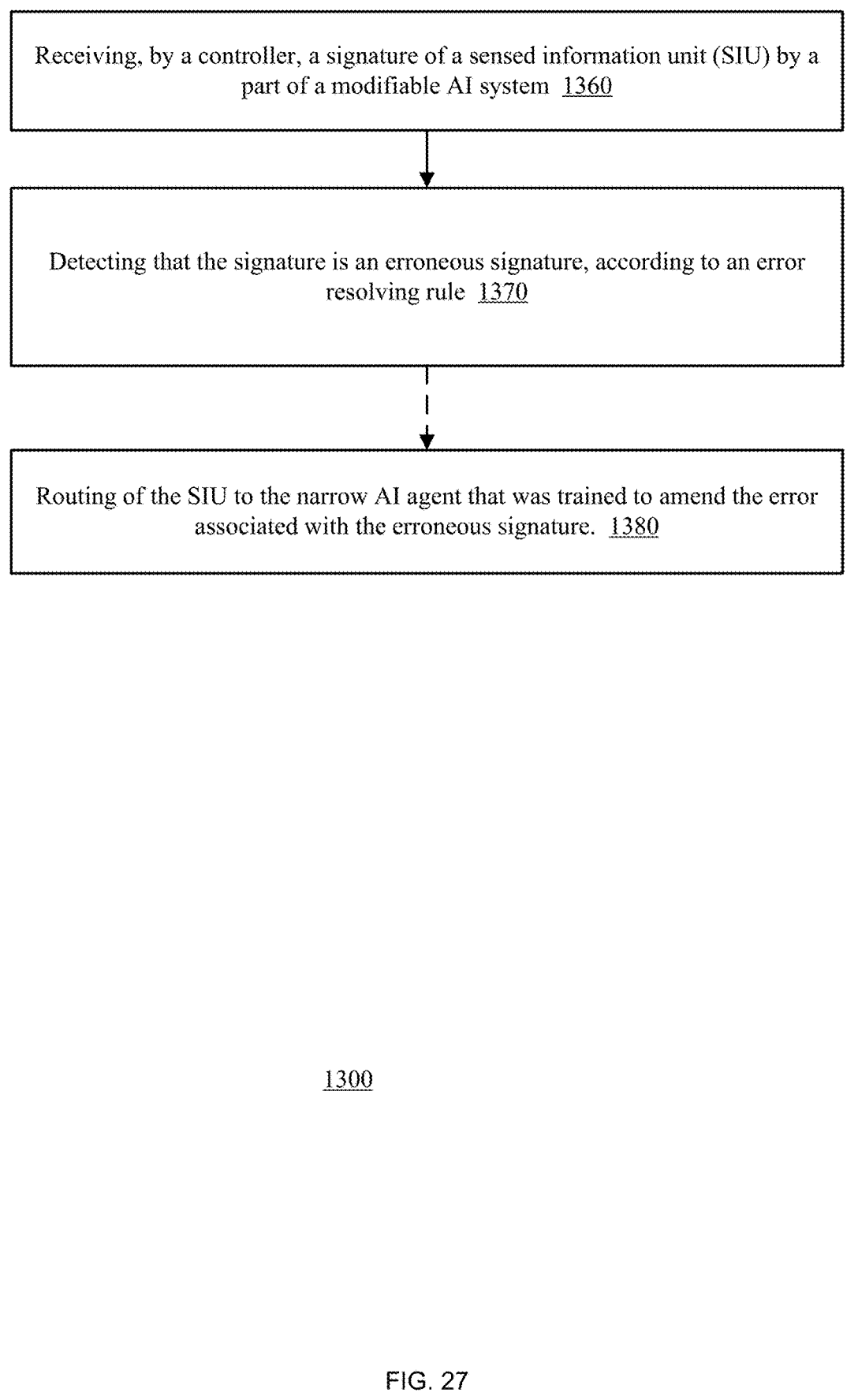

Receiving, by a controller, a signature of a sensed information unit (SIU) by a part of a modifiable AI system 1360

Detecting that the signature is an erroneous signature, according to an error resolving rule 1370

Routing of the SIU to the narrow AI agent that was trained to amend the error associated with the erroneous signature. 1380

Figure 28:
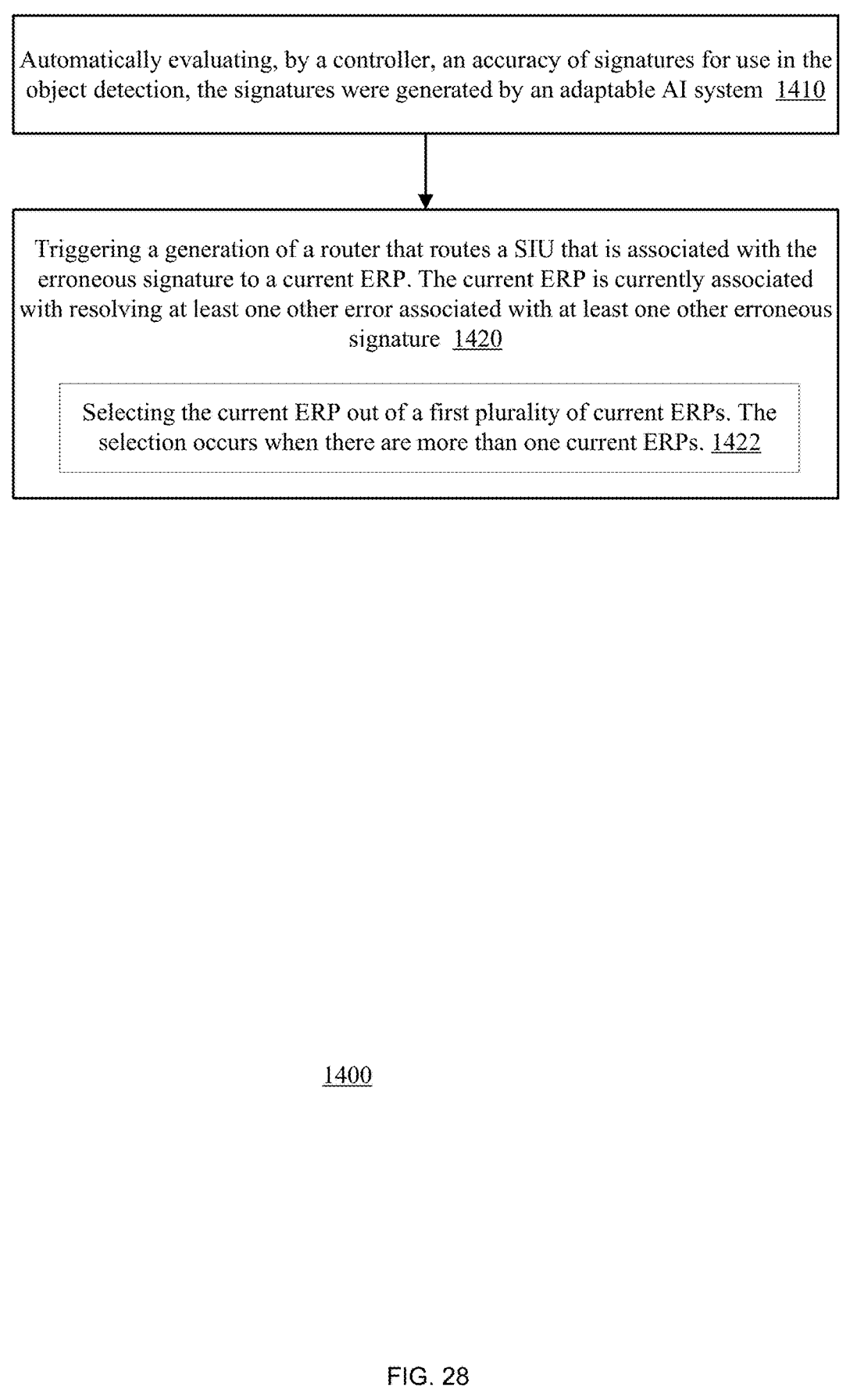

Automatically evaluating, by a controller, an accuracy of signatures for use in the object detection, the signatures were generated by an adaptable AI system 1410

Triggering a generation of a router that routes a SIU that is associated with the erroneous signature to a current ERP. The current ERP is currently associated with resolving at least one other error associated with at least one other erroneous signature 1420

Selecting the current ERP out of a first plurality of current ERPs. The selection occurs when there are more than one current ERPs. 1422

Figure 29:
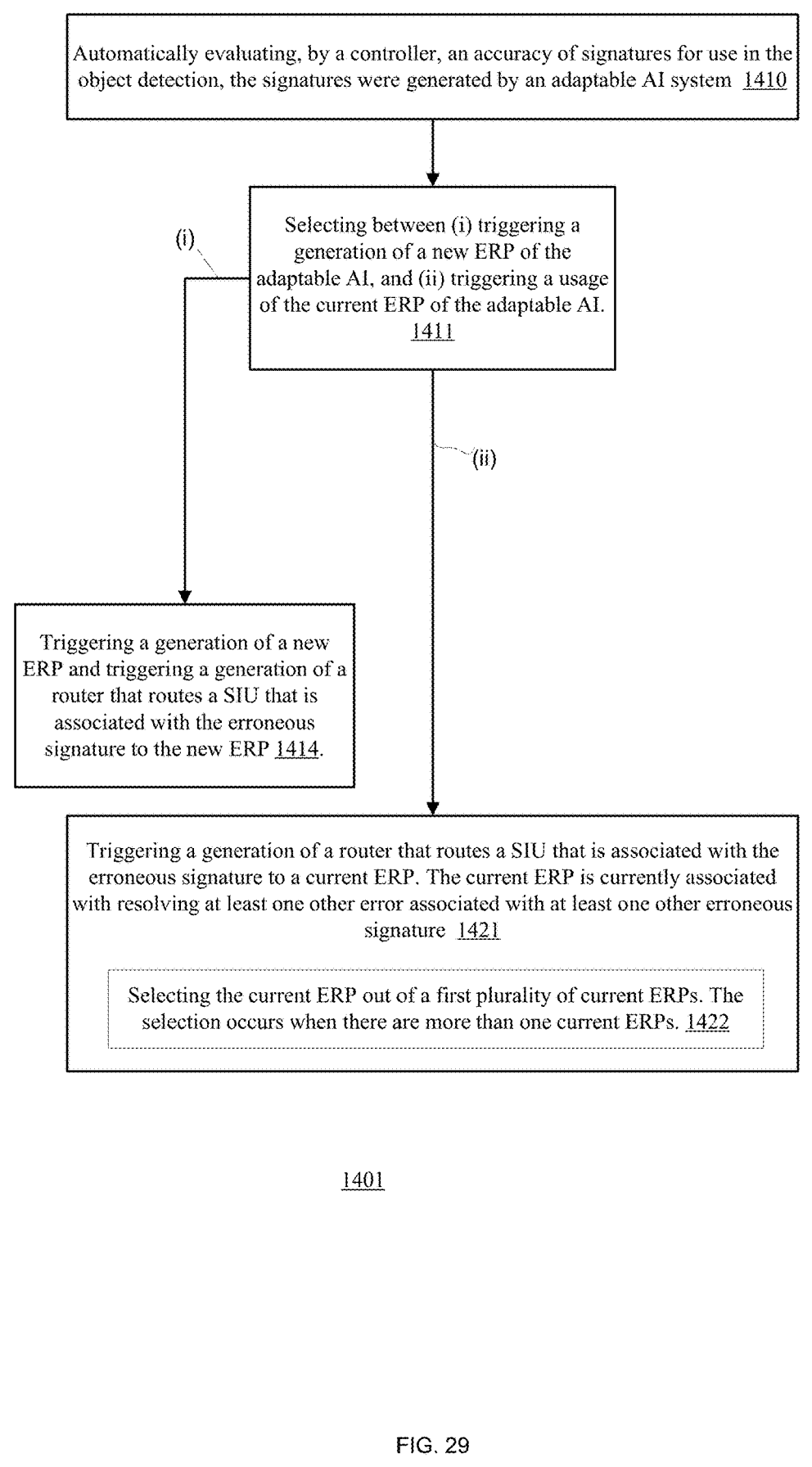

Automatically evaluating, by a controller, an accuracy of signatures for use in the object detection, the signatures were generated by an adaptable AI system 1410

Selecting between (i) triggering a generation of a new ERP of the adaptable AI, and (ii) triggering a usage of the current ERP of the adaptable AI. 1411

(i)

(ii)

Triggering a generation of a new ERP and triggering a generation of a router that routes a SIU that is associated with the erroneous signature to the new ERP 1414.

Triggering a generation of a router that routes a SIU that is associated with the erroneous signature to a current ERP. The current ERP is currently associated with resolving at least one other error associated with at least one other erroneous signature 1421

Selecting the current ERP out of a first plurality of current ERPs. The selection occurs when there are more than one current ERPs. 1422

Figure 33:
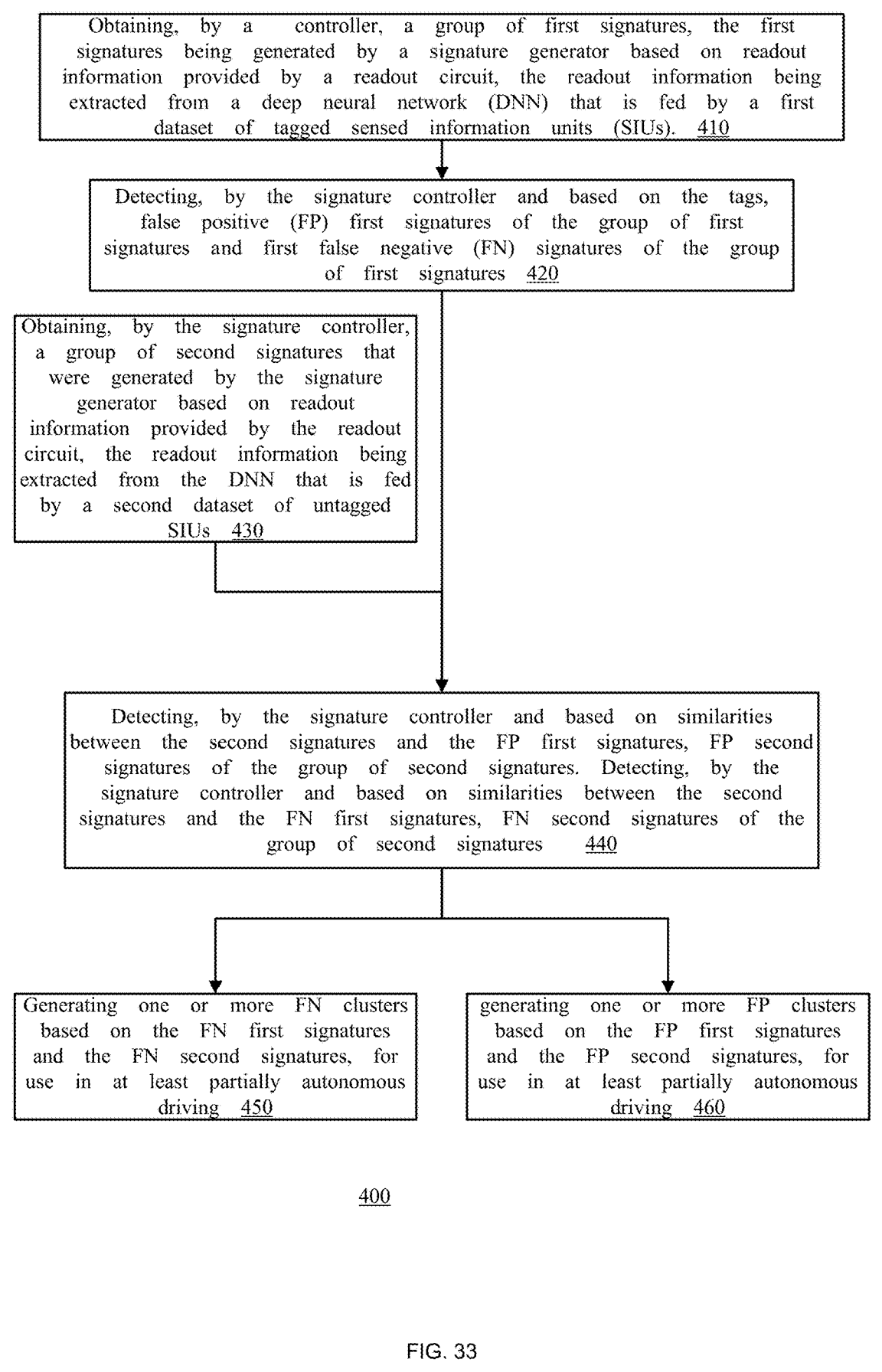

Obtaining, by a controller, a group of first signatures, the first signatures being generated by a signature generator based on readout information provided by a readout circuit, the readout information being extracted from a deep neural network (DNN) that is fed by a first dataset of tagged sensed information units (SIUs). 410

Detecting, by the signature controller and based on the tags, false positive (FP) first signatures of the group of first signatures and first false negative (FN) signatures of the group of first signatures 420

Obtaining, by the signature controller, a group of second signatures that were generated by the signature generator based on readout information provided by the readout circuit, the readout information being extracted from the DNN that is fed by a second dataset of untagged SIUs 430

Detecting, by the signature controller and based on similarities between the second signatures and the FP first signatures, FP second signatures of the group of second signatures. Detecting, by the signature controller and based on similarities between the second signatures and the FN first signatures, FN second signatures of the group of second signatures 440

Generating one or more FN clusters based on the FN first signatures and the FN second signatures, for use in at least partially autonomous driving 450 generating one or more FP clusters based on the FP first signatures and the FP second signatures, for use in at least partially autonomous driving 460

Figure 35:
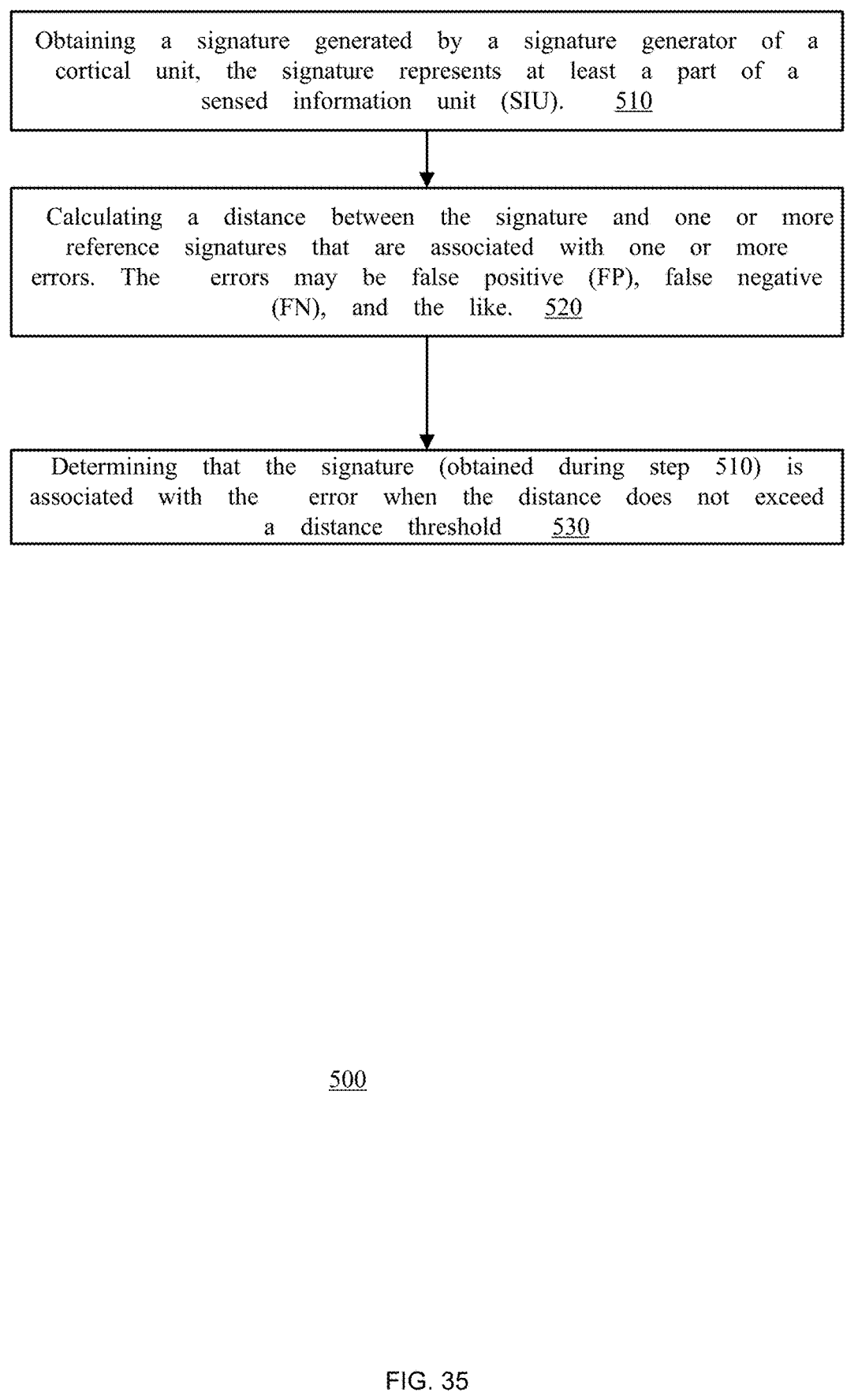

Obtaining a signature generated by a signature generator of a cortical unit, the signature represents at least a part of a sensed information unit (SIU). 510

Calculating a distance between the signature and one or more reference signatures that are associated with one or more errors. The errors may be false positive (FP), false negative (FN), and the like. 520

Determining that the signature (obtained during step 510) is associated with the error when the distance does not exceed a distance threshold 530

Figure 36:
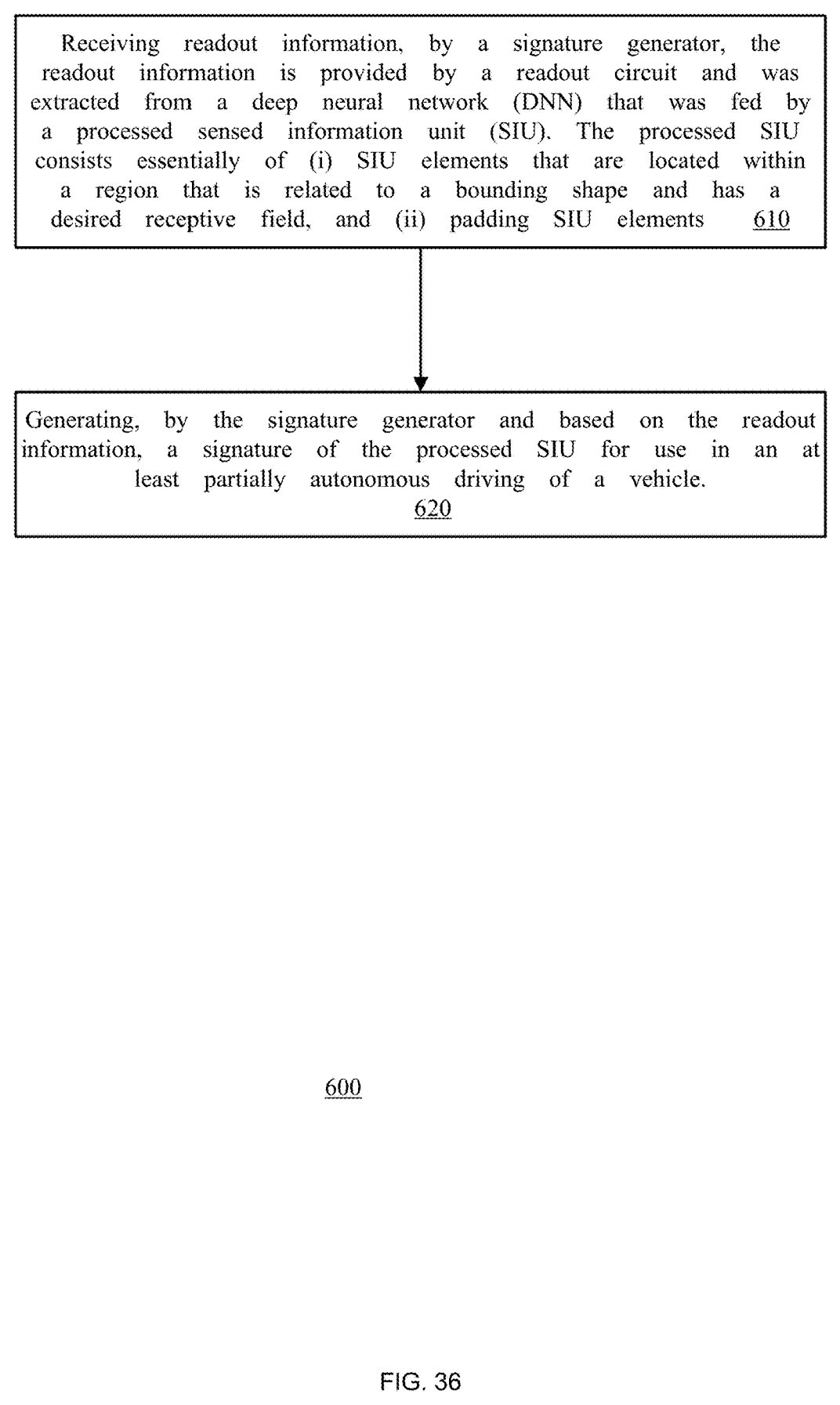

Receiving readout information, by a signature generator, the readout information is provided by a readout circuit and was extracted from a deep neural network (DNN) that was fed by a processed sensed information unit (SIU). The processed SIU consists essentially of (i) SIU elements that are located within a region that is related to a bounding shape and has a desired receptive field, and (ii) padding SIU elements 610

Generating, by the signature generator and based on the readout information, a signature of the processed SIU for use in an at least partially autonomous driving of a vehicle. 620

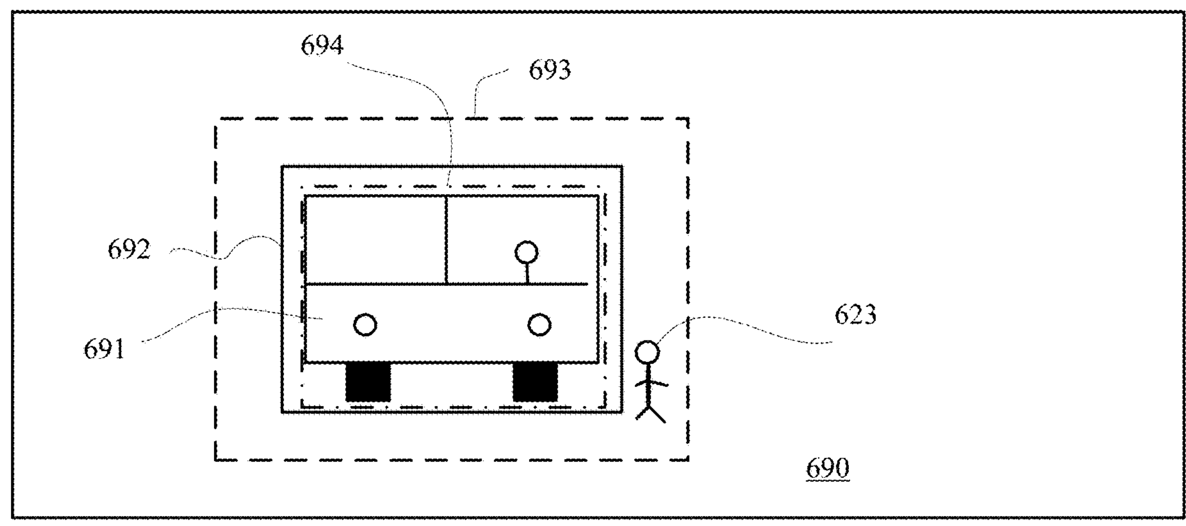
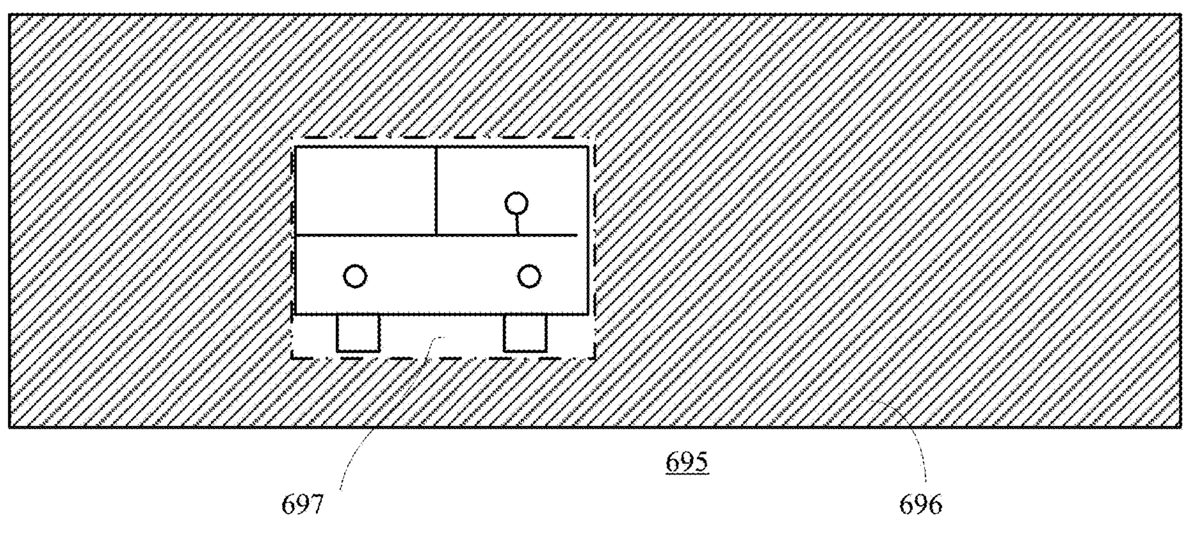
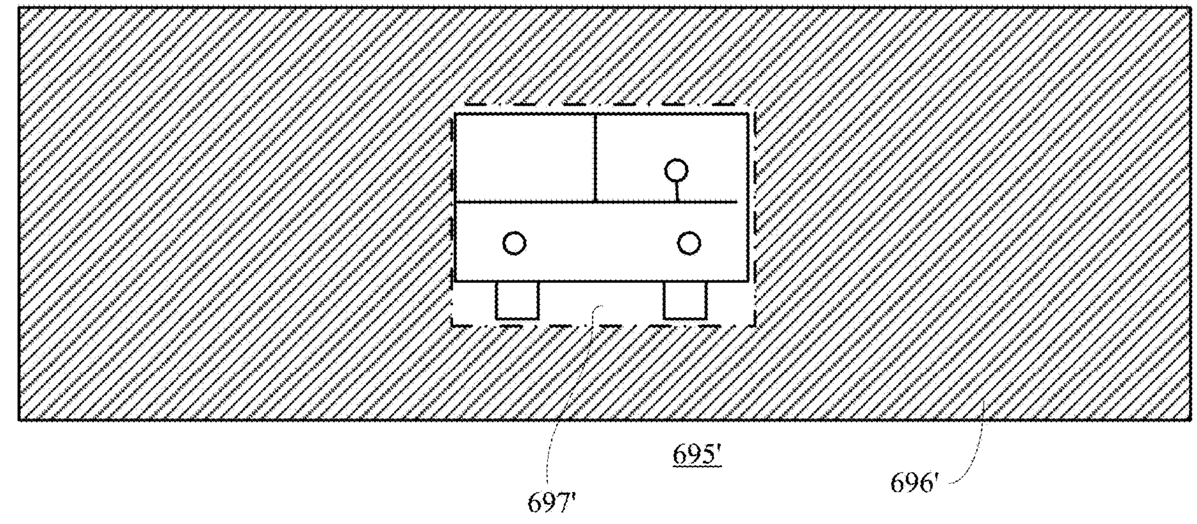
FIG. 37

SIGNATURE GENERATION

BACKGROUND

A perception system is a key building block of all modern ADAS and AV solutions. The system is responsible for detection, tracking and measurement of driving related entities, such as road users, lanes, traffic signs and traffic lights. The output of the perception system is a 3D environmental model, which is used as a basis for every decision making and path planning of the automated vehicle. All the modern perception systems are based on state-of-the-art deep-learning technology. In the last five years, this technology allowed to make a dramatic leap from classical feature-based computer vision approaches, and enabled sufficient accuracy (>0.95) for level-2 ADAS use case. However, in order to scale beyond the level-2 and enable broader ODD for the automated driving, the accuracy of the perception must significantly improve and be above the 0.999. The two methods used by the OEMs and AV players to improve the accuracy of the perception today are:

i. Retraining with much more labeled data or with additional set of problematic cases—the problem with this approach is that after a certain amount of training, the given network reaches a saturation and while solving some false-positives/false-negatives, exposes the system to new false-positives/false negatives.

ii. Using deeper and heavier neural networks for creating a better model—the problem with this approach is that in order to reduce the error-rate by a factor of 2-4, the increase in the required computational power (to run heavier neural net) is over ×10. This problem is called "the diminishing returns of deep learning" and does not allow to scale the perception system to the required accuracy with feasible computational resources, which can run in the car.

SUMMARY

Methods, computer readable media, and systems as illustrated in the application.

BRIEF DESCRIPTION OF THE DRAWINGS

The embodiments of the disclosure will be understood and appreciated more fully from the following detailed description, taken in conjunction with the drawings in which:

FIGS. 21-30 illustrate examples of methods;

FIG. 33 illustrates an example of a method;

FIG. 34 illustrates an example of a data structure and a part of an adaptable AI system;

FIGS. 35-36 illustrate examples of methods;

FIG. 37 illustrates examples of images;

FIGS. 39-43 illustrate examples of methods.

DESCRIPTION OF EXAMPLE EMBODIMENTS

Figure 1:
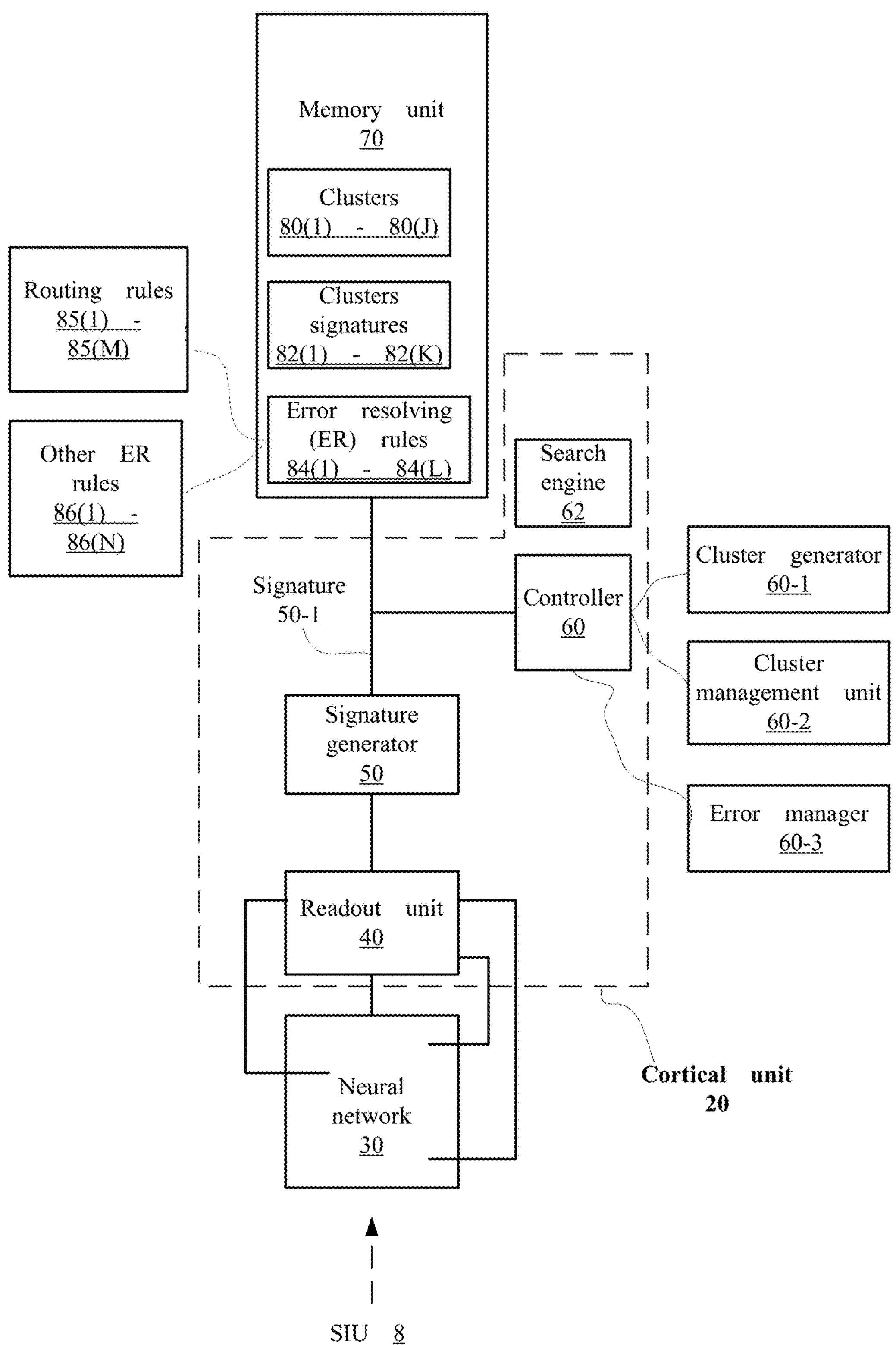
FIGS. 1-12 illustrate examples of one or more parts of one or more adjustable AI system.

It has been found that the inherent root cause, which prevents the scaling of the perception to support the long tail of the edge cases and reach 0.999 accuracy is the learning algorithm behind the deep learning approach.

Gradient descent is generally attributed to Augustin-Louis Cauchy, who first suggested it in 1847. In the context of deep learning, the same, almost two centuries old algorithm is exploring in iterative and greedy way, the parameters space of the neural network, in order to find a set of parameters (weights), which locally minimize the average error rate of the network in a given classification task on a given labeled training set.

By design, such an approach cannot address the long tail of rare cases, since they have minor individual contribution to the overall average error rate.

There is provided an adaptable artificial Intelligence (AI) system.

The adaptable AI system may include or may be in communication with any given 3rd party pre-trained neural network (coined Solid AI). This neural network may remain frozen, without any additional training or modifications. Alternatively, the adaptable AI system includes one or more NNs. The NN may be adapted.

According to an embodiment, the adaptable AI system is adaptable in the sense that is adapts itself to errors that are found over time. Accordingly—when a new error is found the adaptable AI system is configured to solve these errors.

According to an embodiment, the adaptable AI system is implemented by one or more processing circuits and one or more memory units.

A sensed information unit may pre-processed before reaching the adaptable AI system or be processed before reaching the adaptable AI system. Any pre-processing may be providing—filtering, noise reduction, and the like.

There is provided an adaptable AI system (also referred to as a liquid AI system).

According to an embodiment, an example of a building block of the adaptable AI system is the cortical unit.

According to an embodiment, a building block of the adaptable AI system is an error resolving part (also referred to as ERP or error resolving unit) of the adaptable AI system. Examples of an ERP include a cortical unit, a narrow AI agent, an AI agent that is not narrow, a unit configured to adapt a parameter outside the adaptable AI system—for example a unit configured to adapt an image acquisition parameter, and the like. According to an embodiment, the ERP is configured to generate signatures. According to an embodiment, the adaptable AI system includes one or more routers that route an SIU to the ERP. The one or more routers may be regarded as a ERP or may be regarded as being associated with an ERP.

According to an embodiment, an ERP cures an error associated with an erroneous signature by replacing the erroneous signatures by an accurate signature.

According to an embodiment, an ERP cures an error associated with an erroneous signature by changing at least one parameter of an acquisition of an SIU to provide a new SIU that once processed provides one or more accurate signatures.

According to an embodiment, the adaptable AI system perform object detection.

According to an embodiment, the adaptable AI system is configured to respond to an outcome of the object detection.

According to an embodiment, the response may include impacting the driving of the vehicle. Examples of a response that impacts the driving of the vehicle may include triggering an autonomous driving operation of a vehicle, performing an autonomous driving operation of a vehicle, determining the autonomous driving operation, requesting from a vehicle entity (such as a vehicle computer or a vehicle controller) to perform the autonomous driving operation, instructing the vehicle entity to perform the autonomous driving operation, triggering an ADAS driving operation of a vehicle, performing an ADAS driving operation of a vehicle, determining the ADAS driving operation, requesting from a vehicle entity (such as a vehicle computer or a vehicle controller) to perform the ADAS driving operation, instructing the vehicle entity to perform the ADAS driving operation, and the like. An autonomous driving operation may include stopping the vehicle, accelerating the vehicle decelerating the vehicle, propagating the vehicle, and the like.

According to an embodiment, the response include changing an aspect of the adaptable AI system (for example adding a new error resolving part, changing a signature, evaluating an accuracy of a signature, and the like).

According to an embodiment, the object detection involves generating signatures that represent at least parts of sensed information units, and performing signature based operations to complete the object detection. The signature based operations may include searching for matching reference signatures and/or reference signature clusters.

According to an embodiment, the ERPs are configured to generate signatures.

According to an embodiment, an ERP is configured to execute one or more signature based operation or may be configured not to execute any signature based operation.

According to an embodiment, there may be provided units other than the ERPs that are configured to execute one or more signature based operations. See for example, controller 60 of FIG. 1 and/or search engine 62.

According to an embodiment, the adaptable AI system includes any number of routers. According to an embodiment the adaptable AI system includes any number of ERPs. According to an embodiment an ERP is configured to solve an error related to a single erroneous signature. Alternatively, an ERP is configured to solve errors related to two or more erroneous signatures.

According to an embodiment, the adaptable AI system includes ERPs of one or more types.

According to an embodiment, the cortical unit includes a readout unit, a signature generator, a search engine and a controller. The cortical unit may include a neural network or may be in communication with the neural network. The neural network may be a deep neural network (DNN) or a neural network (NN) than is not a DNN. The DNN may be trained in any manner—for example auto-trained or any other training.

According to an embodiment, the cortical unit is in communication with a memory unit that stores clusters, cluster signatures and error resolving rules that may include one or more routing rules and/or error resolving rules that differ from routing rules.

According to an embodiment, an error resolving rule identifies a signature associated with an error and also identifies an error resolving step for solving the error.

The adaptable AI system is configured to adapt itself to provide one or more error resolving steps—for resolving rare errors.

The adaptation may include at least one adaptive steps:

i. Adding an error resolving unit that has signature generating capabilities—that is trained or otherwise adapted to solve the new error. Once the error resolving unit is added and configured to solve the new error—a corresponding error revolving rule maps the signature associated with the new error to the new unit. Thus—when an input to a cortical unit causes the cortical unit to generate the signature that is associated with the new error—the content is sent to the error resolving unit—in order to solve the new error. The error resolving unit may be a new cortical unit or may differ from the new cortical unit.

ii. Changing one or more signatures used for object detection. The change may be applied during training or adjusting of the adaptable AI system. Once the adapted signature is provided—it is used during inference.

iii. Adapting another unit that is part of a path of receiving radiation (heat, light, or any other sensed radiation), converting the radiation to detection signals and generating a SIU. The other unit may be a sensing unit.

iv. Using a current error resolving unit. The current error resolving unit may have signature generating capabilities—to solve the new error. The current error resolving unit is already assigned (and is capable of) solving one or more errors associated with one or more other erroneous signatures.

A given adaptable AI system may be configured to perform only adaptive step (i), only adaptive step (ii), only adaptive step (iii), only adaptive step (iv).

A given adaptable AI system may be configured to perform only two adaptive steps of adaptive steps (i)-(iv).

A given adaptable AI system may be configured to perform only three adaptive steps of adaptive steps (i)-(iv).

A given adaptable AI system may be configured to perform all of adaptive steps (i)-(iv). According to an embodiment, the cortical unit itself may be adaptive as the readout circuit and/or the signature generator may be reconfigured and/or changed over time. For example—the readout circuit may change the content it obtains from the neural network and/or may change a manner in which the content is processed to provide readout information that is fed to the signal generator. The signal generator may be adapted by changing one or more signature generating parameters.

Adding different error resolving units enables to tailor different parts of the adaptable AI system to different statistics and/or to different classification tasks and/or different labels training sets. According to an example—the adaptable AI system may include any number of units—for example at least 100, 1000, 10000, 100000, 1000000 and more. The adaptable AI system may include one or more one or more cortical units that are configured to manage specific errors—and can be regarded as narrow AI agents.

For example—a error resolving unit allocated to a certain error may be configured to locally minimize the error rate of the error resolving unit in a classification task related to the error.

Many units of the adaptable AI system may be used only when needed (when requiring to solve specific errors associated within them)—which greatly reduced the power consumption and may also greatly reduces memory and/or computational resources required to sustain the adaptable AI system. The usage of dedicated units may include at least one of activating the unit, retrieving information (for example neural network coefficients, signature generation parameters)—and thus the selective usage allows to better manage memory usage, reduce communication and reduce processing resources consumption.

Using one or more cortical units that manage most of the cases and many more units that manage specific errors—provides a very compact and highly accurate solution.

The adaptable AI system enables the accuracy of the perception above virtually any desired threshold—for example the 0.999 threshold. The adaptability of the adaptable AI system facilitates to learn new errors and correct them—thereby gradually increasing the reliability of the adaptable AI system over time.

FIG. 1 illustrates an example of a cortical unit 20, neural network 30 and memory unit 70.

The cortical unit 20 includes a readout unit 40, a signature generator 40, a controller 60 and a search engine 62. The memory unit 70 stores clusters 80(1)-80(J), cluster signatured 82(1)-82(K) and error resolving (ER) rules 84(1)-84 (L).

NN 30 may be fed by an SIU (or a processed SIU) and generate an output—as well as features that are outputted by hidden layers of the NN 30.

The readout unit 40 is configured to extract information (such as one or more features of one or more feature maps or one or more layers of NN 30) from NN 30 and provide readout information to signature generator 50.

The signature generator 50 is configured to generate, based on the readout information, a signature that represents the SIU (or processed SIU).

The signature may be sparse, may be binary or non-binary and may be an embedding.

Examples of a signature and signature generators are illustrated in U.S. patent application Ser. No. 17/309,064 publication serial number 2022/0041184 which is incorporated herein by reference.

The signature may be embeddings. Any known manner for generating embeddings may be used.

The signature generator may be a multiple layer (for example two or more layers) neural network that receives as input readout information such as raw features of neural network 30, and outputs a sparse binary representation, usually in the order of thousands in dimension.

The neural network of the signature generator may be maximized to generate a representation with high fidelity with the original representation, sparsity, and some elements of contrastive loss to separate the true-positives from the false ones.

The readout unit 40 and the signature generator, alone or in combination, may be trained in any manner—for example in a supervised and/or unsupervised manner.

According to an embodiment the search engine 62 is configured to search for one or more matching clusters (rather search one or more cluster signature representative of one or more clusters) that match the signature 50-1 generated by the signature generator—during object detection.

According to an embodiment, the searching involves accessing the cluster signatures 82(1)-82(K) stored in the memory unit 70. Any matching process may be applied.

According to an embodiment, the matching process is adaptable and one or more matching parameters can be changed over time.

Finding one or more matching clusters may provide information about the SIU—especially about one or more objects captured in the SIU. The finding of the matching clusters may:

Provide an object detection outcome.

Trigger a further processing of the SIU.

Trigger a determination of an autonomous or a partially autonomous driving related operation.

Trigger an execution of an autonomous or a partially autonomous driving related operation. An autonomous or a partially autonomous driving related operation may include changing at least one of speed, acceleration, direction of movement of the vehicle, perform an emergency breaking, and the like.

The memory unit 70 also stores error resolving (ER) rules 84(1)-84(L).

According to an embodiment, the ER rules 84(1)-84(K) include routing rules 85(1)-85(M))—for routing SIU associated with erroneous signatures to error resolving units configured to resolve the error.

The search engine 62 or the controller 60 may match the signature 50-1 to the ER rules to determine how to resolve an error associated with the signature 50-1.

According to an embodiment, the ER rules 84(1)-84(K) include other ER rules 86(1)-86(N) that differ from the routing rules 85(1)-85(M))—for adapting another unit that is part of a path of receiving radiation (heat, light, or any other sensed radiation), converting the radiation to detection signals and generating a SIU.

According to an embodiment, the controller 60 includes at least one of:

Cluster generator 60-1 that is configured to generate clusters 80(1)-80(J) and cluster signatures 82(1)-82(K).

Cluster management unit 60-2 that is configured to perform management operations such as reducing the number of signatures per cluster, reducing the size of a cluster signature, trigger a generation of one or more signatures, trigger a cancelling of one or more signatures.

Error manager 60-3 that is configured to detect an one or more error associated with one or more cluster signature (and/or one or more signature included in the cluster), and participate in solving the error—for example—control the execution of one or more of adaptive step (i), adaptive step (ii) and/or adaptive step (iii).

According to an embodiment controller is configured to perform one or more signature based operation and/or to perform (or at least participate in a response to a result of the object detection).

It should be noted that the multiple functionalities of the controller (see for example cluster generation, cluster management, error management, performing one or more signature based operation and/or to performing (or at least participating in a response to a result of the object detection) can be executed by multiple units. At least some (or none) of the multiple units may belong to the adaptable AI system.

Figure 2:
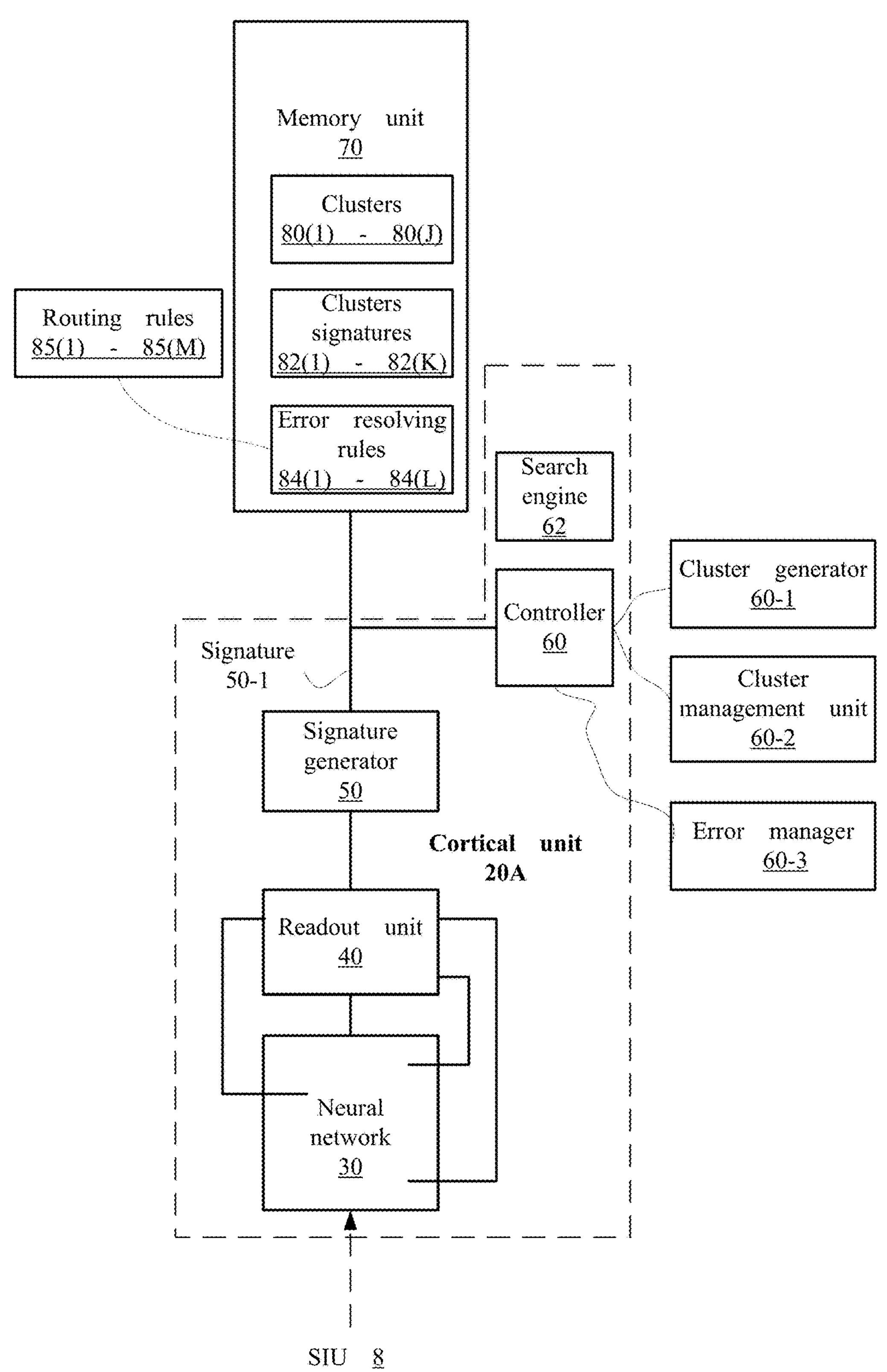

FIG. 2 illustrates an example of a cortical unit 20A that includes NN 30, and memory unit 70.

Figure 3:
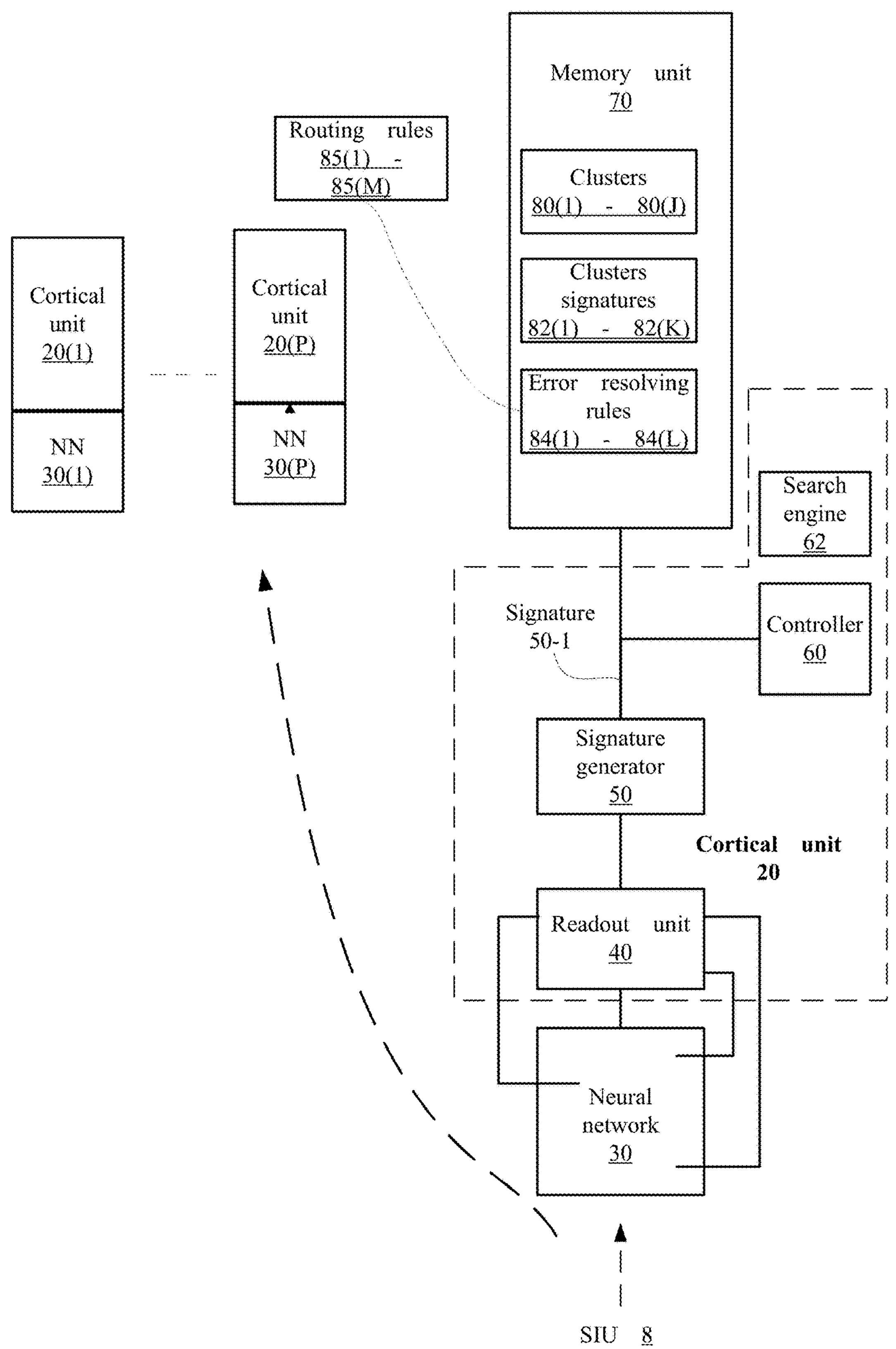

FIG. 3 illustrates an example of NN 30, cortical unit 20, memory unit 70 and an implementation of adaptive step (i) in which an SIU associated with an erroneous signature is sent to an error resolving unit out of multiple error resolving units. FIG. 3 illustrates multiple error resolving units that include a first plurality of cortical units and NNs (denoted cortical units 20(1)-20(P) and NNs 30(1)-30(P)). Any other error resolving units may be provided.

Figure 4:
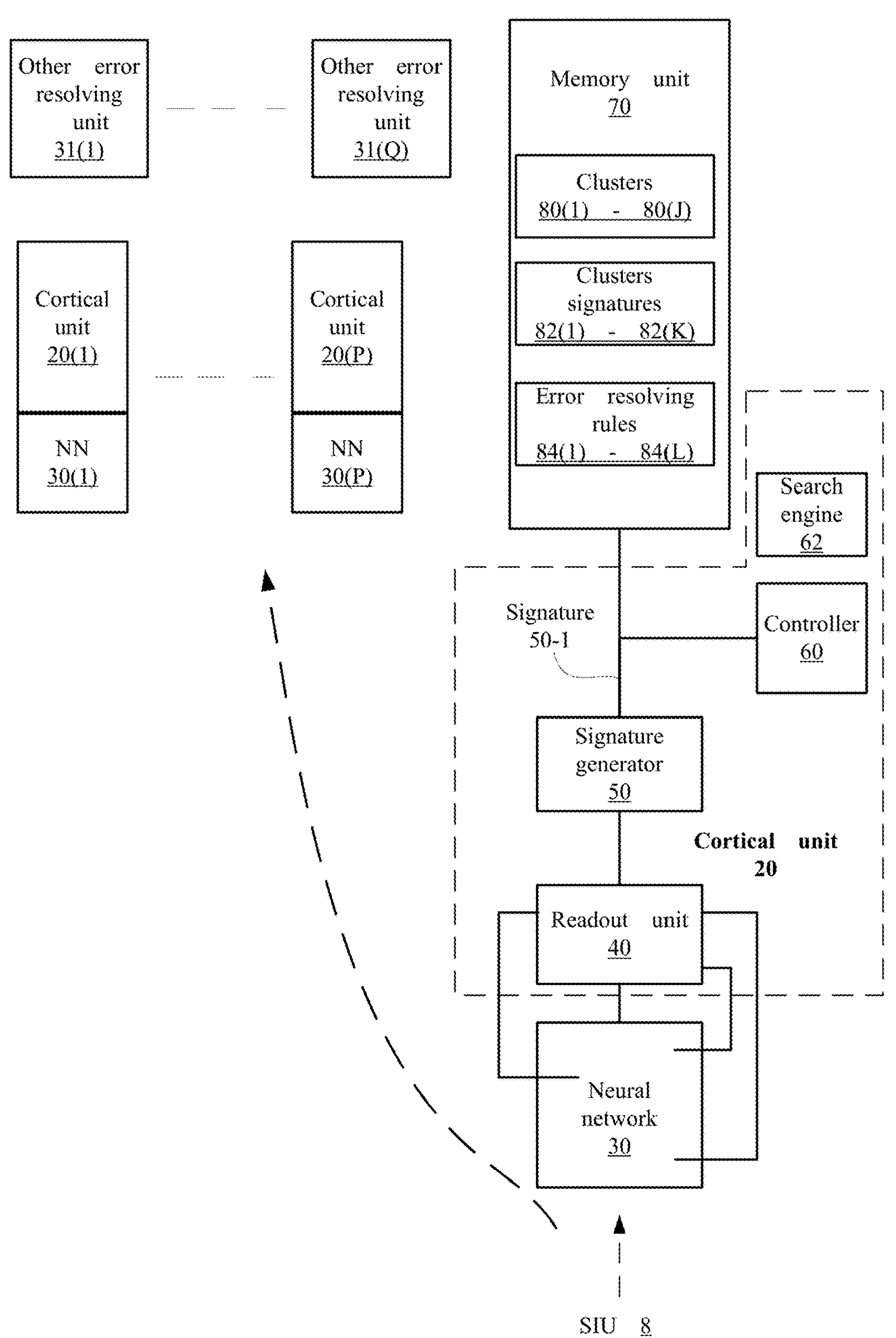

FIG. 4 illustrates an example of NN 30, cortical unit 20, memory unit 70 and an implementation of adaptive step (i) in which an SIU associated with an erroneous signature is sent to an error resolving unit out of multiple error resolving units. FIG. 4 illustrates multiple error resolving units that include a first plurality of cortical units and NNs (denoted cortical units 20(1)-20(P) and NNs 30(1)-30(P)) and a second plurality of error resolving units other than cortical units 31(1)-31(Q).

Figure 5:
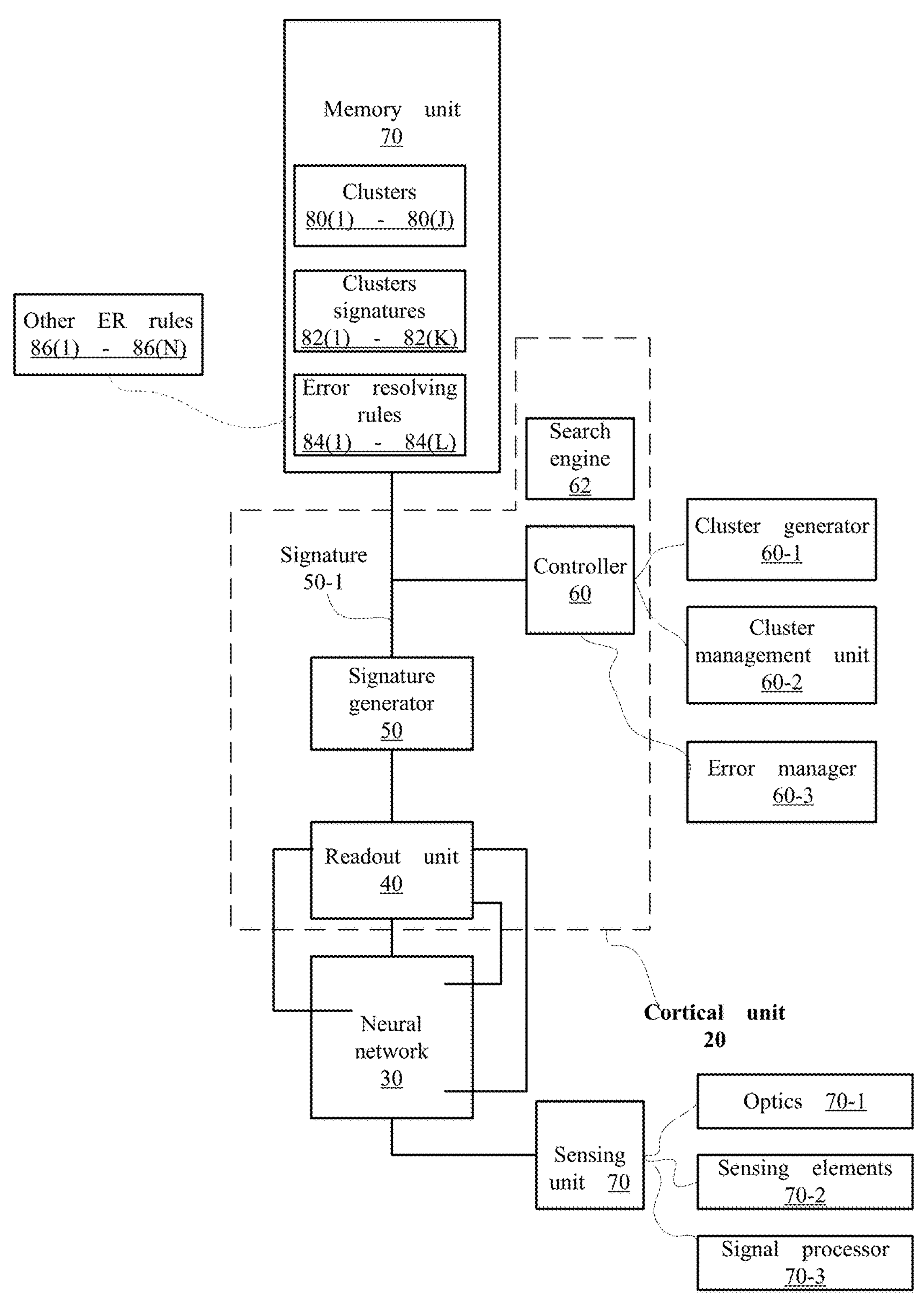

FIG. 5 illustrates an example of NN 30, cortical unit 20, memory unit 70 and an implementation of adaptive step (iii) in which one or more sensing parameters of a sensing unit 70 are adapted. The sensing unit 70 is illustrated as including optics 70-1, sensing elements 70-2, and signal processor 70-3. Any parameter of the sensing unit may be adapted during adapted step (iii). For example—focus of the sensor, focal length, depth of field of the sensor, an exposure period of the sensor, dynamic range, sensitivity, filtering process, readout process, noise reduction algorithm, one or more sensing elements to take into account, and the like.

Figure 6:
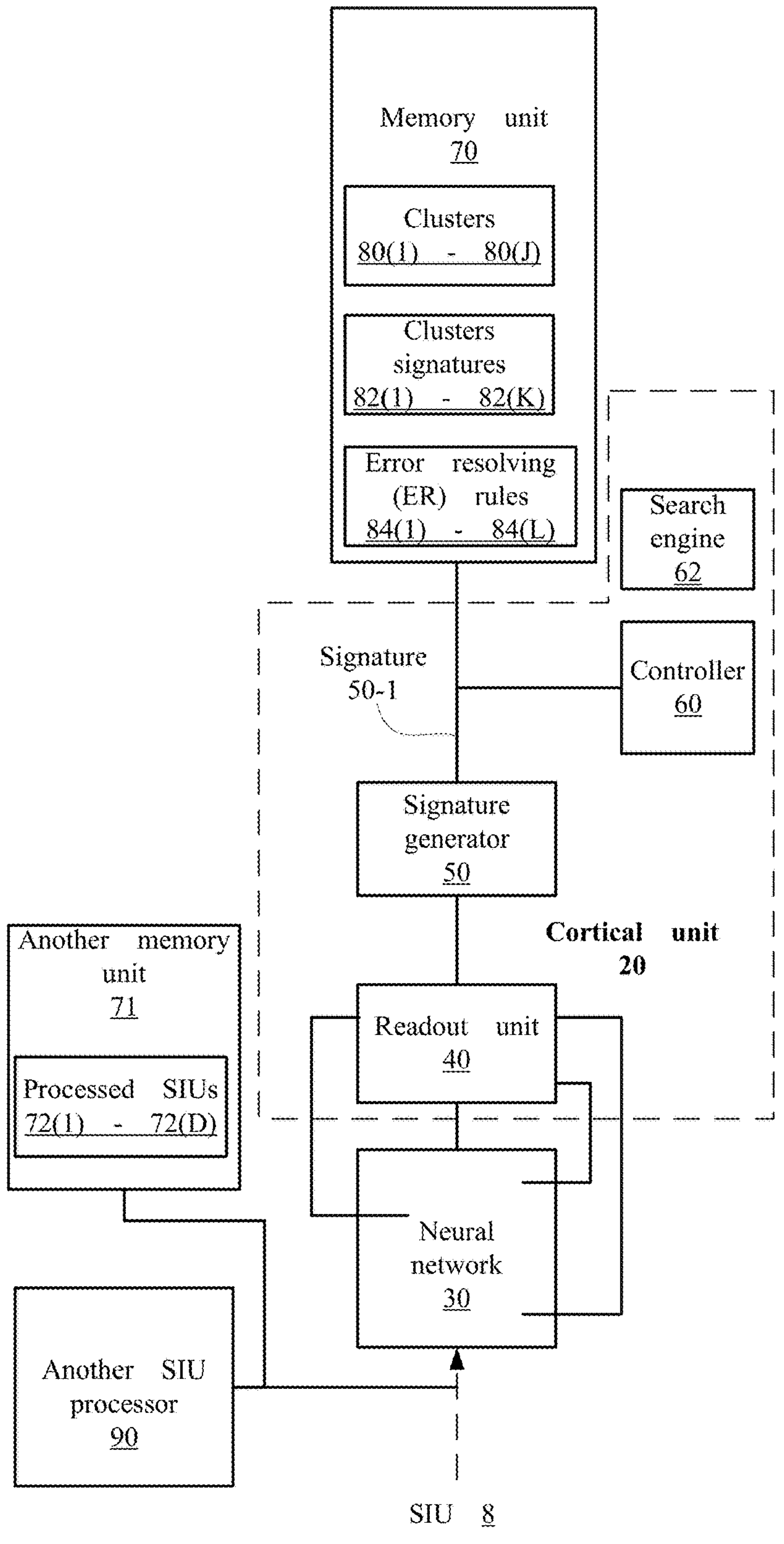

FIG. 6 illustrates an example of NN 30, cortical unit 20, another SIU processor 90 and another memory unit 71 for storing processed SIUs 72(1)-72(D). The other SIU processor may perform any processing operation and the processed SIUs may be fed to NN 30. As mentioned above—any reference to an SIU should be applied mutatis mutandis to a processed SIU.

Figure 7:
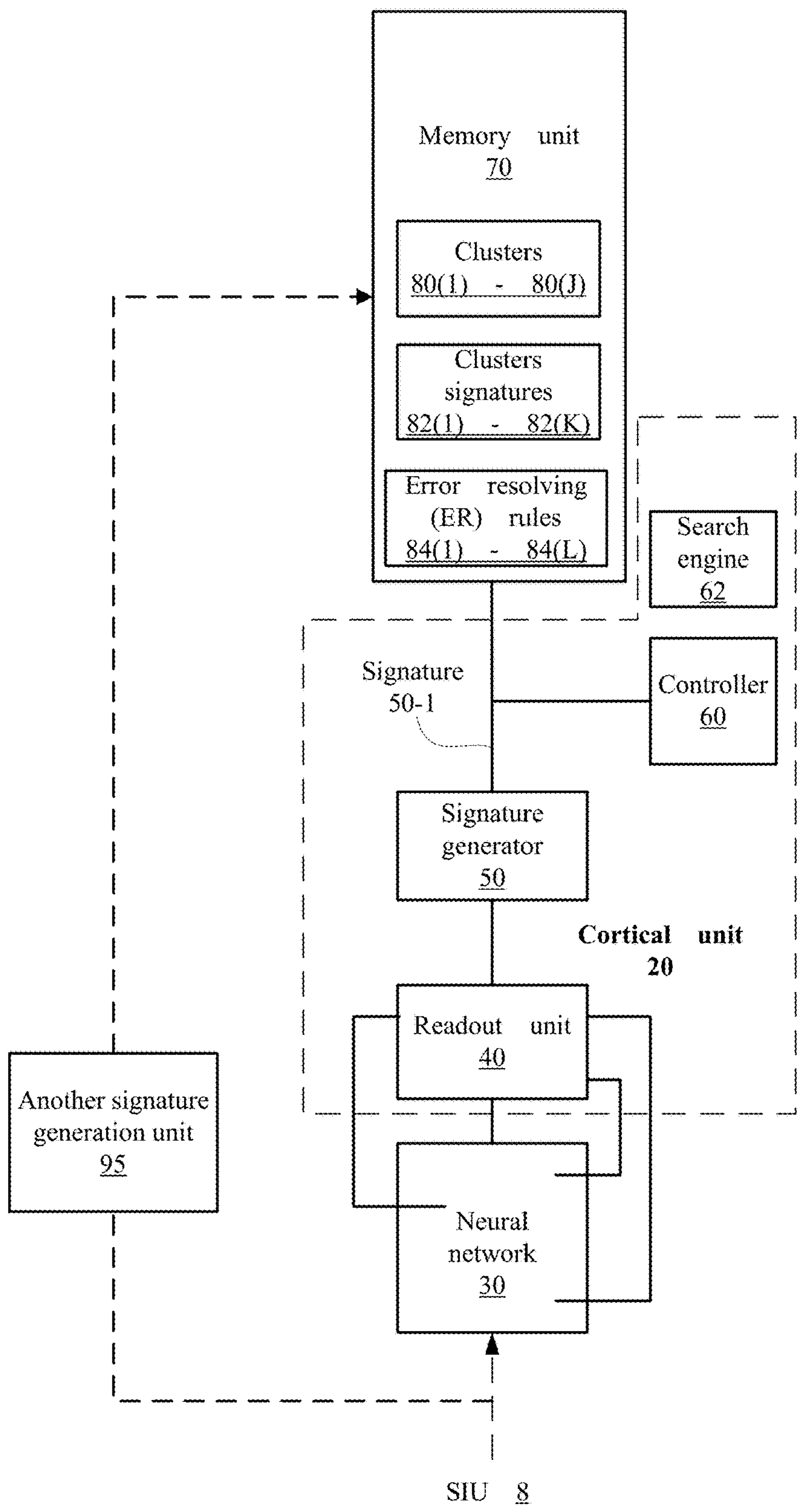

FIG. 7 illustrates an example of NN 30, cortical unit 20, another signature generation unit 95. The other signature generation unit 95 may generate, for example during training and/or re-training and/or during inference signatures that may be included in the clusters (such as clusters 80(1)-80(J).

Any memory unit illustrated in FIGS. 1-7 may include one or more memory units that may be of the same level, of different levels, or the same size, of different size, of the same type (volatile, non-volatile, cache memory, other than cache memory) or different type, of the same latency or of different latency.

Figure 8:
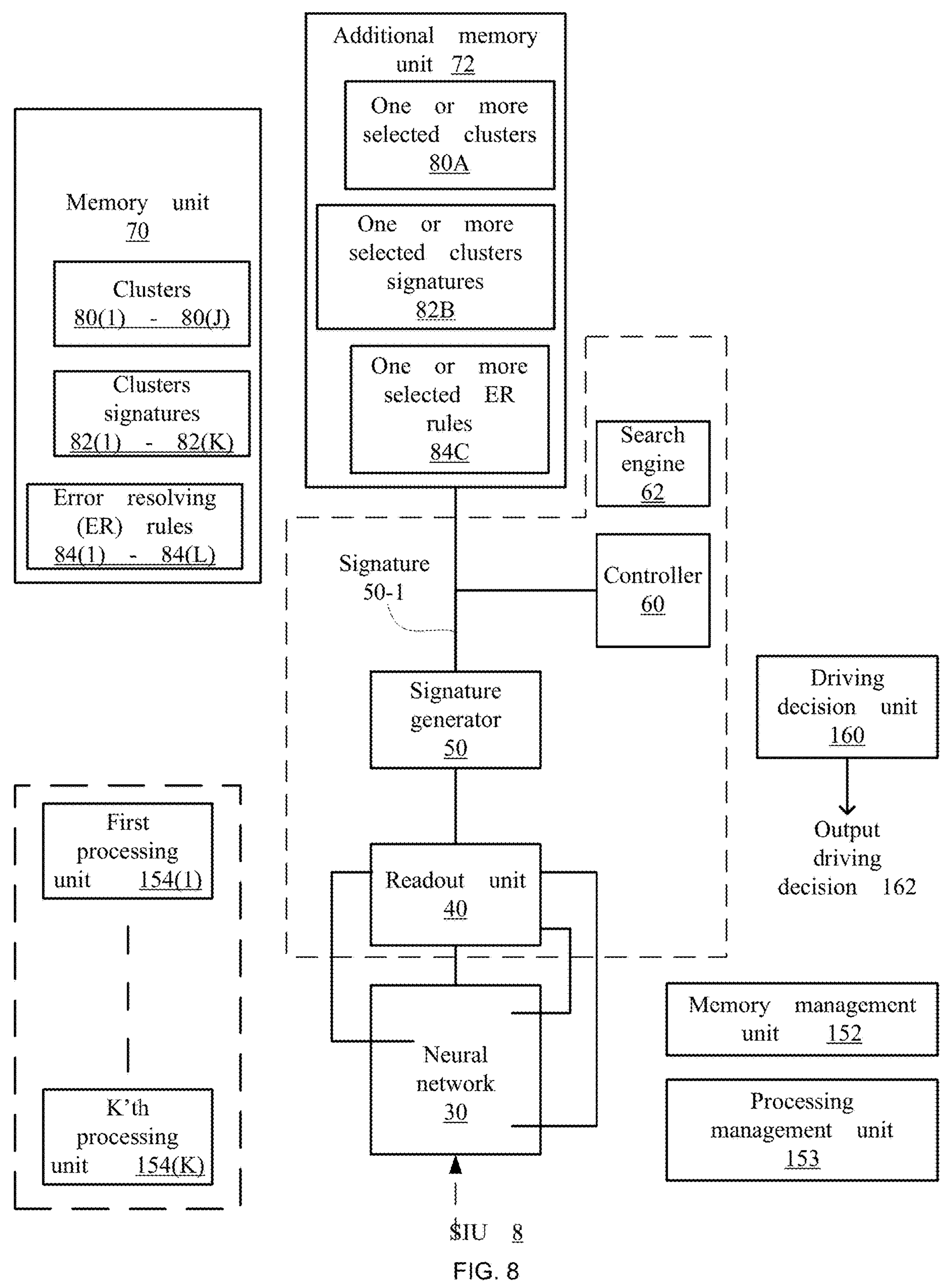

In FIG. 8 the one or more memory units may include memory unit 70 and an additional memory unit 72 that may be a cache memory unit that stores less information than memory 70—for example may store one or more selected clusters 80A, one or more selected cluster signatures 82B and one or more selected ER rules 84C.

It should be noted that the memory resources allocated to the entire ER rules may be relatively small—and this the additional memory unit 72 may store all the ER rules 84(1)-84(L).

At least one of cortical unit 20, readout unit 40, signature generator 40, controller 60, search engine 62, cluster generator 60-1, cluster management unit 60-2, error manager 60-3, cortical unit 20A, second plurality of error resolving units other than cortical units 31(1)-31(Q), signal processor 70-3 of sensing unit 70, other SIU processor 90, other signature generation unit 95, may include or may be implemented by at least a part of one or more of processing units 154(1)-154(K) that in turn are processing circuits or parts of processing circuits.

According to an embodiment, the processing units 154 (1)-154(K) are configured (for example are programmed or are hardware configured) to implement (using data and/or metadata internally stored by the processing units and/or stored in one or more of the memory units) at least one of cortical unit 20, readout unit 40, signature generator 40, controller 60, search engine 62, cluster generator 60-1, cluster management unit 60-2, error manager 60-3, cortical unit 20A, second plurality of error resolving units other than cortical units 31(1)-31(Q), signal processor 70-3 of sensing unit 70, other SIU processor 90, and/or other signature generation unit 95.

FIG. 8 also illustrates a memory management unit 152 and processing management unit 153. The memory management unit 152 and processing management unit 153 may manage memory and processing resources in an effective manner—for example determine which unit to implements at which point of time, reducing memory related communication, fetching, pre-fetching, memory cleaning, and the like.

FIG. 8 also illustrates a driving decision unit 160 configured to generate a driving related decision 162—for example based on an output (for example search result) generated by the adaptive AI system. The driving decision may be an instruction or a request to execute a driving related operation, an instruction or request to trigger a determination of a driving related operation, and the like.

Figure 9:
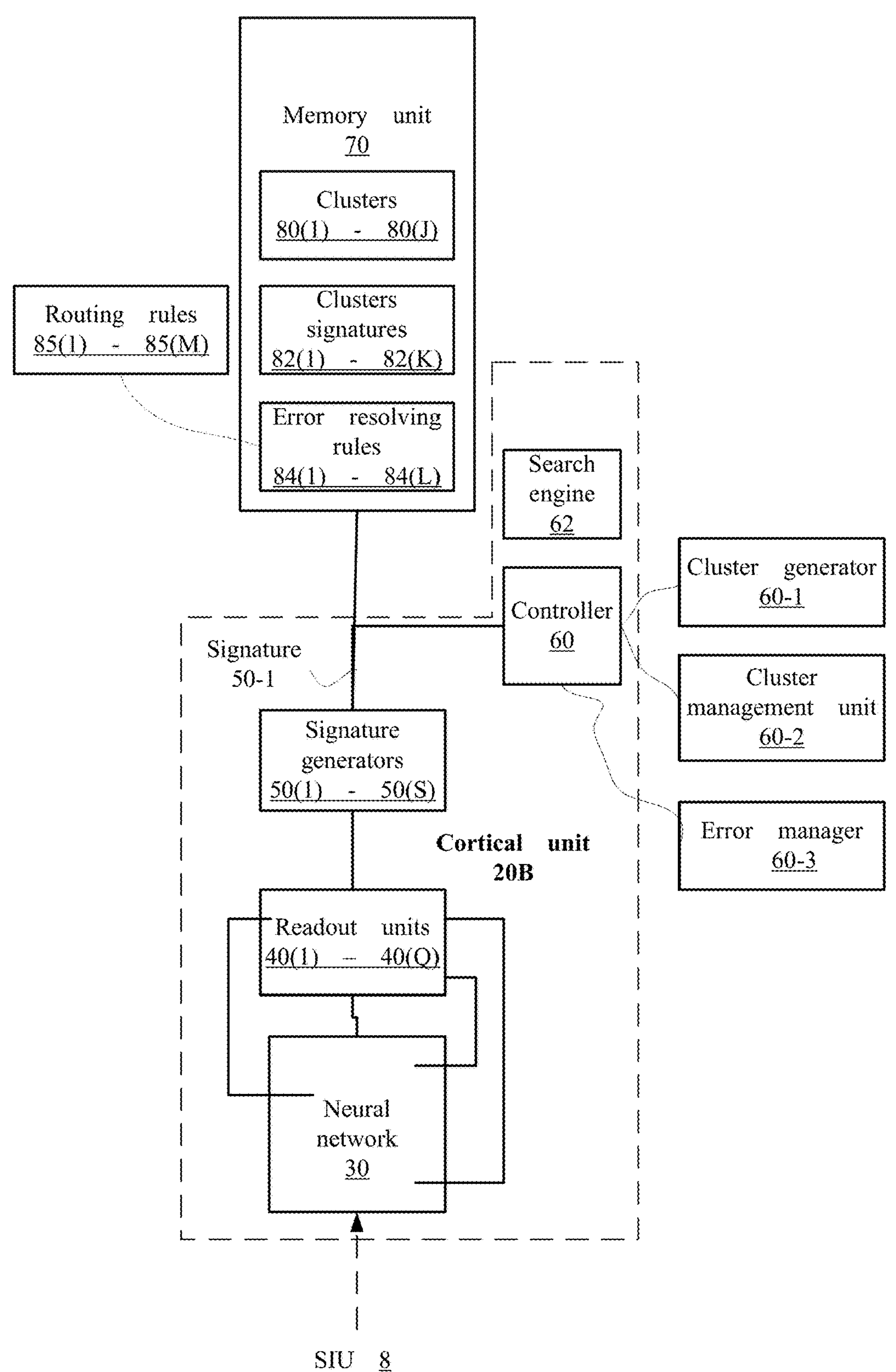

FIG. 9 illustrates an example of memory unit 70 and cortical unit 20B that includes NN 30 (may not be included in cortical unit 20B), Q readout circuits 40(1)-40(Q) (Q exceeds 1), S signature generators 50(1)-50(S) (S exceeds 1), controller 60, and search engine 62.

Controller 60 includes at least one of (a) cluster generator 60-1, (b) cluster management unit 60-2, and (c) error manager 60-3.

Signature generators 50(1)-50(S) are configured to generate signatures based on readout information that was provided by readout circuits 40(1)-40(Q) and was extracted from NN 30. There may be any numerical relationship (greater, equal, smaller) between Q and S, and there may be any mapping between the signature generators and the readout circuits—so that a certain signature generator can be fed by one or more readout circuits. This mapping may be static or dynamic.

Figure 10:
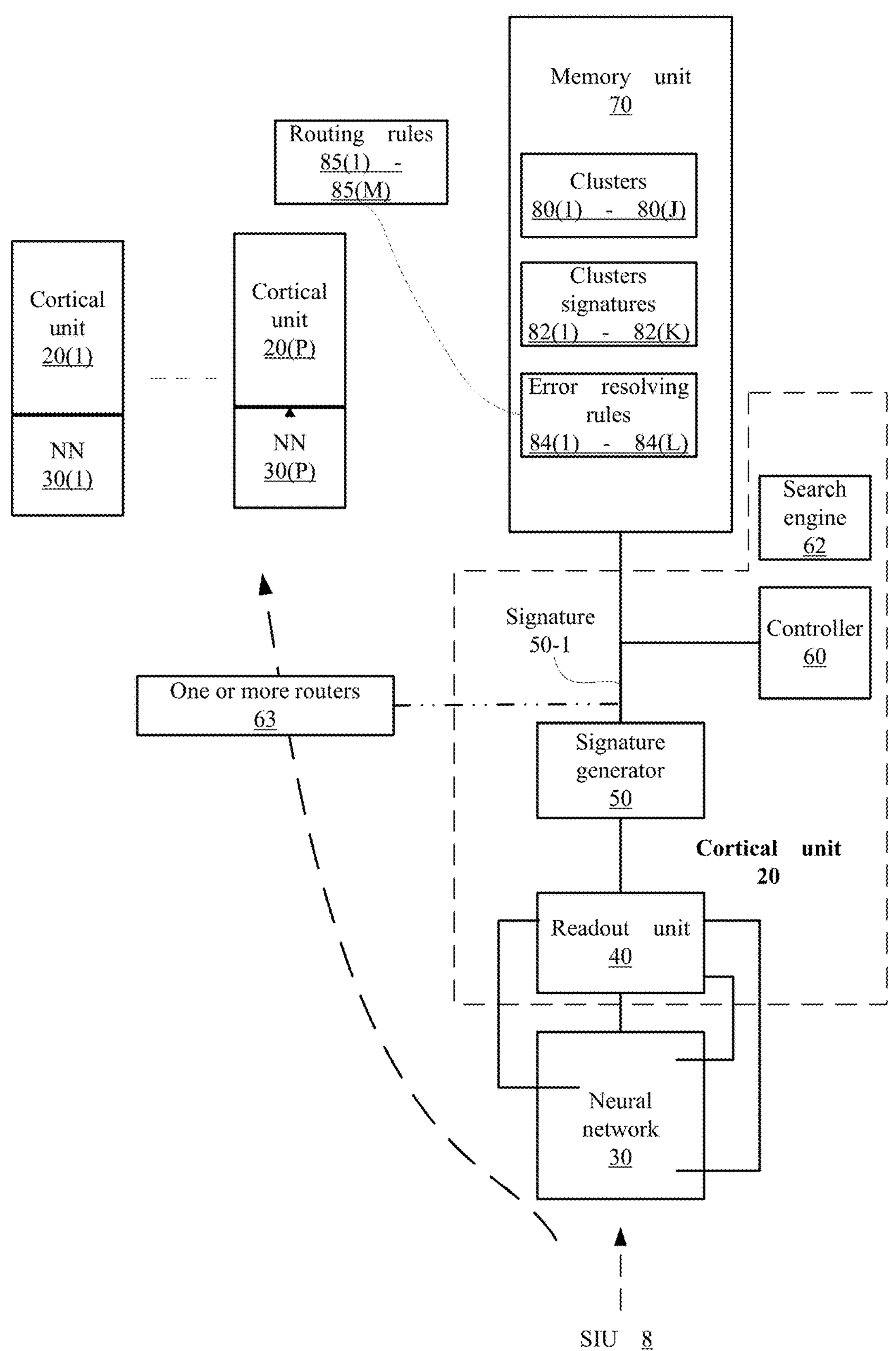

FIG. 10 illustrates an example of NN 30, cortical unit 20, memory unit 70 and an implementation of adaptive step (i) in which an SIU associated with an erroneous signature is sent to an error resolving unit out of multiple error resolving units.

FIG. 10 illustrates one or more routers 63 that are configured to send an SIU to one or more of the cortical units and their associated NNs. The one or more routers implement the routing rules 85(1)-85(M).

FIG. 10 also illustrates multiple error resolving units that include a first plurality of cortical units and NNs (denoted cortical units 20(1)-20(P) and NNs 30(1)-30(P)). Any other error resolving units may be provided.

Figure 11:
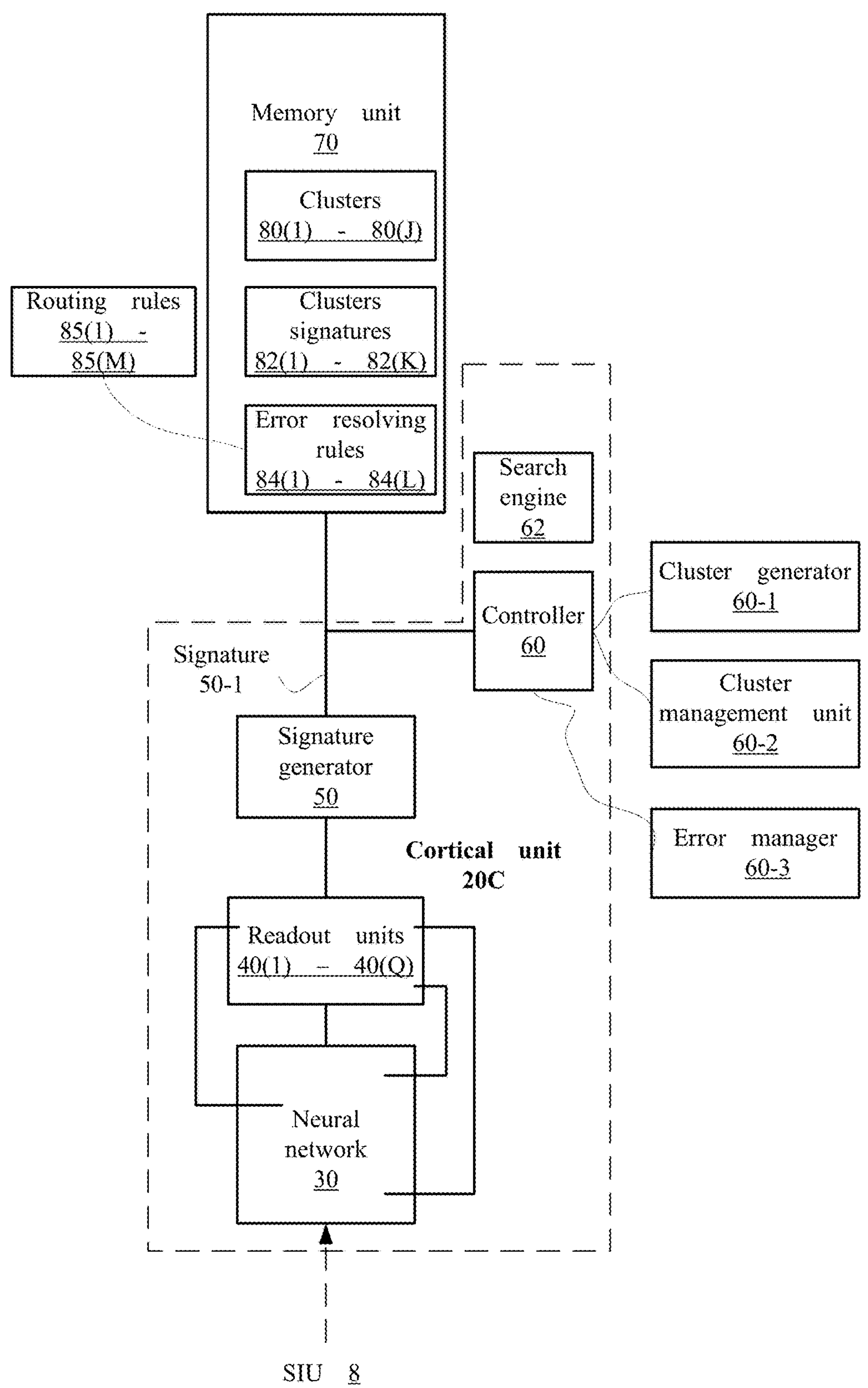

FIG. 11 illustrates an example of memory unit 70 and cortical unit 20C that includes NN 30 (may not be included in cortical unit 20C), Q readout circuits 40(1)-40(Q) (Q exceeds 1), a signature generator 50, controller 60, and search engine 62. Controller 60 includes at least one of (a) cluster generator 60-1, (b) cluster management unit 60-2, and (c) error manager 60-3. Memory unit 70 stores (at least) the routing rules 85(1)-85(M).

Figure 12:
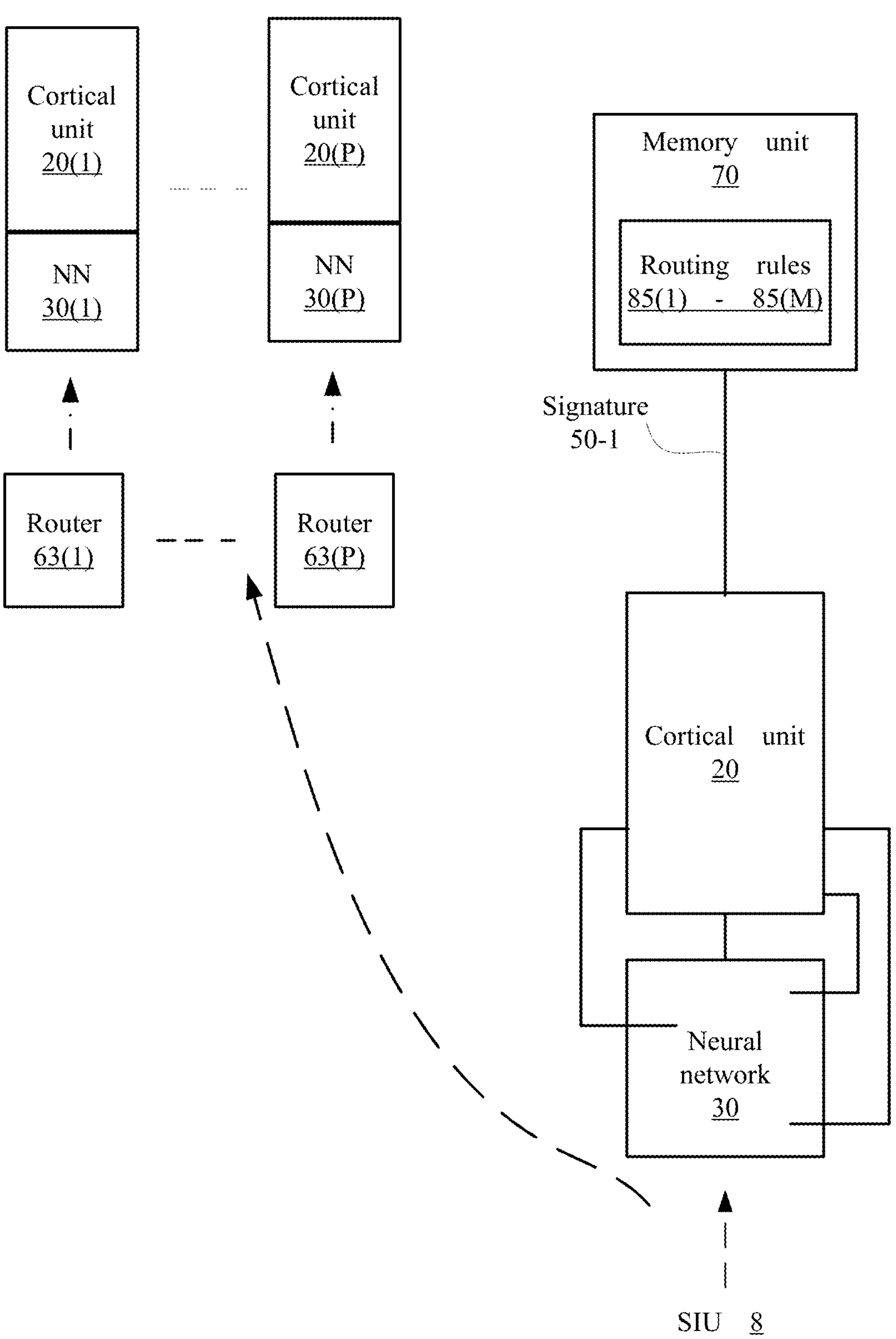

FIG. 12 illustrates an example of memory unit 70, NN 30, cortical unit 20, routers 63(1)-63(P), cortical units 20(1)-20 (P) and their associated NNs 30(1)-30(P). There is a router per cortical unit.

Figure 13:
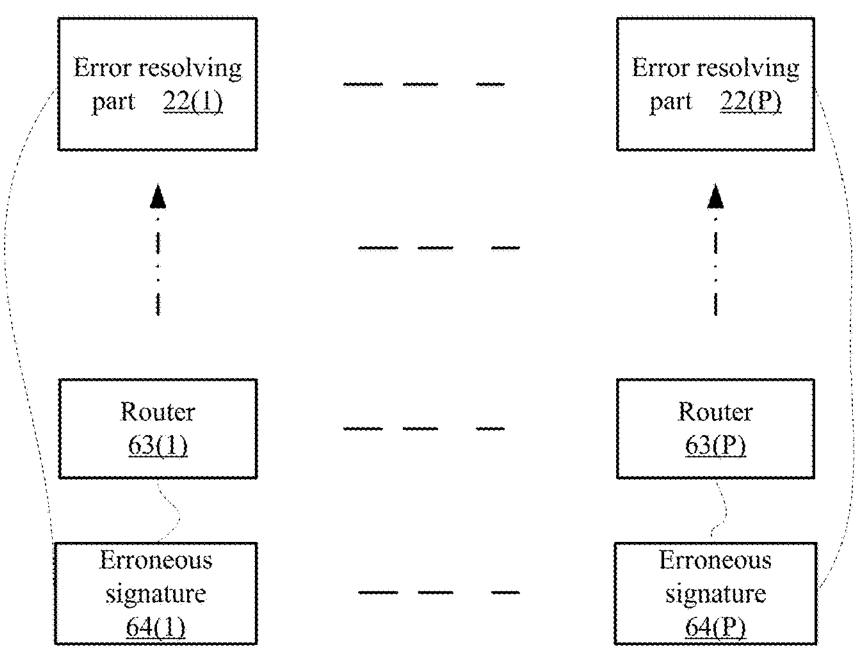
FIGS. 13-16 illustrate examples of signatures and parts of adjustable AI systems.

FIG. 13 illustrates an example of routers 63(1)-63(P), ERPs 22(1)-22(P) and erroneous signatures 64(1)-64(P) associated with the routers and the ERPs. In FIG. 13 each ERP and each router are associated with a single erroneous signature. The association means that the router and the ERP resolve an error associated with the erroneous signature.

Figure 14:
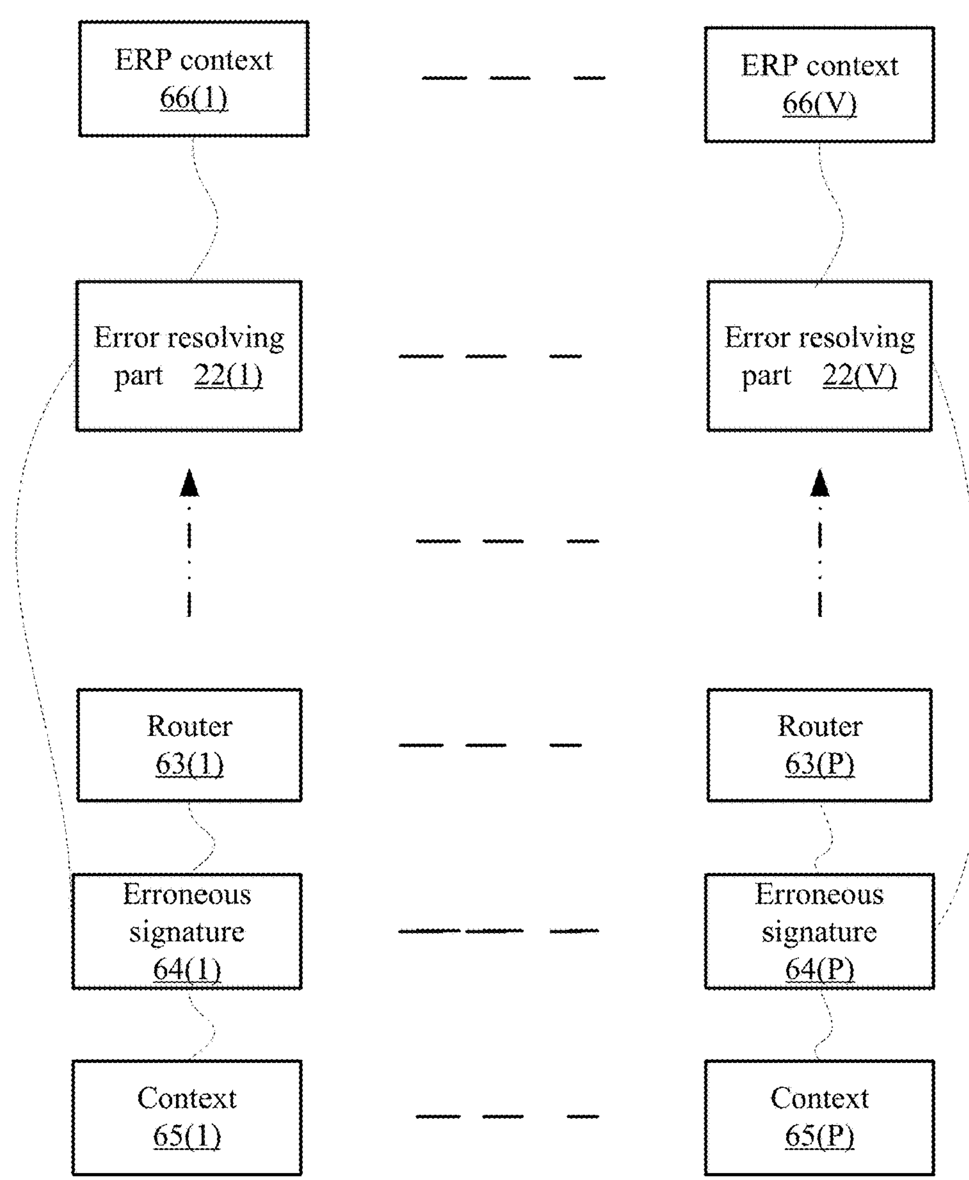

FIG. 14 illustrates an example of routers 63(1)-63(P), ERPs 22(1)-22(V), erroneous signatures 64(1)-64(P) associated with the routers and the ERPs, content 65(1)-65(P) associated with routers 63(1)-63(P), and content 66(1)-66 (V) associated with ERPs 22(1)-22(V). In FIG. 14 each ERP and each router are associated with a single erroneous signature. The association means that the router and the ERP resolve an error associated with the erroneous signature.

Figure 15:
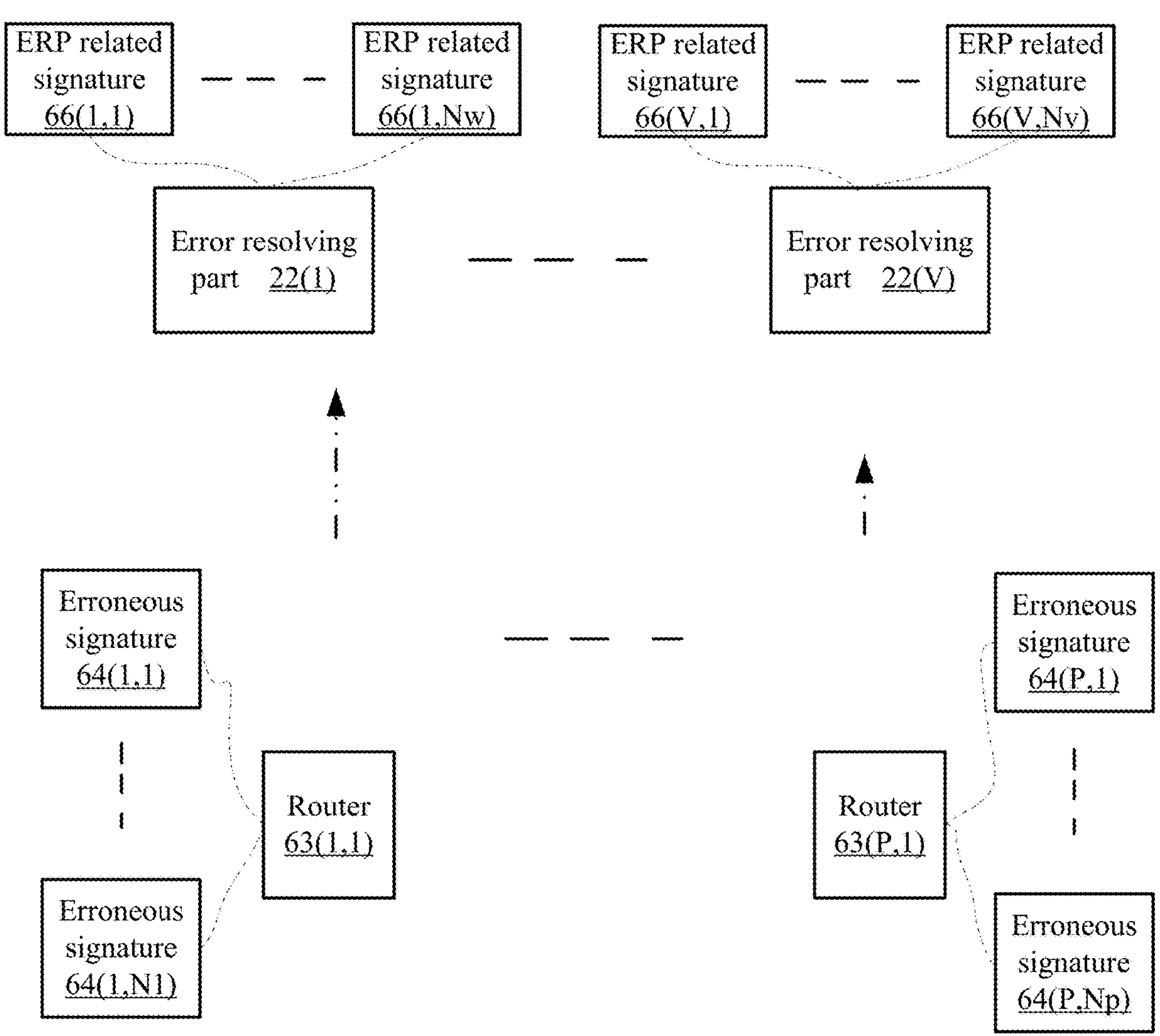

FIG. 15 illustrates an example of routers 63(1)-63(P), ERPs 22(1)-22(V). Each router is associated with two or more erroneous signatures—and sends SIU associated with any of the erroneous signatures to the same ERP. Each ERP is associated with two or more ERP related signatures—so that each ERP may resolve errors resulting from multiple erroneous signatures.

An ERP related signature is either an erroneous signature having its error cured by the ERP—or may represent one or more erroneous signatures having their error cured by the ERP.

Especially—ERP 22(1) is associated with ERP related signatures 66(1,1)-66(1,Nw), ERP 22(V) is associated with ERP related signatures 66(V,1)-66(V,Nv), router 63(1,1) is associated with erroneous signatures 66(1,1)-64(1,N1), and router 63(P,1) is associated with erroneous signatures 66(P, 1)-64(P,Np).

Figure 16:
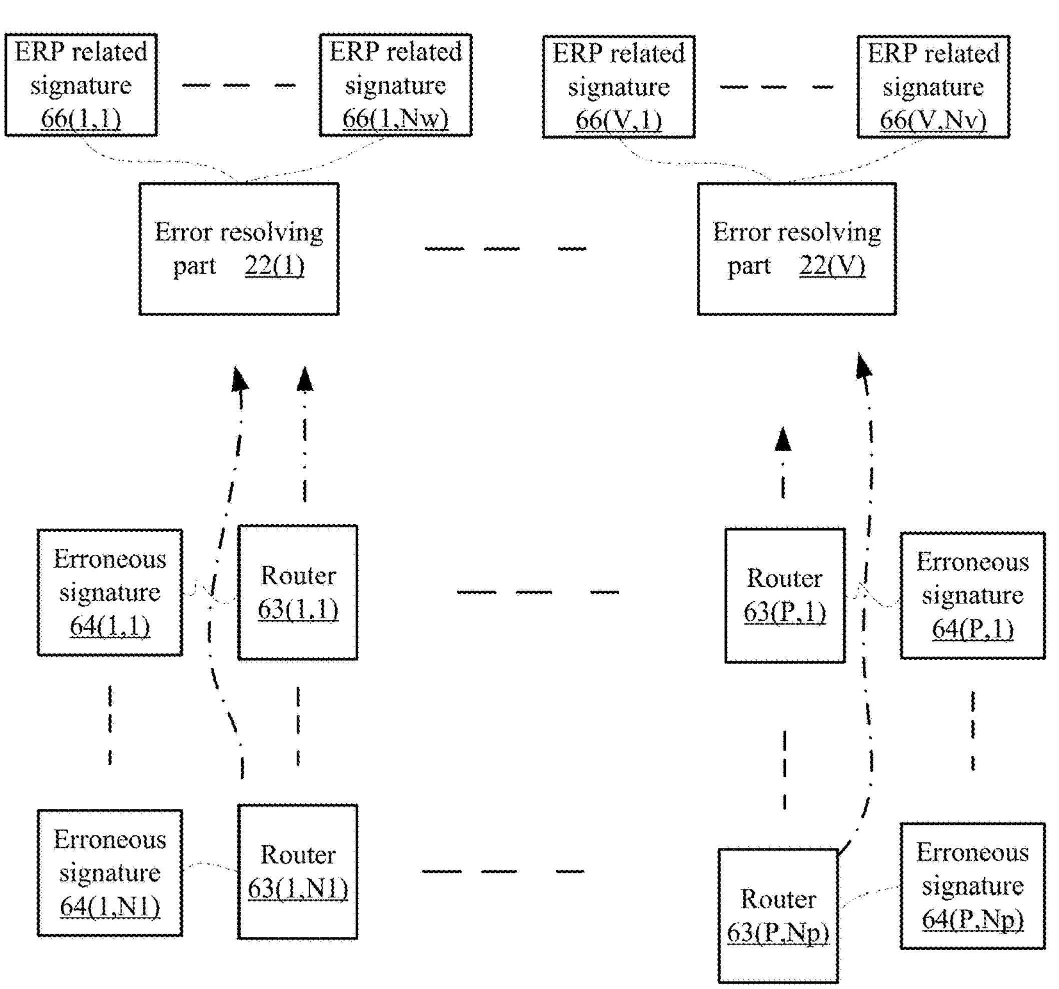

FIG. 16 illustrates an example of routers 63(1,1)-63(P, Np), ERPs 22(1)-22(V).

Each router is associated a single erroneous signatures. A sub-group of routers send the SIUs associated with any of the erroneous signatures associated with the sub-group to the same ERP. Each ERP is associated with two or more ERP related signatures—so that each ERP may resolve errors resulting from multiple erroneous signatures.

An ERP related signature is either an erroneous signature having its error cured by the ERP—or may represent one or more erroneous signatures having their error cured by the ERP.

Especially—ERP 22(1) is associated with ERP related signatures 66(1,1)-66(1,Nw), ERP 22(V) is associated with ERP related signatures 66(V,1)-66(V,Nv), first sub-group of routers 63(1,1)-62(1N1) is associated with erroneous signatures 66(1,1)-64(1,N1) and with one of the ERPs. P'th sub-group of routers 63(P1)-62(P,Np) is associated with erroneous signatures 66(P,1)-64(P,Np) and with one of the routers.

Figure 17:
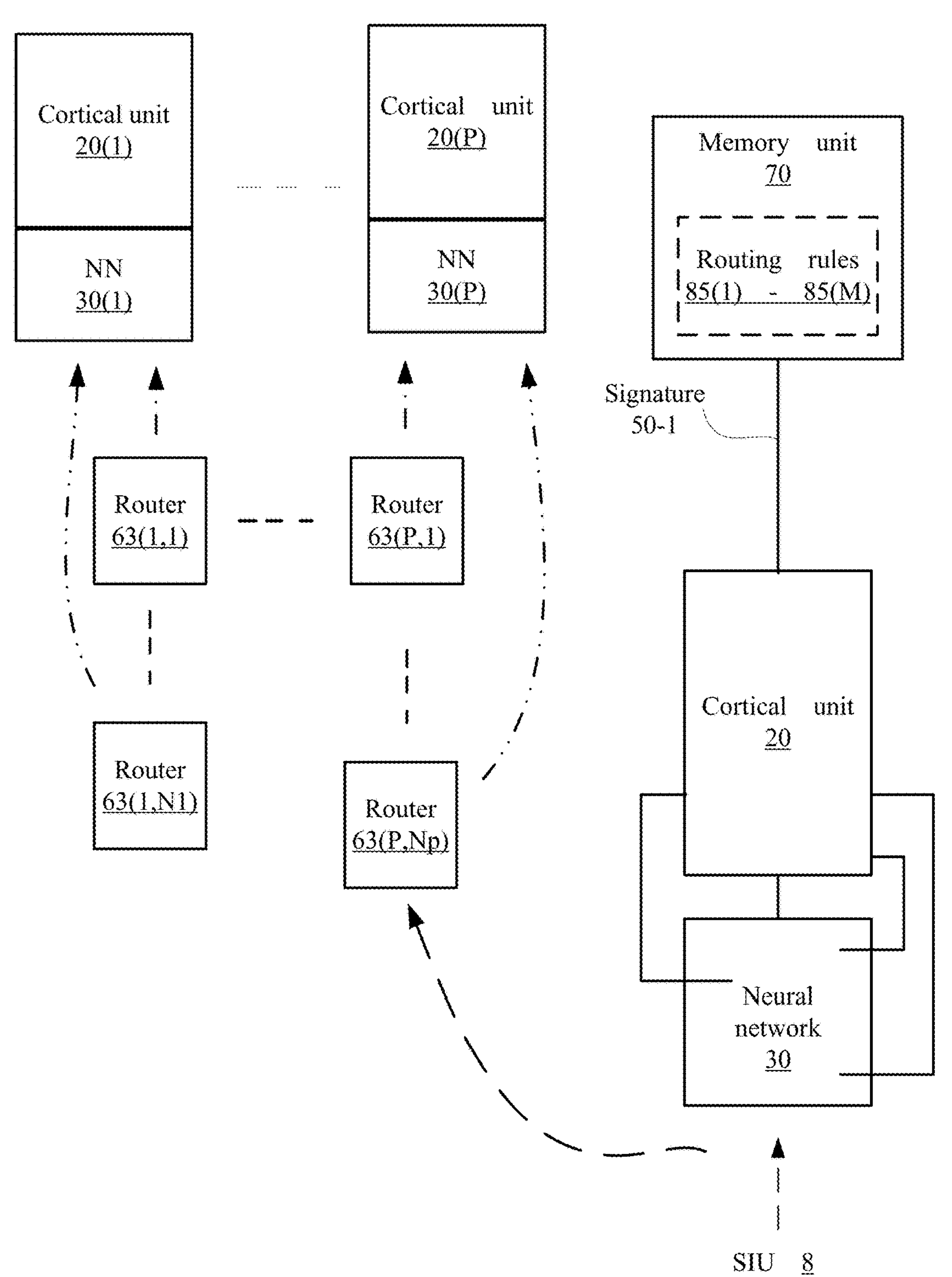
FIGS. 17-19 illustrate examples of one or more parts of one or more adjustable AI system.

FIG. 17 illustrates an example of cortical units 20(1)-20(P), NN 30, memory unit 70 (storing routing rules 85(1)-85(M)), P cortical units 20(1)-20(P) and their corresponding NNs 30(1)-30(P), and routers 63(1,1)-63(P,Np).

A first sub-group of routers 63(1,1)-62(1,N1) are associated with first NN 30(1) and first cortical unit 20(1). A P'th sub-group of routers 63(P,1)-62(P,Np) is associated with P'th NN 30(P) and P'th cortical unit 20(P).

Figure 18:
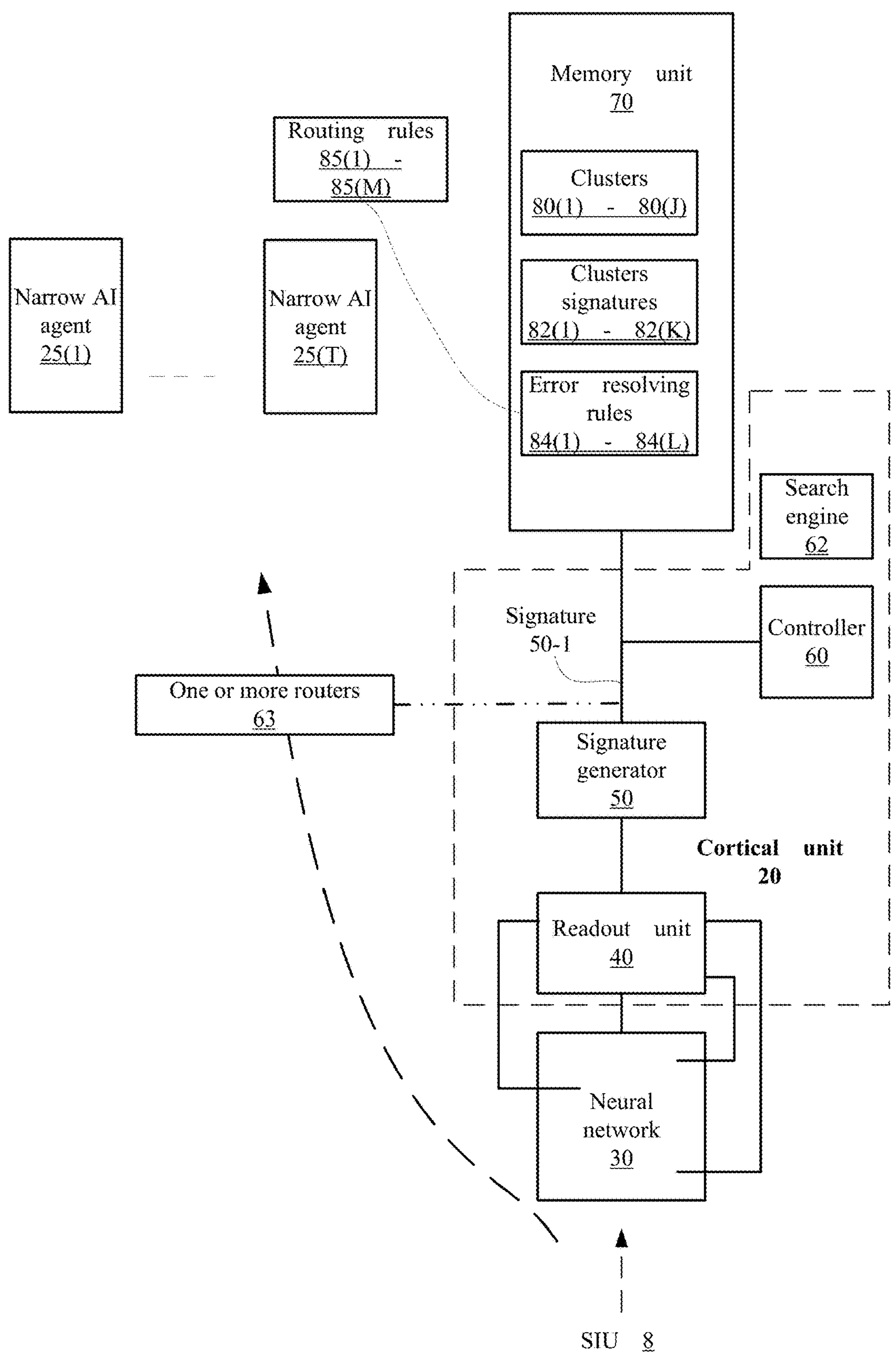

FIG. 18 illustrates an example of NN 30, cortical unit 20, memory unit 70 and an implementation of adaptive step (i) in which an SIU associated with an erroneous signature is sent to an error resolving unit out of multiple error resolving units that are narrow AI agents 25(1)-25(T). Any other error resolving units may be provided. FIG. 18 illustrates one or more routers 63 that are configured to send an SIU to one or more of the cortical units and their associated NNs. The one or more routers implement the routing rules 85(1)-85(M).

Figure 19:
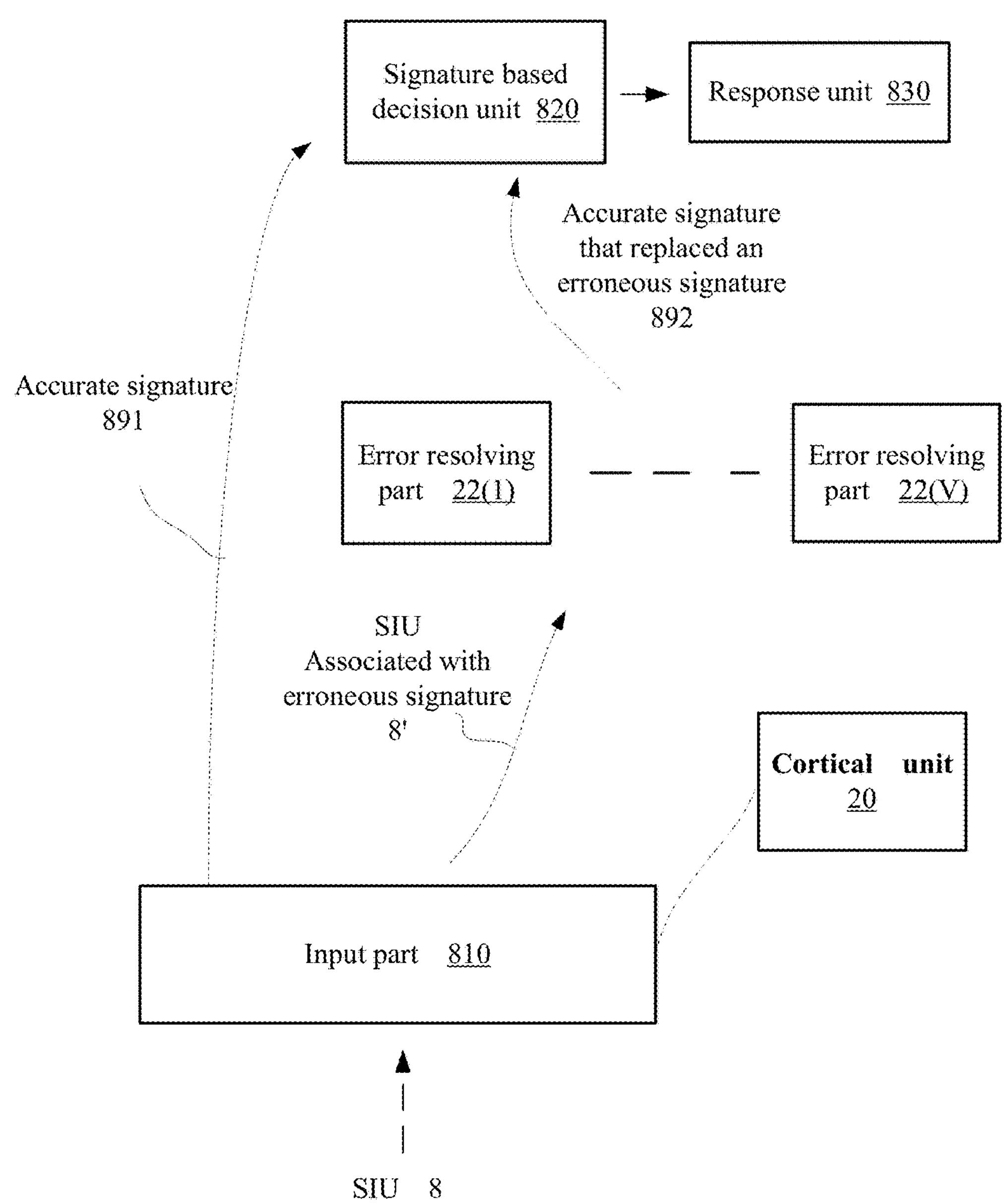

FIG. 19 illustrates an example of an adaptable AI system that includes an input part 810 for receiving an SIU and processing the SIU (input part is illustrated as including cortical unit 20). The input part 810 is configured to generate a signature—when the signature is accurate—accurate signature 891 is sent to signature based decision unit 820. When the signature is erroneous—the SIU (now being associated with the erroneous signature) is sent to one or more ERP of ERPs 221(1)-22(V) that generate an accurate signature than replaced the erroneous signature 891—that is also sent to signature based decision unit 820.

The signature based decision unit 820 is configured to make one or more signature based decision—for example provide a result of an object detection process, and the result may be sent to response unit 830.

According to an embodiment, the adaptable AI system does not include the signature based decision unit 820 and/or does not include the response unit 830.

A non-limiting example of the signature based decision unit may be controller (denoted 60 in FIG. 1) and/or search engine (denoted 62 in FIG. 1).

Figure 20:
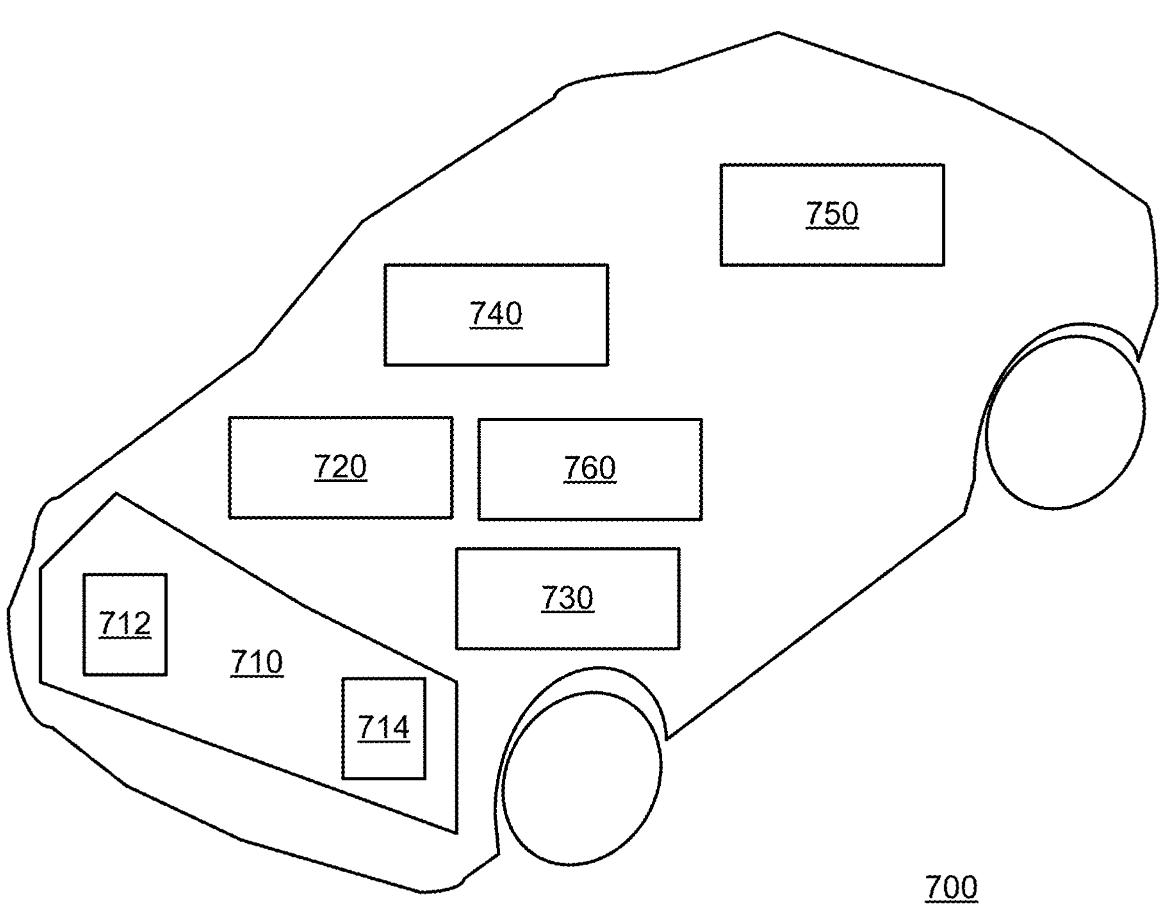
FIG. 20 illustrates an example of a vehicle.

FIG. 20 illustrates an example of vehicle 700. Vehicle 700 includes a vehicle sending unit 710 that may include one or more sensors such as vehicle sensors 712 and 714. Vehicle 700 also includes one or more processing circuits denoted 720, memory unit 730, communication unit 740, and one or more vehicle units (collectively denoted 750) such as one or more vehicle computers, units controlled by the one or more vehicle units, motor units, chassis, wheels, and the like. The one or more processing circuits are configured to execute any of the methods illustrated in this application. The processing circuits 720 may include processing circuits 154(1)-154(K) of FIG. 8 and/or another SIU processor of FIG. 6 and/or the adaptable AI system 760 which may be any adaptable AI system illustrated in this application. The one or more processing circuits 720 are configured to implement and/or host the adaptable AI system 760 and/or any signature based decision unit and/or any response unit. A response unit may be included, at least in part, in the one or more vehicle units.

FIG. 21 illustrates an example of method 201 for solving inaccuracies associated with object detection.

According to an embodiment, method 201 includes step 210 of automatically evaluating, by a controller, an accuracy of signatures for use in object detection, the signatures were generated by an adaptable artificial intelligence (AI) system. An erroneous signature is a signature that is associated with an error—and can also be regarded as an erroneous signature.

According to an embodiment, step 210 is followed, when finding an erroneous signature, by step 220 of triggering, by the controller, a generation of an ERP for generating an correct signature instead of the erroneous signature. When used for the object detection, the erroneous signature results in an inconsistent detection of objects. The error of the erroneous signature was introduced by a part of the adaptable AI system before the generation of the ERP.

According to an embodiment, step 220 includes triggering a generation of an ERP. The ERP may be an error resolving unit such as a cortical unit—or an ERP other than a cortical unit.

Figure 22:
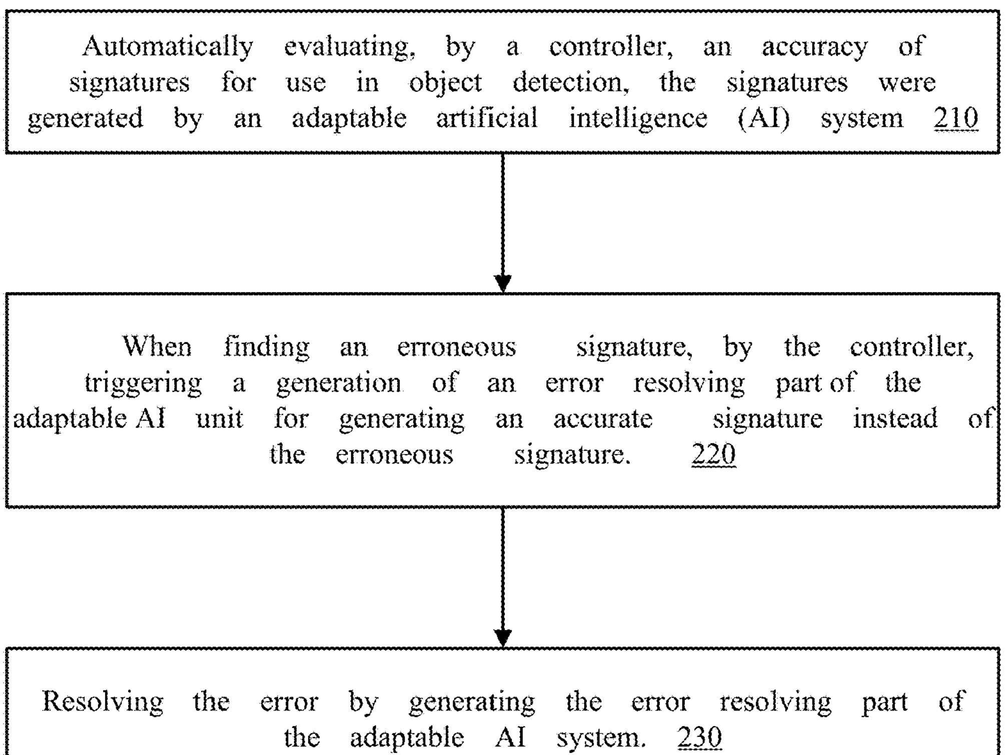

FIG. 22 illustrates an example of method 202 for solving inaccuracies associated with object detection.

According to an embodiment, method 202 includes step 210 of automatically evaluating an accuracy of signatures for use in object detection, the signatures were generated by an adaptable artificial intelligence (AI) system. An erroneous signature is a signature that is associated with an error—and can also be regarded as an erroneous signature.

According to an embodiment, step 210 is followed, when finding an erroneous signature, by step 220 of triggering, by the controller, a generation of an ERP for generating an correct signature instead of the erroneous signature. When used for the object detection, the erroneous signature results in an inconsistent detection of objects. The error of the erroneous signature was introduced by a part of the adaptable AI system before the generation of the ERP.

According to an embodiment, step 220 is followed by step 230 of resolving the error by generating the ERP.

FIG. 23 illustrates an example of method 203 for solving inaccuracies associated with object detection.

According to an embodiment, method 203 includes step 210 of automatically evaluating an accuracy of signatures for use in object detection, the signatures were generated by an adaptable artificial intelligence (AI) system. An erroneous signature is a signature that is associated with an error—and can also be regarded as an erroneous signature.

According to an embodiment, step 210 is followed, when finding an erroneous signature by step 223 of triggering (by the controller) one or more error resolving steps.

The one or more error resolving steps may include at least one of:

i. Adding an error resolving unit that has signature generating capabilities—that is trained or otherwise adapted to solve the new error. Once the error resolving unit is added and configured to solve the new error—a corresponding error revolving rule maps the signature associated with the new error to the new unit. Thus—when an input to a cortical unit causes the cortical unit to generate the signature that is associated with the new error—the content is sent to the error resolving unit—in order to solve the new error. The error resolving unit may be a new cortical unit or may differ from the new cortical unit.

ii. Changing one or more signatures used for object detection.

iii. Adapting another unit that is part of a path of receiving radiation (heat, light, or any other sensed radiation), converting the radiation to detection signals and generating a SIU. The adapted other unit may be a sensing unit.

iv. Using a current error resolving unit. The current error resolving unit may have signature generating capabilities—to solve the new error.

Method 203 may include triggering only one of adaptive steps (i)-(iv), only two of adaptive steps (i)-(iv), only three of adaptive steps (i)-(iv), or all adaptive steps (i)-(iv).

Figure 24:
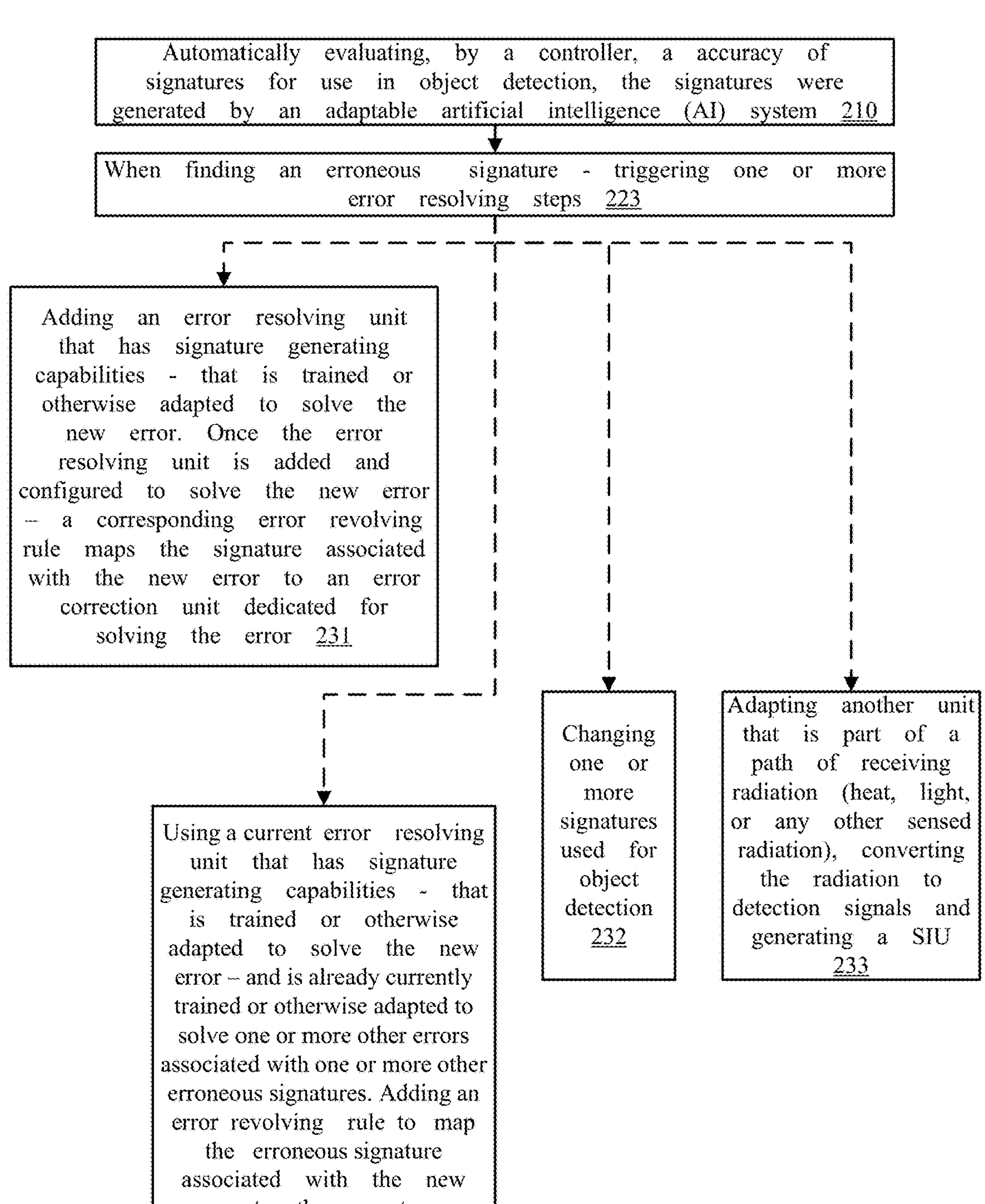

FIG. 24 illustrates an example of method 204 for solving inaccuracies associated with object detection.

According to an embodiment, method 204 includes step 210 of automatically evaluating a accuracy of signatures for use in object detection, the signatures were generated by an adaptable artificial intelligence (AI) system. An erroneous signature is a signature that is associated with an error—and can also be regarded as an erroneous signature.

According to an embodiment, step 210 is followed, when finding an erroneous signature by step 223 of triggering one or more error resolving steps.

According to an embodiment, step 223 is followed by at least one of:

i. Step 231 of adding an error resolving unit that has signature generating capabilities—that is trained or otherwise adapted to solve the new error. Once the error resolving unit is added and configured to solve the new error—a corresponding error revolving rule maps the signature associated with the new error to an error resolving unit dedicated to solving the error. Thus—when an input to a cortical unit causes the cortical unit to generate the signature that is associated with the new error—the content is sent to the error resolving unit—in order to solve the new error. The error resolving unit may be a new cortical unit or may differ from the new cortical unit.

ii. Step 232 of changing one or more signatures used for object detection.

iii. Step 233 of adapting another unit that is part of a path of receiving radiation (heat, light, or any other sensed radiation), converting the radiation to detection signals and generating a SIU. The adapted other unit may be a sensing unit.

iv. Step 234 of using a current error resolving unit. The current error resolving unit may have signature generating capabilities—to solve the new error.

Figure 42:
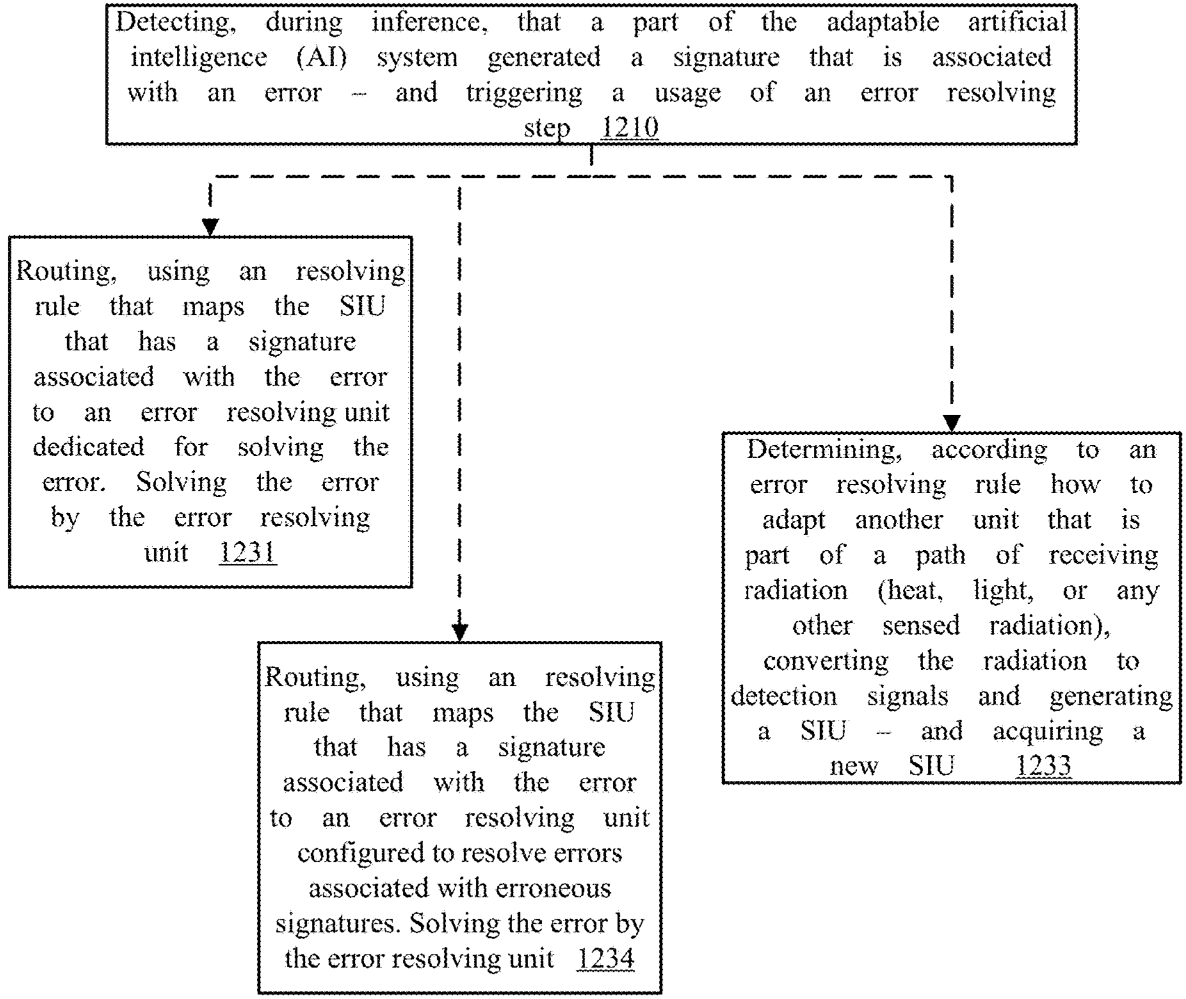

FIG. 42 illustrates an example of method 1201 for solving inaccuracies associated with object detection during inference. It is assumed that any error resolving part (also referred to an error resolving unit) and/or any prerequisite for solving errors were already formed.

According to an embodiment, method 1201 includes step 1210 of detecting, during inference, that a part of the adaptable AI system generated a signature that is associated with an error—and triggering a usage of an error resolving step.

According to an embodiment, step 1210 is followed, when finding an erroneous signature by executing at least one error resolving steps out of:

i. Step 1231 of routing, using an resolving rule that maps the SIU that has a signature associated with the error to an error resolving unit dedicated for solving the error. Solving the error by the error resolving unit.

ii. Step 1232 of routing, using an resolving rule that maps the SIU that has a signature associated with the error to an error resolving unit configured to resolve errors associated with erroneous signatures. Solving the error by the error resolving unit.

iii. Step 1233 of determining, according to an error resolving rule how to adapt another unit that is part of a path of receiving radiation (heat, light, or any other sensed radiation), converting the radiation to detection signals and generating a SIU—and acquiring a new SIU.

FIG. 25 illustrates an example of method 300 for accurate signature generation associated with object detection.

According to an embodiment, method 300 includes step 310 of generating, by a cortical unit of an adaptive AI system, a signature representative of a SIU. This signature is referred to as a generated signature.

According to an embodiment, step 310 is followed by step 320 of accessing error resolving rules and checking if the generated signature is associated with an already found error. An error resolving rule identifies a signature associated with an error and also identifies a solution for solving the error. The solution may be an error resolving step.

If the generated signature is associated with an already found error—then the ER rule is used to determine which solution for solving the error should be used.

According to an embodiment, step 320 is followed by step 330 of executing the error resolving step associated with the generated signature.

Step 330 may include at least one of:

Sending the content (for example SIU) represented by the signature to the error resolving unit identified by the error resolving rule.

Adapting another unit that is part of the path of receiving radiation (heat, light, or any other sensed radiation), The adaptable AI system is configured to adapt itself to provide one or more error solving solutions—such as rare errors.

FIG. 26 illustrates method 1300 for solving inaccuracies associated with object detection.

According to an embodiment, method 1300 includes step 1310 of automatically evaluating, by a controller, an accuracy of signatures for use in the object detection, the signatures were generated by an adaptable artificial intelligence (AI) system.

According to an embodiment, when finding an erroneous signature of the signatures, by the controller, step 1310 is followed by step 1320 of triggering a generation of (a) a narrow AI agent configured to solve an error associated with the erroneous signature and (b) a router that routes a sensed information unit (SIU) associated with the erroneous signature to the narrow AI agent, wherein the erroneous signature, when used for the object detection, results in an object detection error.

According to an embodiment, the narrow AI agent is configured to solve the error by generating an accurate signature instead of the erroneous signature.

According to an embodiment, step 1320 of triggering may be repeated for each additional erroneous signature. For example—when finding an additional erroneous signature of the signatures, by the controller, triggering a generation of (a) an additional narrow AI agent configured to solve an error associated with the additional erroneous signature and (b) an additional router that routes an additional SIU associated with the additional erroneous signature to the additional narrow AI agent, wherein the additional erroneous signature, when used for the object detection, results in an additional object detection error.

The erroneous signature was generated by a signature generator of the adaptable AI system, based on readout information, the readout information was provided by a readout circuit and was extracted from a deep neural network (DNN) that was fed by the SIU.

According to an embodiment, step 1320 includes triggering a sending of the SIU to the ERP.

According to an embodiment, step 1320 is followed by step 1330 of performing at least one of:

Generating the ERP.

Generating an error resolving rule that associates the erroneous signature with the ERP.

Sending the SIU to the ERP.

FIG. 27 illustrates method 1350 for object detection at a presence of inaccuracies.

According to an embodiment, method 1350 starts by step 1360 of receiving, by a controller, a signature of a sensed information unit (SIU) by a part of a modifiable artificial intelligence (AI) system.

According to an embodiment, step 1360 is followed by step 1370 of detecting that the signature is an erroneous signature, according to an error resolving rule.

According to an embodiment, step 1370 is followed by step 1380 of invoking a routing of the SIU to a narrow AI agent that was trained to amend an error associated with the erroneous signature.

According to an embodiment, method 1350 also include routing of the SIU to the narrow AI agent that was trained to amend the error associated with the erroneous signature.

According to an embodiment, the narrow AI agent is configured to solve the error by generating an accurate signature instead of the erroneous signature.

According to an embodiment, method 1350 further includes (a) receiving, by a controller, an additional signature of an additional SIU by a part of the modifiable AI system; detecting that the additional signature is an additional erroneous signature, according to an additional error resolving rule; and invoking a routing of the additional SIU to an additional narrow AI agent that was trained to amend an error associated with the additional erroneous signature.

According to an embodiment, the erroneous signature was generated by a signature generator of the adaptable AI system, based on readout information, the readout information was provided by a readout circuit and was extracted from a deep neural network (DNN) that was fed by the SIU.

According to an embodiment, the erroneous signature is an ambiguous signature that when used for the object detection, results in inconsistent detection of objects.

According to an embodiment, the erroneous signature when used for the object detection, results in at least one of false negative detection or false positive detection.

Multiple Routers

According to an embodiment, multiple erroneous signatures may be associated with a single ERP that has signature generating capabilities. More than a single router may be allocated to that single ERP. Solving the errors of multiple erroneous signature by a single ERP reduces the overall resources of the adaptable AI system.

FIG. 28 illustrates an example of method 1400 solving inaccuracies associated with object detection.

According to an embodiment, method 1400 starts by step 1410 of automatically evaluating, by a controller, an accuracy of signatures for use in the object detection, the signatures were generated by an adaptable AI system.

According to an embodiment, when finding an erroneous signature of the signatures, by the controller, step 1410 is followed by step 1420 of triggering a generation of a router that routes a SIU that is associated with the erroneous signature to a current ERP. The current ERP is currently associated with resolving at least one other error associated with at least one other erroneous signature.

According to an embodiment, step 1420 also includes step 1422 of selecting the current ERP out of a first plurality of current ERPs. The selection occurs when there are more than one current ERPs.

The selection may be based on one or more parameters such as one or more of erroneous signature similarities, context, objects, load balancing, and the like.

The first plurality of current ERPs are associated with a second plurality of signatures and the selecting of step 1422 is based on similarities between the erroneous signature and the second plurality of signatures. For example—it is beneficial to allocate a single current ERP to correct erroneous signatures that are similar to each other.

The erroneous signature may be associated with a certain context. The second plurality of signatures are associated with context. The selection of step 1422 may be based on similarities between the certain context and the contexts. For example—it is beneficial to allocate a single current ERPs to correct erroneous signatures that are associated with similar contexts.

The erroneous signature may be associated with a certain object. The second plurality of signatures are associated with multiple objects. The selection of step 1422 may be based on similarities between the certain object and the multiple objects. For example—it is beneficial to allocate a single current ERPs to correct erroneous signatures that are associated with the same object.

Load balancing may involve trying to prevent traffic clots—and allocating substantially the same amount of erroneous signatures to different ERPs. The load balancing may be applied to over the entire first plurality of current ERPs or to sub-groups of the first plurality of current ERPs (for example for a sub-group that manage similar erroneous signatures).

As indicated above, the first plurality of current ERPs are associated with a second plurality of signatures. The second plurality of signatures may be the erroneous signatures allocated to the first plurality of current ERPs. Alternatively, a signatures of a current ERP may represent more than two erroneous signatures fixed by the current ERP.

FIG. 29 illustrates an example of method 1401 solving inaccuracies associated with object detection.

According to an embodiment, method 1401 starts by step 1410 of automatically evaluating, by a controller, an accuracy of signatures for use in the object detection, the signatures were generated by an adaptable AI system.

According to an embodiment, when finding the erroneous signature, step 1410 is followed by step 1411 of selecting between (i) triggering a generation of a new ERP of the adaptable AI, and (ii) triggering a usage of the current ERP of the adaptable AI.

The selection of step 1410 may be based on one or more parameters such as available resources allocated to implement the adaptable AI system, traffic parameters such as the rate of incoming SIUs, allowed latency of the adaptable AI system, and the like. Higher traffic load will require more load balancing. The selection may be responsive to an output of a cost function (linear or non-linear, weighted sum, exponential function, and the like) that takes into account the one or more parameters.

When selecting the first option (i) then step 1411 is followed by step 1414 of triggering a generation of a new ERP and triggering a generation of a router that routes a SIU that is associated with the erroneous signature to the new ERP.

When selecting second option (ii) then step 1411 is followed by step 1421 of triggering a generation of a router that routes a SIU that is associated with the erroneous signature to a current ERP. The current ERP is currently associated with resolving at least one other error associated with at least one other erroneous signature. According to an embodiment, step 1421 includes step 1422 of selecting the current ERP out of a first plurality of current ERPs. The selection occurs when there are more than one current ERPs.

Bypassing

Figure 30:
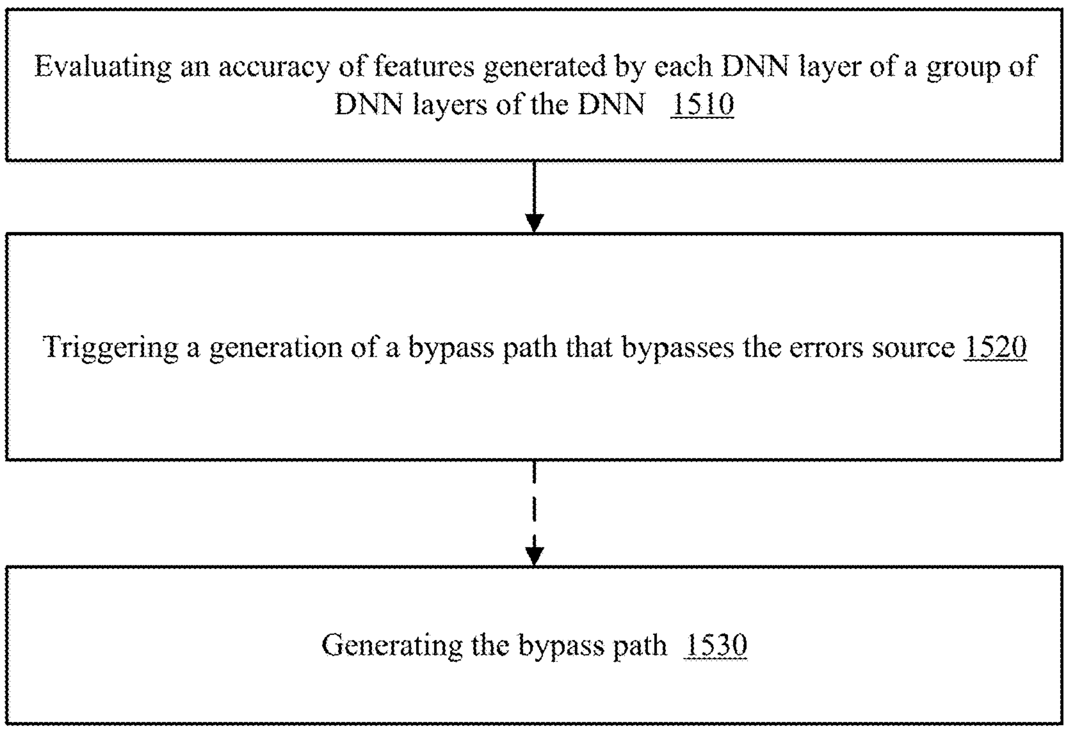

FIG. 30 illustrates an example of method 1500 for improving an accuracy of a deep neural network (DNN) used for classification.

According to an embodiment, method 1500 starts by step 1510 of identifying an error source within the DNN, wherein the DNN represents a deep learning model used for at least partially autonomous driving.

According to an embodiment, step 1510 includes detecting an erroneous signature and checking whether the error resulted from a network clot.

The erroneous signature may be an ambiguous signature that once used in object detection results in inconsistent results.

According to an embodiment, the error source is selected out of a false positive (FP) error source and a false negative (FN) error source.

The erroneous signature may be an classification error signature that is a false positive signature of a false positive signature.

According to an embodiment, the checking includes obtaining features from multiple layers of the DNN that is fed with SIUs that capture objects that are associated with the error—and determine which layer outputs features that cannot be properly used to distinguish between the objects.

This may include evaluating the accuracy of different classifiers that are fed by features from the multiple layer—a classifier per layer—and finding which classifier fails to perform an accurate classification.

According to an embodiment, step 1510 includes evaluating an accuracy of features generated by each DNN layer of a group of DNN layers of the DNN.

According to an embodiment, for each DNN layer of the group of DNN layers, the evaluating of the accuracy of the features includes triggering a building of a classifier based on the features generated by the DNN layer and triggering an evaluating of an accuracy of the classifier.

According to an embodiment, for each DNN layer of the group of DNN layers, the evaluating of the accuracy of the features comprising building a classifier based on the features generated by the DNN layer and evaluating of an accuracy of the classifier.

According to an embodiment, step 1510 is followed by step 1520 of triggering a generation of a bypass path that bypasses the errors source.

According to an embodiment, step 1520 is followed by step 1530 of generating of the bypass path.

According to an embodiment, step 1520 includes determining a bypass readout location for reading out information from the DNN, the bypass readout location precedes the error source.

According to an embodiment, step 1520 includes triggering a generation of a bypass path that starts at the bypass readout location.

The bypass path may start by the DNN. The bypass path may be limited to bypassing some part of the DNN, or may extend beyond the DNN.

According to an embodiment, the bypass path includes:

Only a DNN bypass portion.

The DNN bypass portion and a readout unit bypass portion.

The DNN bypass path, the readout unit bypass portion and a signal generator bypass portion.

Figure 31:
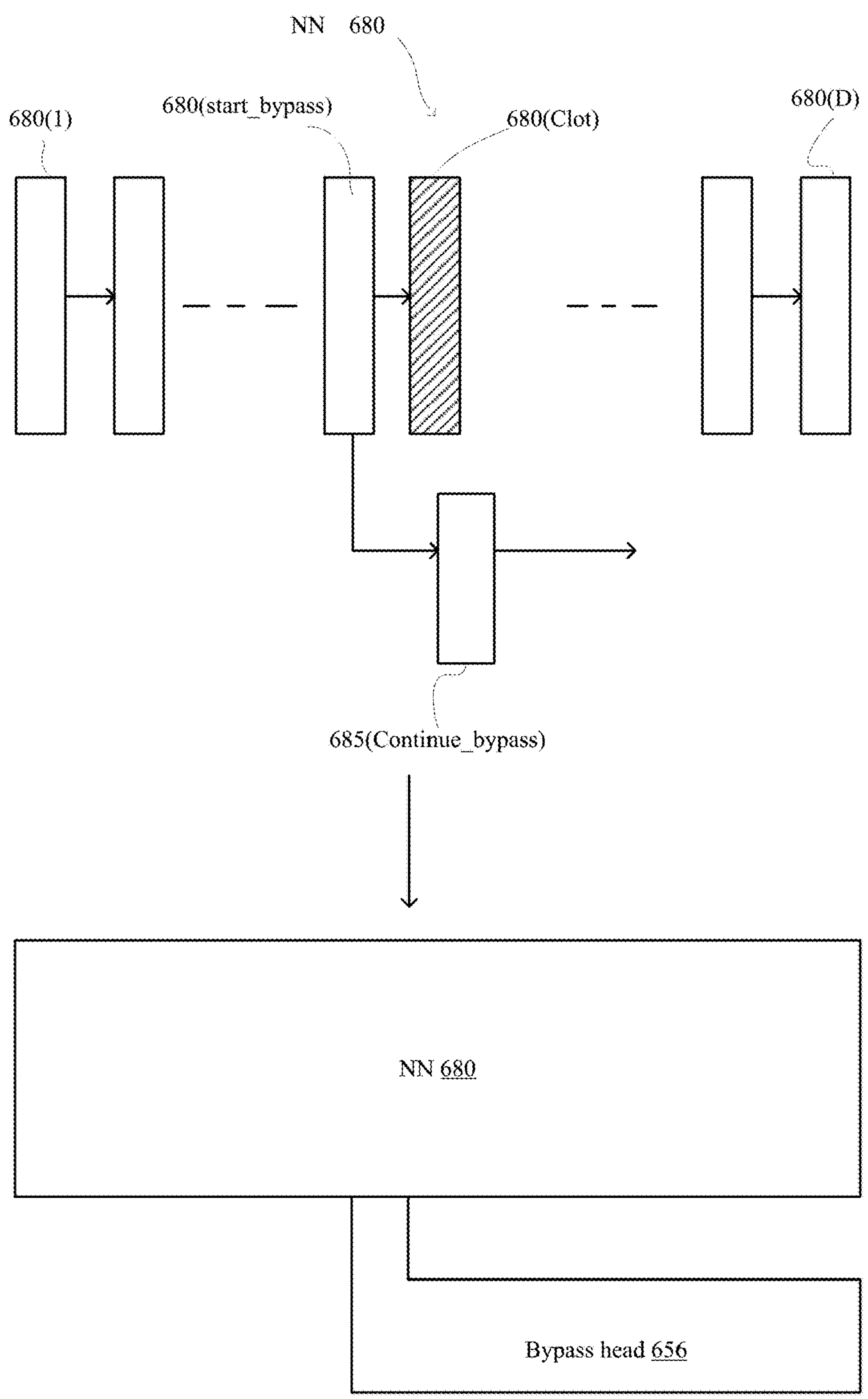
FIGS. 31-32 illustrate examples of bypasses.

FIG. 31 illustrates an example of a bypass path.

FIG. 31 illustrates a neural network 680 that includes multiple layers 680(1)-680(D), that include a network clot layer 680(Clot) which is an error source.

The neural network also includes a layer that precedes the clot and forms a start of a bypass path that bypasses the network clot. This layer is denoted 680(start_bypass). Layer 680(start_bypass) may be the bypass path or may include one or more layers such as layers 685(continue_bypass) that may form a bypass head.

The bottom of FIG. 31 includes neural network 680 and bypass head 656.

There may be multiple bypass paths per neural network.

The network clot may refer to only some of the features of the feature map generated by layer 680(start_bypass). These features may be further processed by neural network 680 and/or by another bypass head.

Figure 32:
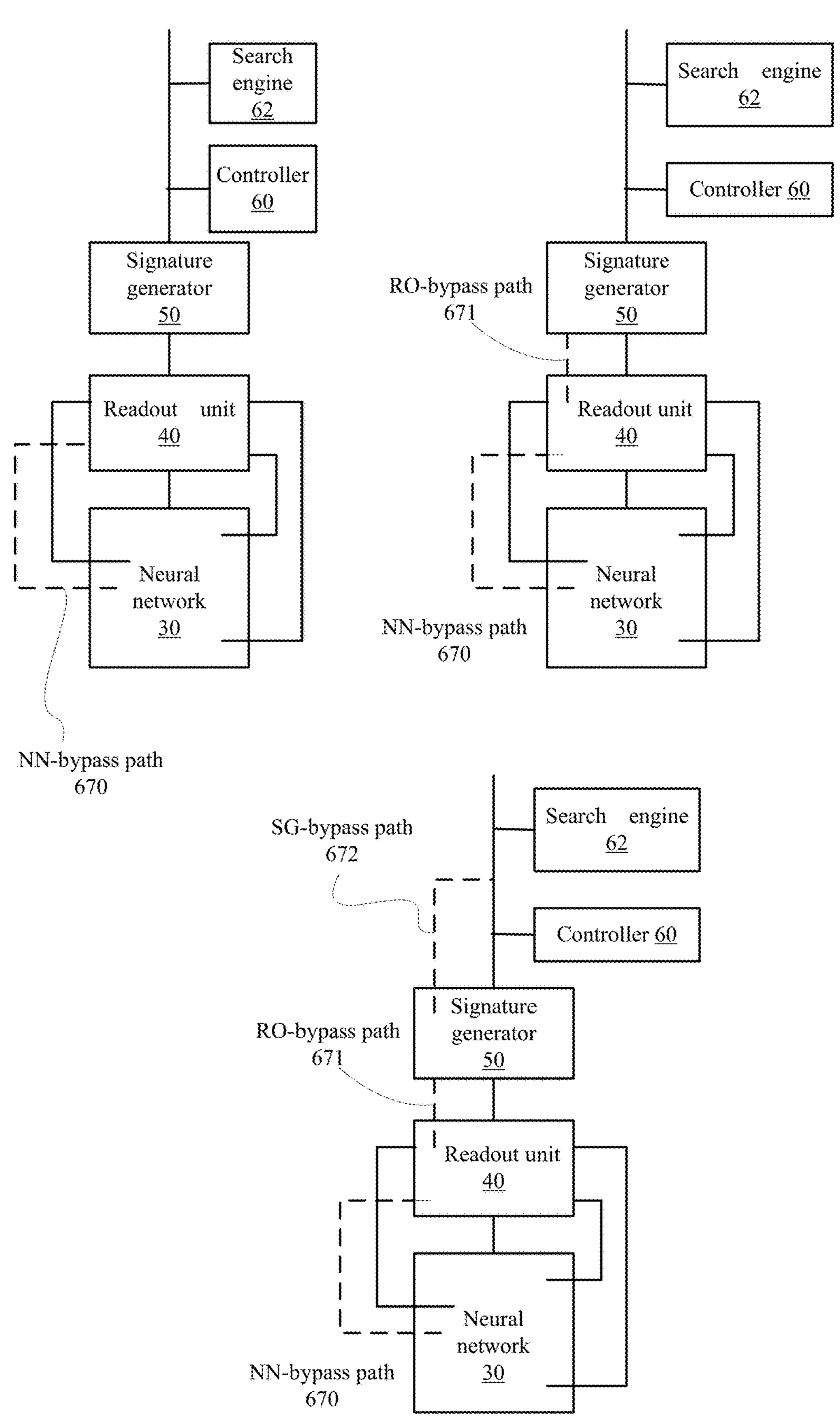

FIG. 32 illustrates examples of bypass paths such as NN-bypass path 70, readout circuit bypass path (RO-bypass path) for extracting readout information that differs from the readout information outputted from the readout unit (at an absence of the RO bypass path) and a signature generator bypass path (SG-bypass path 672) for generating a signature other than generated by the signature generator 50 (at the absence of the SG-bypass path).

Expanding False Positive and False Negative Capabilities

Supervised learning uses tagged images that identify objects captured in SIUs of training dataset that are fed to a machine learning process during training. Supervised learning is regarded as more accurate that unsupervised learning but more costly.

Another problem associated with supervised learning is that the training dataset may capture a limited number of objects—and identifying rare objects and/or rare scenarios that may lead to errors—is limited.

It should also be noted that the accuracy of machine learning processes may increase with an increase of the number of training SIUs and/or an increase of the number of objects captured by training SIUs.

There is a growing need to provide a solution that will increase the accuracy of object detection while benefiting from the benefits of both supervised and unsupervised learning.

FIG. 33 illustrates an example of method 400 for false positive (FP) and false negative (FN) detection.

According to an embodiment, method 400 includes step 410 of obtaining, by a controller, a group of first signatures, the first signatures being generated by a signature generator based on readout information provided by a readout circuit, the readout information being extracted from a deep neural network (DNN) that is fed by a first dataset of tagged sensed information units (SIUs). The tagged SIUs are associated with tags indicative of a content of the SIUs.

According to an embodiment, step 410 is followed by step 420 of detecting, by the signature controller and based on the tags, false positive (FP) first signatures of the group of first signatures and first false negative (FN) signatures of the group of first signatures.

According to an embodiment, method 400 includes step 430 of obtaining, by the signature controller, a group of second signatures that were generated by the signature generator based on readout information provided by the readout circuit, the readout information being extracted from the DNN that is fed by a second dataset of untagged SIUs.

According to an embodiment, step 420 and step 430 are followed by step 440 of (i) detecting, by the signature controller and based on similarities between the second signatures and the FP first signatures, FP second signatures of the group of second signatures, and (ii) detecting, by the signature controller and based on similarities between the second signatures and the FN first signatures, FN second signatures of the group of second signatures.

According to an embodiment, step 440 is followed by steps 450 and 460.

According to an embodiment, step 450 includes generating one or more FN clusters based on the FN first signatures and the FN second signatures, for use in at least partially autonomous driving.

According to an embodiment, step 460 includes generating one or more FP clusters based on the FP first signatures and the FP second signatures, for use in at least partially autonomous driving.

According to an embodiment, step 460 is followed by step 470 of generating one or more FP cluster signatures and generating one or more FN cluster signatures.

During inference, generated signatures may be compared to the one or more FP cluster signatures and generating one or more FN cluster signatures—to detect FP and/or FN.

Figure 34:
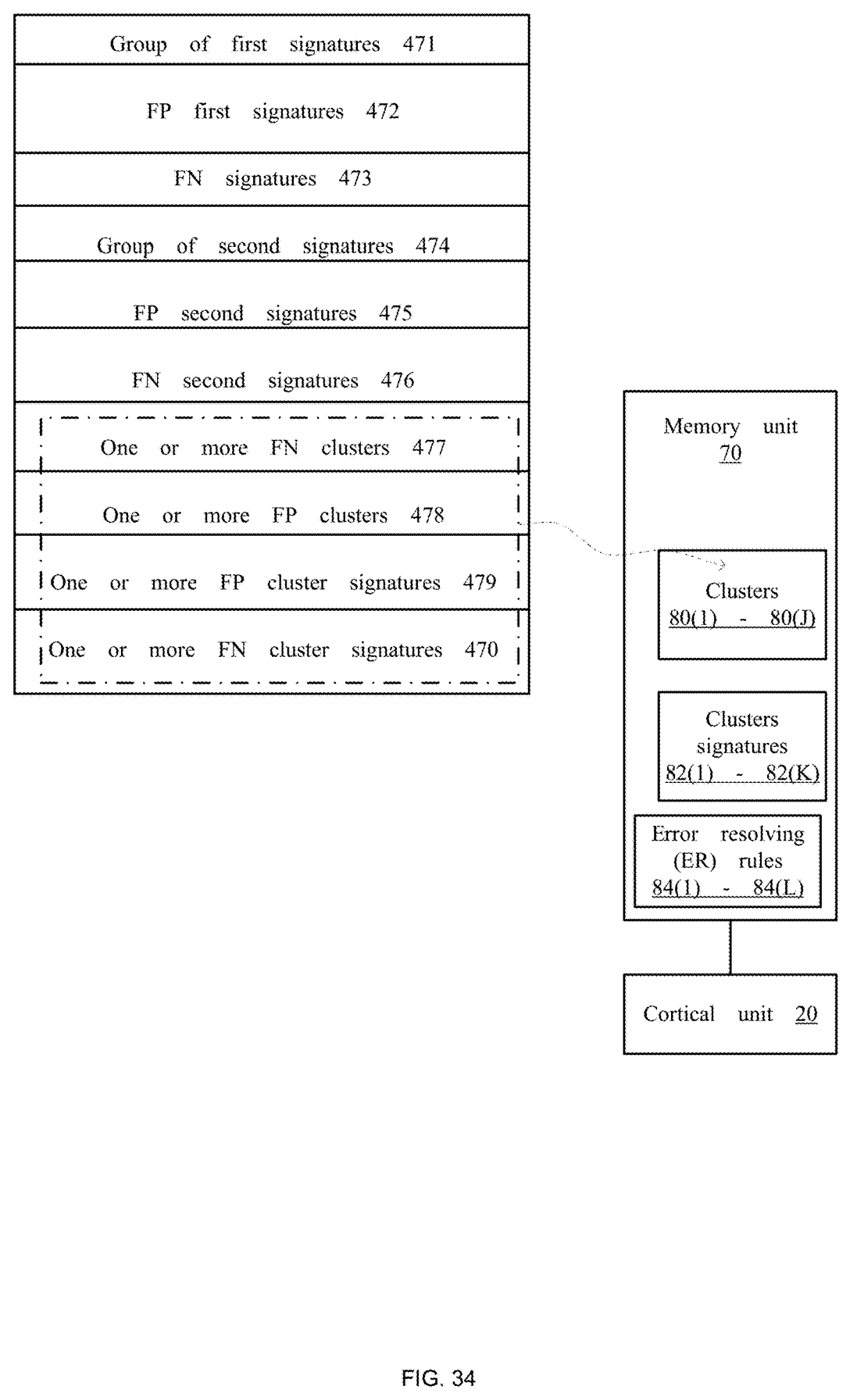

FIG. 34 illustrates an example of group of first signatures 471, FP first signatures 472, FN signatures 473, group of second signatures 474, FP second signatures 475, FN second signatures 476, one or more FN clusters 477, one or more FP clusters 478, one or more FP cluster signatures 479, one or more FN cluster signatures 470.

FIG. 34 also illustrates an example of memory unit 70 that stores at least the one or more FN clusters 477, one or more FP clusters 478, one or more FP cluster signatures 479, and the one or more FN cluster signatures 470.

FN cluster 477 and/or FP clusters 478 may be part of clusters 80(1)-80(J)—or may be provided in addition to clusters 80(1)-80(J).

One or more FP cluster signatures 479, and the one or more FN cluster signatures 470 may be a part of cluster signatures 82(1)-82(K) or may be provided in addition to cluster signatures 82(1)-82(K).

According to an embodiment, a detection of a signature generated by a cortical unit 20 to be FP or FN triggers an error correction step—such as anyone of adaptive steps (i) and/or adaptive step (ii) and/or adaptive step (iii).

Error Detection Based on Distance from Reference Signatures

One of the manners to improve the accuracy of the adaptable AI system is using prior knowledge of erroneous signatures for detecting erroneous signatures.

FIG. 35 illustrates an example of method 500 for improving an accuracy of a cortical unit that may be used for classification and/or for object detection.

According to an embodiment, method 500 starts by step 510 of obtaining a signature generated by a signature generator of a cortical unit, the signature represents at least a part of a sensed information unit (SIU).

According to an embodiment, step 510 is followed by step 520 of calculating a distance between the signature and one or more reference signatures that are associated with one or more classification errors. The classification errors may be false positive (FP), false negative (FN), and the like.

The distance can be calculated by any distance calculating method between vectors or tensors, and the like.

The distance can be calculated using similarity via a skewed metric that is determined based on an attention mechanism that tells us which coordinates are "more important" in each constant.

A signature may be calculated based on features related to a box or other shape.

According to an embodiment, FP signatures and/or FN signatures can be screed (ignored) based on one or more criteria such as size of the signature's box (making sure that are signature box is not too small), distance from an actual object, and also an unsupervised metric considering how well the signature "partitions" the training dataset into true positive signatures and false positive signatures.

According to an embodiment, the one or more reference signatures are one or more cluster signatures that represents one or more corresponding clusters of signatures.

Each cluster of signatures is associated with an error such as a classification error. Each cluster includes:

- First signatures that are determined, during a supervised learning process associated with at least partially autonomous driving, to be associated with the error.
- Second signatures that are generated during an unsupervised learning process for the autonomous driving scenario, and exhibit a defined similarity with the first signatures.

Clusters that are generated to include first signatures and second signatures benefit from generating the first signatures in a relatively resources-consuming process (supervised learning) and finding second signatures based on their similarity to the first signatures—while the second signatures are generated by low resource consuming process (unsupervised learning).

Using the second signatures—and especially clusters based on the first and second signatures—and using the distance criteria from the reference signature allows to detect errors that were not known at the time of the generation of the clusters.

According to an embodiment, step 520 is followed by step 530 of determining that the signature (obtained during step 510) is associated with the classification error when the distance does not exceed a distance threshold.

The distance to the reference signature may be determined in any manner—for example may be determined in an iterative manner.

Method 500 may be executed by a cortical unit.

Background Removal

Object detection may involve obtaining a SIU with one or more captured objects, and one or more bounding boxes that provide information about dimensions of the one or more captured objects.

A bounding box may surround an object—but this is not necessarily so as one or more small portions of the object may be located outside the bounding box. A popular bounding box generation process is known as YOLO™.

A neural network includes multiple layers. A layer may output multiple features—that may be arranged as a feature map that may be a tensor that includes multiple feature vector, each feature vector is associated with a cell of the layer.

A group of cells may be associated with a bounding box in the sense that the features generated by the group of cells are associated, at least in part, with content surrounded by the bounding box. In various cases the group of features also are indicative of content outside the bounding box—especially when the group of cells have an actual receptive field that exceeds the bounding box.

In order the increase the accuracy of a signature based on a group of cells it is desirable to virtually amend the receptive field of the group of cells to be a desired receptive field. The desired receptive field may match the bounding box, may be smaller than the bounding box, and the like.

FIG. 36 illustrates an example of method 600 of signature generation.

Method 600 refers to a bounding shape. The bounding shape may be a bounding box or have any shape—even a shape that differs from a box—circular, trapezoid, rectangular, a polygon with five or more facets, an ellipse, or any shape that includes non-linear portions and/or non-linear portions.

According to an embodiment, method 600 starts by step 610 of receiving readout information, by a signature generator, the readout information is provided by a readout circuit and was extracted from a deep neural network (DNN) that was fed by a processed sensed information unit (SIU). The processed SIU consists essentially of (i) SIU elements that are located within a region that is related to a bounding shape and has a desired receptive field, and (ii) padding SIU elements.

The SIU may be an image and a value of the padding SIU elements is determined based on values of pixels of training images that were used to train the deep NN.

The SIU may be an image and a value of the padding SIU elements equals a mean pixel value of training images that were used to train the deep NN.

The SIU may be an image, and the signatures are generated during a process for finding objects of one or more certain types. The padding SIU elements may represent content that is irrelevant to the finding of the objects of the certain kind. An irrelevant content is a content that does not include any object of the one or more certain types. Examples of a certain type may include a vehicle, a pedestrian, a movable road element, a statis road element, and the like.

According to an embodiment, step 610 is followed by step 620 of generating, by the signature generator and based on the readout information, a signature of the processed SIU for use in an at least partially autonomous driving of a vehicle.

Step 620 may include at least one of:

Identifying one or more feature vectors that are outputted by a layer of the deep NN that are associated with the bounding shape.

Generating the signature based on the one or more feature vectors.

According to an embodiment, method 600 includes receiving or generating the processed SIU.

The bounding shape is located at a location within the SIU.

According to an embodiment, the generating of the processed SIU includes positioning the bounding shape at the same location within the processed SIU.

For example—assuming that the bounding shape is a bounding box that is located at a center (r,c) (i.e. row r and column c) in the image with height h and width w.

The processed SIU will consist essentially of padding pixels and SIU elements that are located within a region that is located at the original location of the bounding box (centered at (r,c) width w and height h).

According to an embodiment, the generating of the processed SIU includes positioning the bounding shape at another location within the processed SIU.

According to an embodiment, the generating of the processed SIU includes calculating the other position based on a center of the bounding box within the SIU, a rows stride, a columns stride, a height of the feature map, and a width of the feature map.

For example—assuming that the bounding shape is a bounding box that is located at a center (r,c) (i.e. row r and column c) in the image with height h and width w.

The processed SIU will consist essentially of padding pixels and SIU elements that are located within a region that is located at the location that differs from the location of the bounding box in the original image.

The new center position is located as a new row (new_r) and at a new column (new_c).

$$\text{new\_r} = \text{int}(\text{ceil}(H'/2.0-1)*\text{s\_r}+\text{int}(0.5*\text{s\_r}))$$

$$\text{new\_c} = \text{int}(\text{ceil}(W'/2.0-1)*\text{s\_c}+\text{int}(0.5*\text{s\_c})).$$

Whereas the selected layer feature map has a height H', width W' and depth D.

FIG. 37 illustrates an image 690 that captures an object 691 associated with bounding box 692, whereas the bounding box 692 has an actual receptive field 693 and a desired receptive field 694. In FIG. 37, a pedestrian 623 is caught by the actual receptive field but not by the desired receptive field.

FIG. 37 also illustrates a processed image 695 that includes padding elements 696, and relevant content 697 delimited by the desired receptive field 694. The position of the relevant content corresponds to the location of the desired respective field of image 690.

FIG. 37 further illustrates a processed image 695' that includes padding elements 696', and relevant content 697' delimited by the desired receptive field 694. The position of the relevant content differs from the location of the desired respective field of image 690.

Figure 38:
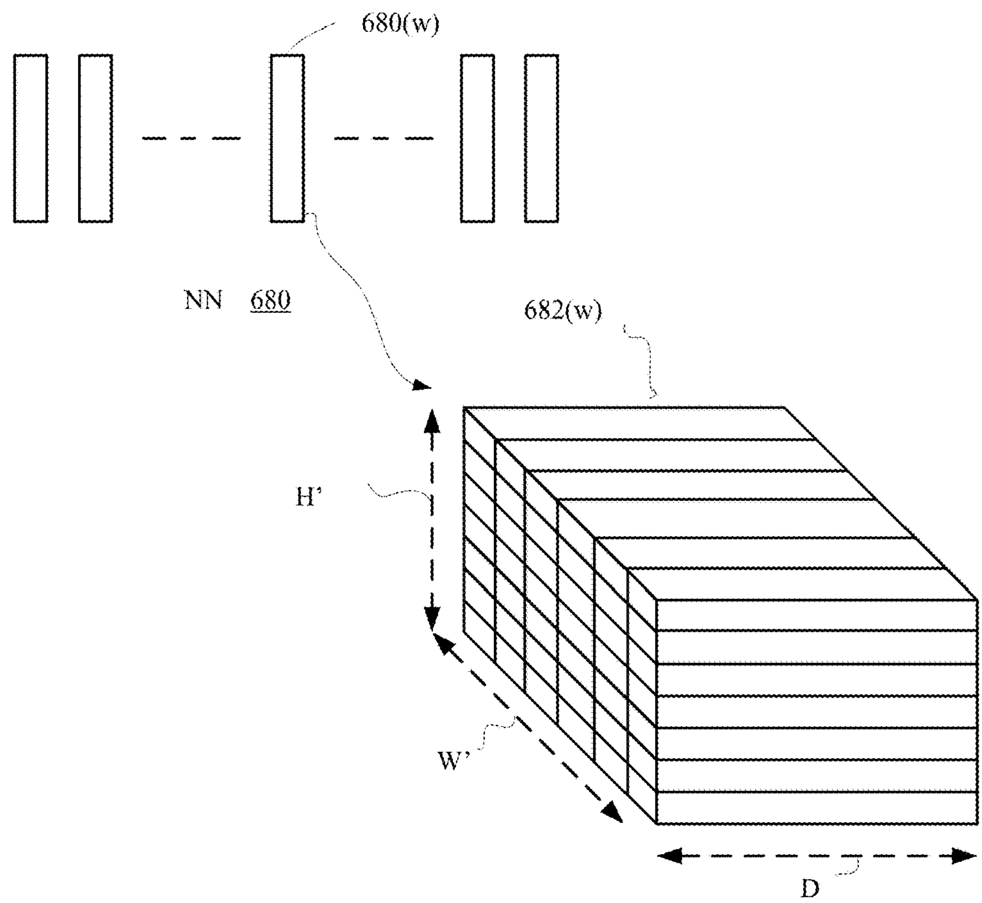
FIG. 38 illustrates an example of a neural network and a feature map.

FIG. 38 illustrates a layer 680($w$) of a neural network 680 and a feature map 682($w$) that includes H' by W' cells—each includes a feature vector of depth D, and also illustrates the feature vectors associated with the bounding box.

According to an embodiment, the generation of the signature (step 620) triggers a search for one or more matching clusters, whereas finding one or more matching clusters provides information about the object associated with the bounding shape.

The information about the object may trigger a determination of or an execution of a driving related operation.

According to an embodiment, method 600 includes at least one of:

- Triggering a searching for a matching cluster.
- Searching for a matching cluster.
- Determining object information based on an outcome of the search.
- Triggering a determining object information based on an outcome of the search.
- Triggering a determining an at least partially autonomous driving related operation based at least in part on the object information.
- Determining an at least partially autonomous driving related operation based at least in part on the object information.
- Performing an at least partially autonomous driving related operation based at least in part on the object information.
- Triggering a performing an at least partially autonomous driving related operation based at least in part on the object information Changing a Configuration of a Sensing Unit According to an embodiment, and as illustrated in FIG. 5, the adaptive AI system is configured to solve an error by performing adaptive step (iii) of adapting another unit that is part of a path of receiving radiation (heat, light, or any other sensed radiation), converting the radiation to detection signals and generating a SIU. The other unit may be a sensing unit.

Referring back to FIG. 5—one or more sensing parameters of a sensing unit 70 are adapted. The sensing unit 70 is illustrated in FIG. 5 as including optics 70-1, sensing elements 70-2, and signal processor 70-3. Any parameter of the sensing unit may be adapted during adapted step (iii). For example—focus of the sensor, focal length, depth of field of the sensor, an exposure period of the sensor, dynamic range, sensitivity, filtering process, readout process, noise reduction algorithm, one or more sensing elements to take into account, and the like.

The manner in which a sensing unit parameter should changes may be determined in at least one of the following manners:

- Finding that a signature is erroneous and performing trial and error iterations that differ from each other by the values of one or more sensing unit parameters—until resolving the error.
- Finding that the signature is erroneous, analyzing acquired SIUs associated with the error and determine one or more object acquisition related parameters regarding an object associated with the error (for example distance of object from the camera) and sensing unit parameters related to the capture of these images.
- Given the analysis results—perform trial and error iterations based on the analysis results—for example locally searching for sensing unit parameters around the used sensing unit parameters and/or locally searching for sensing unit parameters that are related to one or more object acquisition related parameters, for example—amending the focus to fall on the distance from the object, and the like.
- Given the analysis results, performing an analysis to determine the sensing unit parameters that once used will resolve the error.

It should be noted that the learning may be based on a machine learning process or may not be based on a machine learning process.

Figure 39:
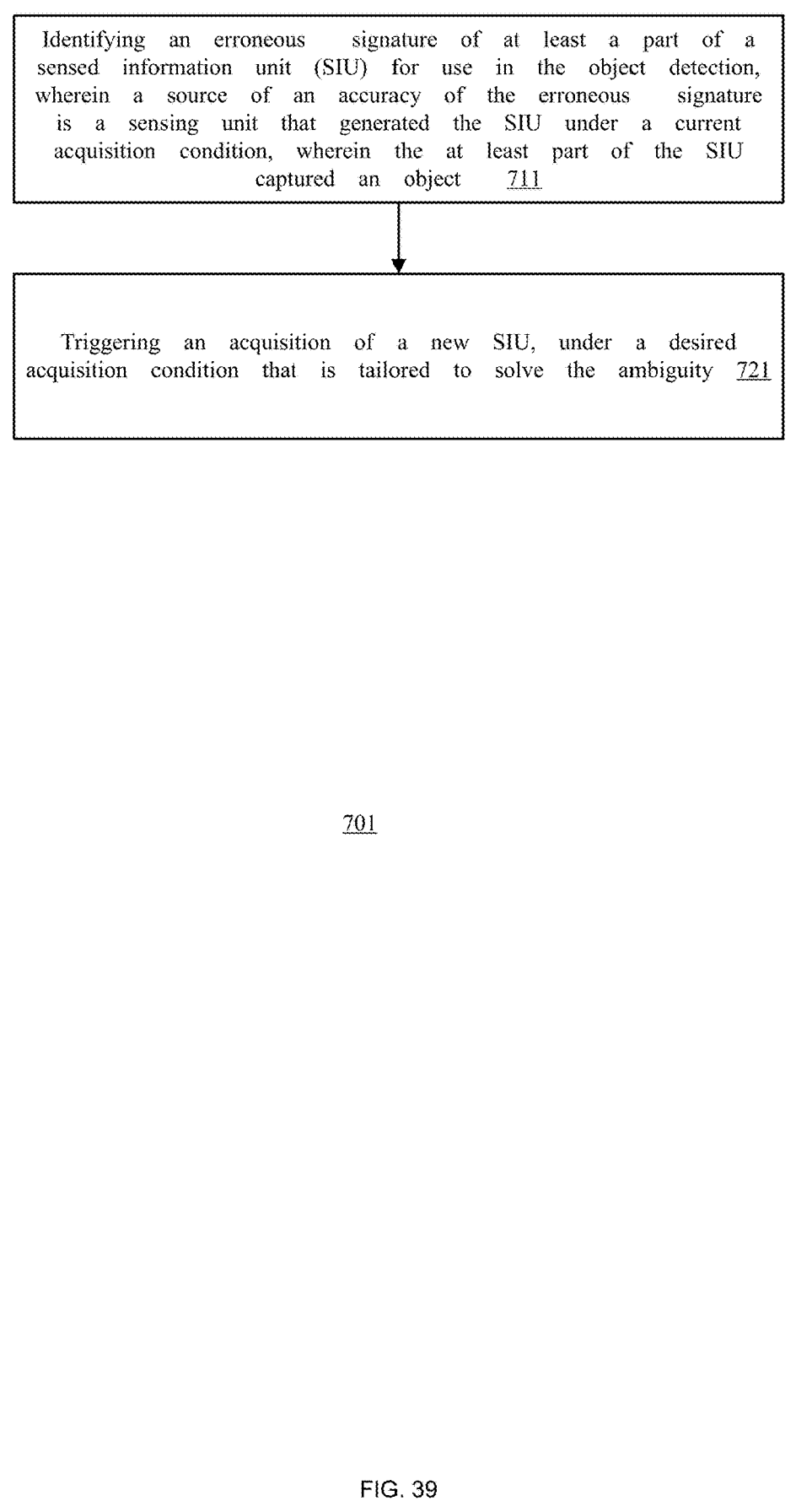

FIG. 39 illustrates an example of method 701 of improving an accuracy of object detection.

According to an embodiment, method 701 includes step 711 of identifying an erroneous signature of at least a part of a sensed information unit (SIU) for use in the object detection, wherein a source of an error of the erroneous signature is a sensing unit that generated the SIU under a current acquisition condition, wherein the at least part of the SIU captured an object.

According to an embodiment, step 711 is followed by step 721 of triggering an acquisition of a new SIU, under a desired acquisition condition that is tailored to solve the error.

According to an embodiment, step 711 include accessing an erroneous signature s data structure that stores information about erroneous signature s and error solving measures associated with the erroneous signature s. An example of an erroneous signature data structure is the error resolving rules (denoted 84(1)-84(L)-especially other ER rules 86(1)-86(N) that includes rules for changing sensing unit parameters).

According to an embodiment, the wherein one or more error solving measures of the error solving measures involve applying, by the sensing unit, desired acquisition conditions.

According to an embodiment, one or more error solving measures of the error solving measures do not involve applying, by the sensing unit, desired acquisition conditions. See, for example routing rules (denoted 85(1)-85(M) in FIG. 1) that involve selecting a part of an adaptable AI system that is dedicated to solving an error of a certain erroneous signature.

Changing a Signature

According to an embodiment, and as illustrated in FIG. 1, the adaptive AI system is configured to solve an error by performing adaptive step (ii) of changing one or more signatures used for object detection. The change may be applied during training or adjusting of the adaptable AI system. Once the adapted signature is provided—it is used during inference.

According to an embodiment, the signatures to be changes is a cluster signature (see, for example cluster signatures 81(1)-82(K) of FIG. 1 that represent clusters 80(1)-80(J)).

A cluster is generated by clustering signatures. The cluster signature is defined to identify signatures that belong to the cluster while not identifying signatures that belong to other clusters.

The signatures of the clusters are generated by processing one or more datasets of SIUs—especially generating signatures that represent the one or more datasets. Accordingly—the signatures are impacted by the content of the one or more datasets.

A cluster is expected to identify a desired content (for example—an object, a scene, an object under one or more situations), but the SIUs that are represented by the signatures of the clusters may include an undesired content (for example another object) that may introduce error—as the cluster signature may identify both the desired content and both the undesired content—in a manner that at some SIUs the cluster will identify the desired content and at some other SIUs the cluster will identify the undesired object.

According to an embodiment, the error may be solved by amending the cluster signature to identify the desired content, not identify the unidentified content—while maintaining its capability to identify signatures that belong to the cluster while not identifying signatures that belong to other clusters.

The amendment of the cluster signature includes compressing the cluster signature.

Figure 40:
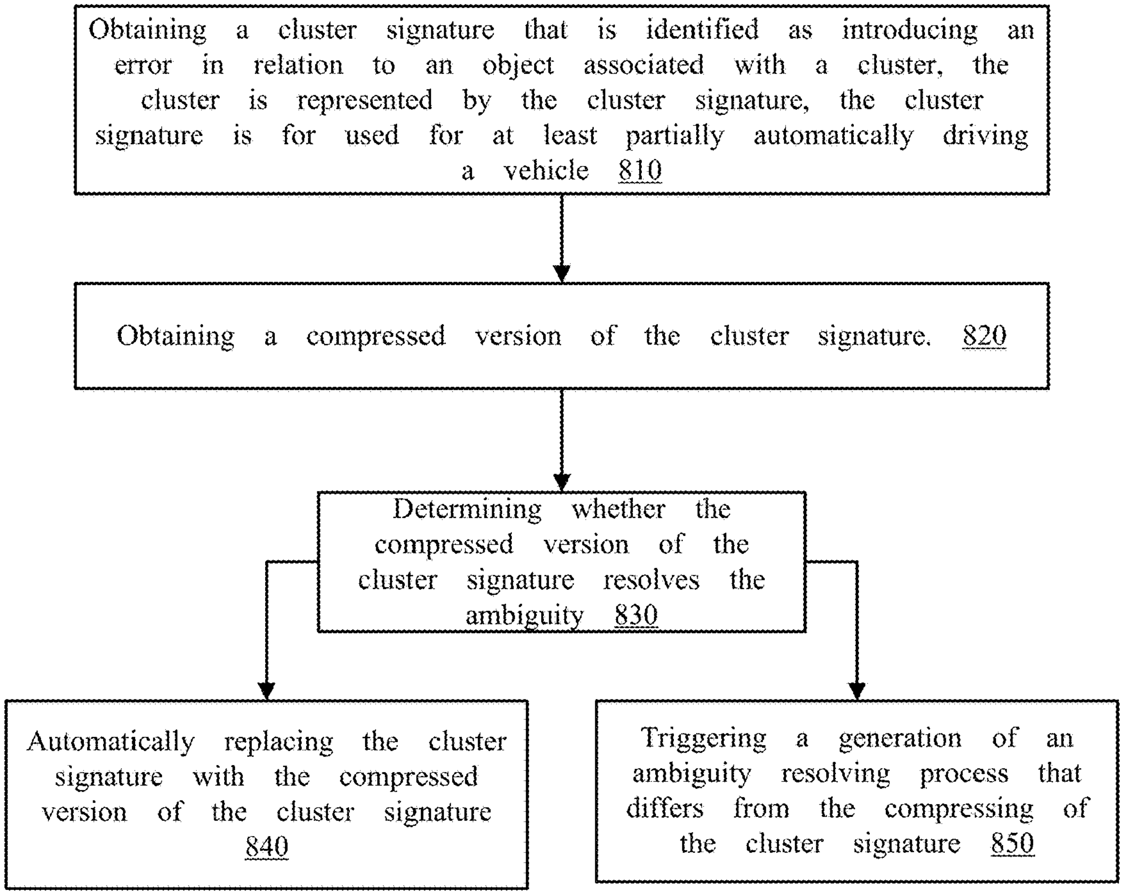

FIG. 40 illustrates an example of method 800 of solving ambiguities related to an object captured in a sensed information unit.

According to an embodiment, method 800 includes step 810 of obtaining a cluster signature that is identified as introducing an error in relation to an object associated with a cluster, the cluster is represented by the cluster signature, the cluster signature is for used for at least partially automatically driving a vehicle.

According to an embodiment, step 810 is followed by step 820 of obtaining a compressed version of the cluster signature.

According to an embodiment, step 820 is followed by step 830 of determining whether the compressed version of the cluster signature resolves the error.

According to an embodiment, step 830 also includes determining that the compressed version of the cluster signature maintains its capability to identify signatures that belong to the cluster while not identifying signatures that belong to other clusters.

According to an embodiment, step 830 is followed by step 840 of automatically replacing the cluster signature with the compressed version of the cluster signature, when it is determined that the compressed version of the cluster signature resolves the error of the signature.

According to an embodiment, step 830 is followed by step 850 of triggering a generation of an error resolving process that differs from the compressing of the cluster signature, when it is determined that the compressed version of the cluster signature does not resolve the error.

According to an embodiment, the error resolving process may involve performing adaptive step (i) and/or adaptive step (iii).

According to an embodiment, method 800 includes executing the error resolving process.

According to an embodiment, the cluster signature is calculated based on object signatures of the cluster, wherein the object signatures are generated by a signature generator that was fed with readout information provided by a readout circuit, the readout information was extracted from a deep neural network (DNN).

According to an embodiment, method 800 includes identifying the cluster signature as introducing the error.

According to an embodiment, the cluster signature includes cluster signature elements, and step 820 includes reducing a number of cluster signature elements. According to an embodiment, the cluster signature elements are indexes for retrieving values that are intermediate results of a signature generation process.

According to an embodiment, step 820 includes reducing a number of non-zero cluster signature elements.

According to an embodiment, the cluster signature was generated by an object detection process, and step 850 includes triggering a generation of another object detection process for managing a detection of the object.

Homologation

Homologation refers to the process taken to certify that a vehicle is manufactured to meet the standards for sale—technically, all vehicles are homologated.

Each time some parameter of aspect of the software of the vehicle—especially object detection software and/or autonomous driving and/or ADAS is amended—the software has to installed in the vehicle and the vehicle must undergo the homologation—which is a tedious and time consuming process in which a vehicle is tested under a vast number of scenarios—to make sure that the vehicle operates in a safe and desired manner. This can take months.

According to an embodiment, there is provided an extremely efficient and fast homologation—in which any signature generated by the adaptable AI system is instantly tested. Performing a signature based test, especially given the extensive amount of information the adaptable AI system develops over time—is fast (can be done in real time), can be done remotely and is highly accurate and resource efficient.

Figure 41:
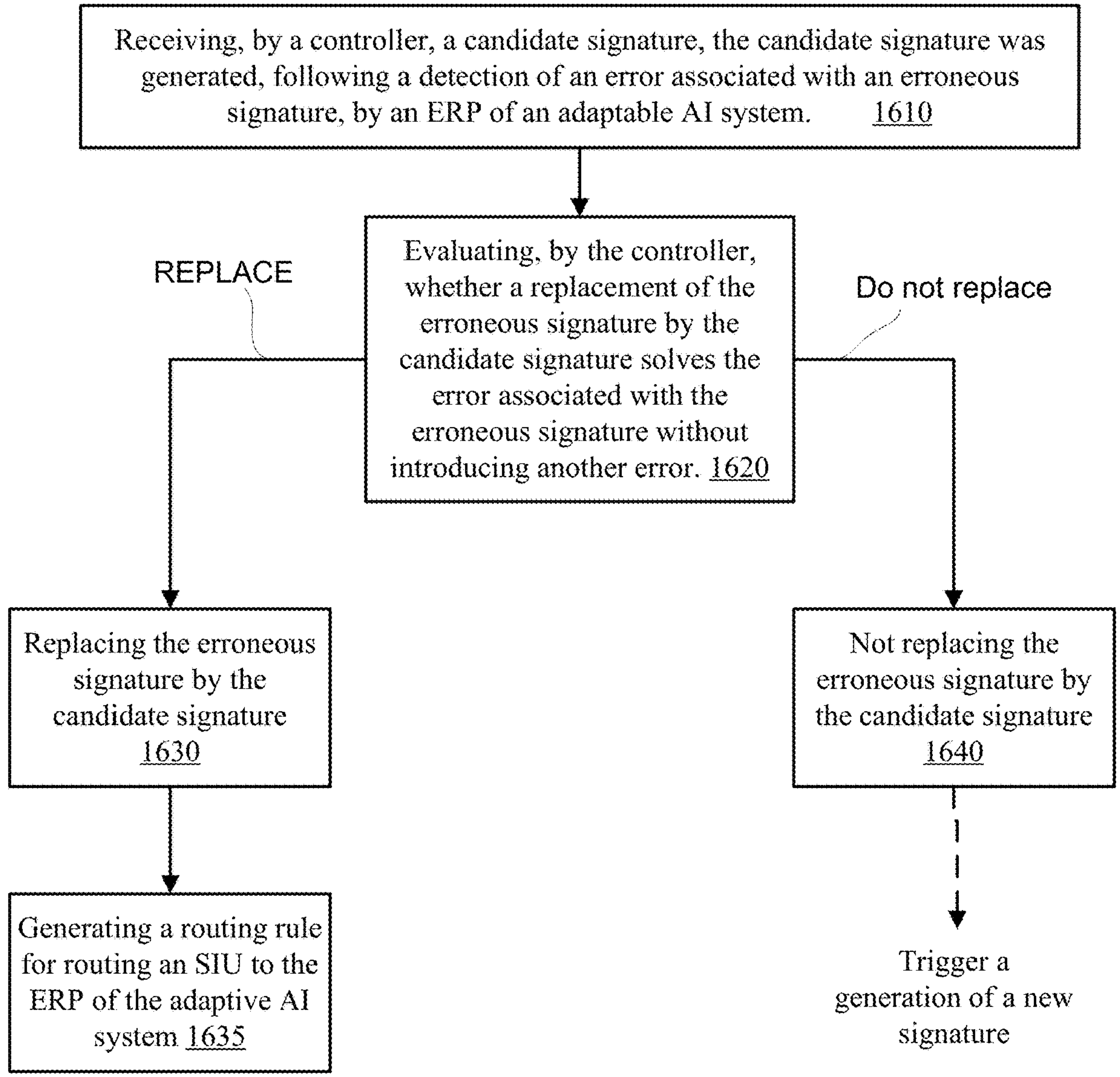

FIG. 41 illustrates an example of method 1600 for homologation.

According to an embodiment, method 1600 start by step 1610 of receiving, by a controller, a candidate signature, the candidate signature was generated, following a detection of an error associated with an erroneous signature, by an ERP of an adaptable artificial intelligence (AI) system.

According to an embodiment, step 1610 is followed by step 1620 of evaluating, by the controller, whether a replacement of the erroneous signature by the candidate signature solves the error associated with the erroneous signature without introducing another error.

According to an embodiment, step 1620 includes performing an object detection process using the candidate signature and analyzing an outcome of the object detection process.

According to an embodiment, step 1620 includes comparing (a) a FP ratio (FPR(candidate)) and a FN ratio (FNR(candidate)) obtained when using the candidate signature to (b) a FP ratio (FPR(err)) and a FN ratio (FN(err)) obtained when using the erroneous signature.

According to an embodiment:

- determining not to replace when FPR(err)<FPR(candidate).
- determining not to replace when FNR(err)<FNR(candidate).
- determining not to replace when (FPR(err)+FNR(err))<(FPR(candidate)+FNR(candidate)).

According to an embodiment, determining not to replace the erroneous signature by the candidate signature when finding that using the candidate signature introduces an error in a previously accurate detection of an object According to an embodiment, when evaluating that the replacement of the erroneous signature by the candidate signature solves the error associated with the erroneous signature without introducing another error—step 1620 is followed by step 1630 of replacing the erroneous signature by the candidate signature.

According to an embodiment, the erroneous signature was generated by another part of the adaptable AI system. Step 1630 may be followed by step 1635 of generating a routing rule for routing an SIU to the ERP of the adaptive AI system. The other part of the adaptable AI system generates the erroneous signature following a reception of the SIU.

According to an embodiment, when evaluating that the replacement of the erroneous signature by the candidate signature does not solve the error associated with the erroneous signature and/or introduces another error—step 1610 is followed by step 1640 of not replacing the erroneous signature by the candidate signature.

According to an embodiment, step 1630 is followed by triggering a generation of another candidate signature—for at least a predefined number of iterations. Step 1640 is followed (following the generation of the other candidate signature) by step 1610.

According to an embodiment, the evaluation of signatures is not limited to candidate signatures and/or to replacement of erroneous signatures.

Figure 43:
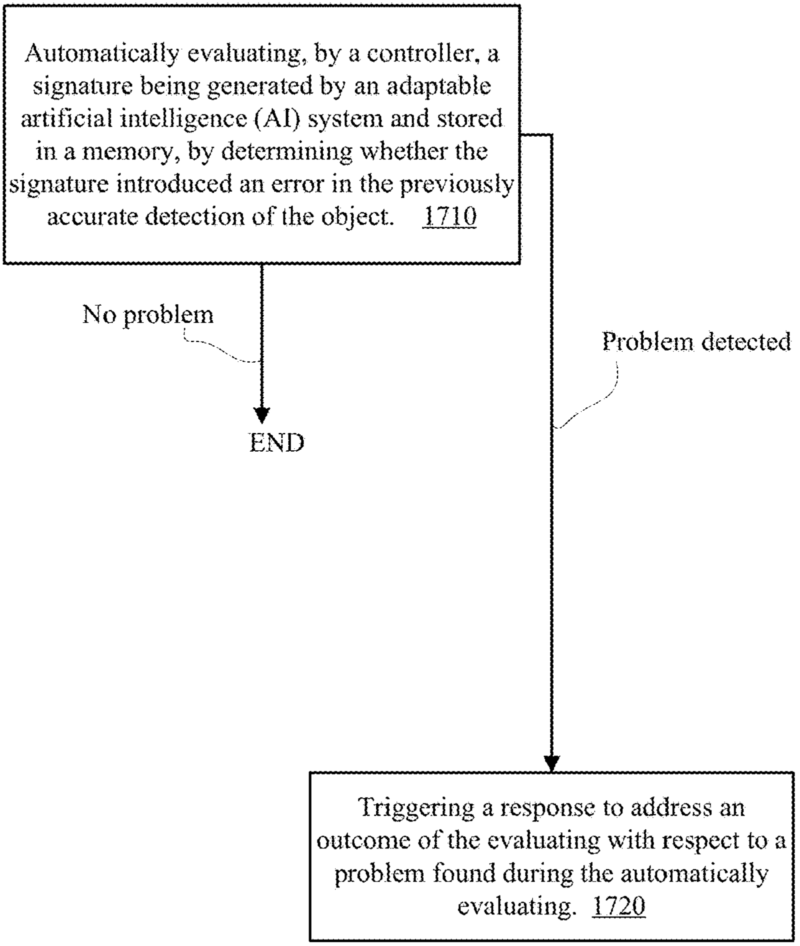

FIG. 43 illustrates an example of a method 1700 for automatically validating of signatures for object detection.

The automatic validation is signature based and can be done in real time—which improving the safety of the vehicle in a virtually effortless manner.

According to an embodiment, method 1700 includes step 1710 of automatically evaluating, by a controller, a signature being generated by an adaptable artificial intelligence (AI) system and stored in a memory, by determining whether the signature introduce an error in the previously accurate detection of the object (the same object identified by the signature—or another object).

According to an embodiment, a detection of an object (for example during inference) includes comparing a signature (evaluated signature) generated by the adaptable AI system to multiple reference signatures stored in the memory (such as cluster signatures). The reference signatures may include "accurate" (or OK or Good) reference signatures. The reference signatures may include erroneous signatures. Any rule or decision for object detection may be used—including taking into account the similarity or match between the evaluated signature and the multiple reference signatures (or some of the reference signatures). For example—in order to detect an object there may be a need that at least a predefined number (and/or a predefined percent) of reference signatures are similar to the evaluated signature, yet another rule may require that a matching signatures (of the reference signature) is different by at least a predefined distance from other reference signatures associated with other signatures, and the like. The signature (that is evaluated during step 1710) may introduced an error to the detection—as it adds new information to the detection of the object. For example—the signature increases the overall number of signatures and this may decrease a weight assigned to another signature—leading to an error.

According to an embodiment, when a problem is found, step 1710 is followed by step 1720 of triggering a response to address an outcome of the evaluating with respect to a problem found during the automatically evaluating.

According to an embodiment, the response comprises amending the error in the previously accurate detection of the object.

According to an embodiment, the response comprises amending or replacing the signature.

According to an embodiment, step 1710 includes concurrently evaluating the signature and additional signatures being generated by the adaptable AI system. This reduces the time required to check many signatures.

According to an embodiment, step 1710 includes determining whether the signature accurately identifies objects that are similar to an object associated with the signature.

According to an embodiment, step 1710 is triggered with a storing of the signature in the memory. There may be a time gap between the storing and the triggering.

According to an embodiment, method 1700 is performed as part of a verification and validation process used in automotive testing.

According to an embodiment, the signatures are indicative of an environment of a vehicle.

According to an embodiment, step 1710 is executed during a driving of the vehicle. The signature may be transmitted to a remote computerized system for evaluation—or may be evaluated within the vehicle.

According to an embodiment, the signature is a candidate signature that was generated, following a detection of an error associated with an erroneous signature, by an error resolving part of the adaptable AI system.

According to an embodiment, step 1720 may include executing steps 1630, 1635 of 1640 or triggering an execution of steps 1630, 1635 and/or step 1640.

- For example—the response may include not replacing the erroneous signature by the candidate signature when finding that the signature candidate did introduce an error in the previously accurate detection of the object.
- For example—the response may include (a) replacing the erroneous signature by the candidate signature when finding that the signature candidate did not introduce an error in the previously accurate detection of the object, and (b) generating a routing rule for routing a sensed information unit (SIU) to the error resolving part of the adaptive AI system, when the other part of the adaptable AI system generates the erroneous signature following a reception of the SIU.
- For example—the response may include not replacing the erroneous signature by the candidate signature when finding that the signature fails to accurately identify objects that are similar to an object associated with the signature.

According to an embodiment, there is provided a method that is computer implemented and is for solving inaccuracies associated with object detection, the method includes (i) automatically evaluating, by a controller, an accuracy of signatures for use in the object detection, the signatures were generated by an adaptable artificial intelligence (AI) system.

When finding an erroneous signature of the signatures, by the controller, triggering a generation of (a) a narrow AI agent configured to solve an error associated with the erroneous signature and (b) a router that routes a sensed information unit (SIU) associated with the erroneous signature to the narrow AI agent, wherein the erroneous signature, when used for the object detection, results in an object detection error.

According to an embodiment, the narrow AI agent is configured to solve the error by generating an accurate signature instead of the erroneous signature.

According to an embodiment, the method further includes—when finding an additional erroneous signature of the signatures, by the controller, triggering a generation of (a) an additional narrow AI agent configured to solve an error associated with the additional erroneous signature and (b) an additional router that routes an additional SIU associated with the additional erroneous signature to the additional narrow AI agent, wherein the additional erroneous signature, when used for the object detection, results in an additional object detection error.

According to an embodiment, the erroneous signature was generated by a signature generator of the adaptable AI system, based on readout information, the readout information was provided by a readout circuit and was extracted from a deep neural network (DNN) that was fed by the SIU.

According to an embodiment, the method further includes triggering a sending of the SIU to the error resolving part of the adaptable AI system.

According to an embodiment, the method further includes generating the error resolving part.

According to an embodiment, the method further includes generating an error resolving rule that associates the erroneous signature with the error resolving part.

According to an embodiment, the method further includes sending the SIU to the error resolving part of the adaptable AI system.

According to an embodiment, the erroneous signature is an ambiguous signature that when used for the object detection, results in inconsistent detection of objects.

According to an embodiment, the erroneous signature when used for the object detection, results in at least one of false negative detections or false positive detection.

According to an embodiment, there is provided a non-transitory computer readable medium storing instructions that, when executed by at least one processor, cause the at least one processor to perform operations for solving inaccuracies associated with object detection, includes: (i) automatically evaluating, by a controller, an accuracy of signatures for use in the object detection, the signatures were generated by an adaptable artificial intelligence (AI) system. (ii) When finding an erroneous signature of the signatures, by the controller, triggering a generation of (a) a narrow AI agent configured to solve an error associated with the erroneous signature and (b) a router that routes a sensed information unit (SIU) associated with the erroneous signature to the narrow AI agent, wherein the erroneous signature, when used for the object detection, results in an object detection error.

According to an embodiment, there is provided a method that is computer implemented and is for object detection at a presence of inaccuracies, the method includes (i) receiving, by a controller, a signature of a sensed information unit (SIU) by a part of a modifiable artificial intelligence (AI) system; (ii) detecting that the signature is an erroneous signature, according to an error resolving rule; and (iii) invoking a routing of the SIU to a narrow AI agent that was trained to amend an error associated with the erroneous signature.

According to an embodiment, the method further includes the routing of the SIU to the narrow AI agent that was trained to amend the error associated with the erroneous signature.

According to an embodiment, the narrow AI agent is configured to solve the error by generating an accurate signature instead of the erroneous signature. According to an embodiment, the method further includes receiving, by a controller, an additional signature of an additional SIU by a part of the modifiable AI system; detecting that the additional signature is an additional erroneous signature, according to an additional error resolving rule; and invoking a routing of the additional SIU to an additional narrow AI agent that was trained to amend an error associated with the additional erroneous signature.

According to an embodiment, the erroneous signature was generated by a signature generator of the adaptable AI system, based on readout information, the readout information was provided by a readout circuit and was extracted from a deep neural network (DNN) that was fed by the SIU.

According to an embodiment, the erroneous signature is an ambiguous signature that when used for the object detection, results in inconsistent detection of objects.

According to an embodiment, the erroneous signature when used for the object detection, results in at least one out of false negative detection or false positive detection.

According to an embodiment, there is provided a non-transitory computer readable medium storing instructions that, when executed by at least one processor, cause the at least one processor to perform operations for object detection at a presence of inaccuracies, includes receiving, by a controller, a signature of a sensed information unit (SIU) by a part of a modifiable artificial intelligence (AI) system; detecting that the signature is an erroneous signature, according to an error resolving rule; and invoking a routing of the SIU to a narrow AI agent that was trained to amend an error associated with the erroneous signature.

According to an embodiment, there is provided a method that is computer implemented and is for improving an accuracy of a deep neural network (DNN) used for classification, the method includes identifying an error source within the DNN, wherein the DNN represents a deep learning model used for at least partially autonomous driving; and triggering a generation of a bypass path that bypasses the errors source.

According to an embodiment, the error source is selected out of a false positive (FP) error source and a false negative (FN) error source.

According to an embodiment, the identifying includes evaluating an accuracy of features generated by each DNN layer of a group of DNN layers of the DNN.

According to an embodiment, for each DNN layer of the group of DNN layers, the evaluating of the accuracy of the features includes triggering a building a classifier based on the features generated by the DNN layer and triggering an evaluating of an accuracy of the classifier.

According to an embodiment, for each DNN layer of the group of DNN layers, the evaluating of the accuracy of the features includes building a classifier based on the features generated by the DNN layer and evaluating of an accuracy of the classifier.

According to an embodiment, the method includes wherein the generating of the bypass paths includes determining a bypass readout location for reading out information from the DNN, the bypass readout location precedes the error source.

According to an embodiment, the method further includes triggering a generation of a bypass path that starts at the bypass readout location.

According to an embodiment, the bypass path includes a DNN bypass portion.

According to an embodiment, the bypass path includes a readout unit bypass portion.

According to an embodiment, the bypass path includes a readout unit bypass portion and a signal generator bypass portion.

According to an embodiment, the error source is an ambiguous signature error source that introduces ambiguity that results in inconsistent detection of objects.

According to an embodiment, there is provided a non-transitory computer readable medium storing instructions that, when executed by at least one processor, cause the at least one processor to perform operations for improving an accuracy of a deep neural network (DNN) used for classification, includes (i) identifying an error source within the DNN, wherein the DNN represents a deep learning model used for at least partially autonomous driving; and (ii) triggering a generation of a bypass path that bypasses the errors source.

According to an embodiment, there is provided a method that is computer implemented for improving an accuracy of a neural network (NN) used for classification, the method includes (a) obtaining a signature generated by a signature generator, the signature represents at least a part of a sensed information unit (SIU); (b) calculating, by a controller, a distance between the signature and a reference signature that is associated with an error; and determining, by the controller, that the signature is associated with the error when the distance does not exceed a distance threshold; (c) wherein the reference signature is a cluster signature that represents a cluster of signatures, the cluster of signatures includes (i) first signatures that are determined, during a supervised learning process associated with at least partially autonomous driving, to be associated with the error; and (ii) second signatures that are generated during an unsupervised learning process for the autonomous driving scenario, and exhibit a defined similarity with the first signatures.

According to an embodiment, the error is a false positive (FP) error.

According to an embodiment, the error is a false negative (FN) error.

According to an embodiment, the error is an ambiguity error.

According to an embodiment, an overall size of first training information utilized during the supervised learning process is less than fifty percent of an overall size of second training information utilized during the unsupervised learning process.

According to an embodiment, the method further includes triggering one or more error resolving steps when determining that the signature is associated with the error.

According to an embodiment, the method further includes triggering a generation of an error resolving part of the adaptable AI system when determining that the signature is associated with the error.

According to an embodiment, the signature was generated by the signature generator based on readout information, the readout information was provided by a readout circuit and was extracted from a deep neural network (DNN) that was fed by the SIU.

According to an embodiment, the method further includes generating the cluster of signatures.

A non-transitory computer readable medium storing instructions that, when executed by at least one processor, cause the at least one processor to perform operations for improving an accuracy of a neural network (NN) used for classification, includes: obtaining a signature generated by a signature generator, the signature represents at least a part of a sensed information unit (SIU); calculating, by a controller, a distance between the signature and a reference signature that is associated with an error; and determining, by the controller, that the signature is associated with the error when the distance does not exceed a distance threshold. The reference signature is a cluster signature that represents a cluster of signatures, the cluster of signatures includes (i) first signatures that are determined, during a supervised learning process associated with at least partially autonomous driving, to be associated with the error; and (ii) second signatures that are generated during an unsupervised learning process for the autonomous driving scenario, and exhibit a defined similarity with the first signatures.

According to an embodiment, there is provided a method that is computer implemented and is for signature generation, the method includes: receiving readout information, by a signature generator, the readout information is provided by a readout circuit and was extracted from a deep neural network (DNN) that was fed by a processed sensed information unit (SIU); wherein the processed SIU consists essentially of (i) SIU elements that are located within a region that is related to a bounding shape and has a desired receptive field, and (ii) padding SIU elements; and generating, by the signature generator and based on the readout information, a signature of the processed SIU for use in an at least partially autonomous driving of a vehicle.

According to an embodiment, the generating of the signature includes identifying one or more feature vectors outputted by a layer of the deep NN, the feature vectors are associated with the bounding shape.

According to an embodiment, the identifying is followed by determining the signature based on the one or more identified feature vectors.

According to an embodiment, a receptive field of the one or more feature vectors exceeds the bounding box.

According to an embodiment, the bounding shape is located at a location within the SIU, wherein the generating of the processed SIU includes positioning the bounding shape at a same location within the processed SIU.

According to an embodiment, the bounding shape is located at a location within the SIU, wherein the generating of the processed SIU includes positioning the bounding shape at another location within the processed SIU.

According to an embodiment, the method further includes calculating the other position based on a center of the bounding box within the SIU, a rows stride, a columns stride, a height of the feature map, and a width of the feature map.

According to an embodiment, the SIU is an image and a value of the padding SIU elements is determined based on values of pixels of training images that were used to train the deep NN.

According to an embodiment, the SIU is an image and a value of the padding SIU elements equals a mean pixel value of training images that were used to train the deep NN.

According to an embodiment, the signature generation is executed during a search for one or more objects of one or more types; wherein the padding SIU elements represent content that differs from any object of the one or more types.

According to an embodiment, there is provided a non-transitory computer readable medium storing instructions that, when executed by at least one processor, cause the at least one processor to perform operations for signature generation, includes (a) receiving readout information, by a signature generator, the readout information is provided by a readout circuit and was extracted from a deep neural network (DNN) that was fed by a processed sensed information unit (SIU); wherein the processed SIU consists essentially of (i) SIU elements that are located within a region that is related to a bounding shape and has a desired receptive field, and (ii) padding SIU elements; and (b) generating, by the signature generator and based on the readout information, a signature of the processed SIU for use in an at least partially autonomous driving of a vehicle.

According to an embodiment, there is provided a method that is computer implemented and for homologation, the method includes: (a) receiving, by a controller, a candidate signature, the candidate signature was generated, following a detection of an error associated with an erroneous signature, by an error resolving part of an adaptable artificial intelligence (AI) system; (b) evaluating, by the controller, whether a replacement of the erroneous signature by the candidate signature solves the error associated with the erroneous signature without introducing another error; and (c) replacing the erroneous signature by the candidate signature when finding that the replacement of the erroneous signature by the candidate signature solves the error associated with the erroneous signature without introducing the other error.

According to an embodiment, the method further includes not replacing the erroneous signature by the candidate signature when finding that the replacement of the erroneous signature by the candidate signature fails to solve the error associated with the erroneous signature or introduces the other error.

According to an embodiment, the erroneous signature was generated by another part of the adaptable AI system; wherein the replacing of the erroneous signature by the candidate signature is followed by generating a routing rule for routing a sensed information unit (SIU) to the error resolving part of the adaptive AI system, when the other part of the adaptable AI system generates the erroneous signature following a reception of the SIU.

According to an embodiment, the method includes wherein the evaluating includes performing an object detection process using the candidate signature and analyzing an outcome of the object detection process.

According to an embodiment, the analyzing includes comparing (a) a false positive ratio and a false negative ratio obtained when using the candidate signature to (b) a false positive ratio and a false negative ratio obtained when using the erroneous signature.

According to an embodiment, the method includes not replacing the erroneous signature by the candidate signature when finding that using the candidate signature introduces an error in a previously accurate detection of an object.

According to an embodiment, there is provided a non-transitory computer readable medium storing instructions that, when executed by at least one processor, cause the at least one processor to perform operations for homologation, includes: (a) receiving, by a controller, a candidate signature, the candidate signature was generated, following a detection of an error associated with an erroneous signature, by an error resolving part of an adaptable artificial intelligence (AI) system; (b) evaluating, by the controller, whether a replacement of the erroneous signature by the candidate signature solves the error associated with the erroneous signature without introducing another error; and (c) replacing the erroneous signature by the candidate signature when finding that the replacement of the erroneous signature by the candidate signature solves the error associated with the erroneous signature without introducing the other error.

According to an embodiment, there is provided a method that is computer implemented and is for improving an accuracy of object detection, the method includes: (a) identifying, by a controller, an erroneous signature of at least a part of a sensed information unit (SIU) for use in the object detection, wherein a source of an error of the erroneous signature is a sensing unit that generated the SIU under a current acquisition condition, wherein the at least part of the SIU captured an object; and (b) triggering an acquisition of a new SIU, under a desired acquisition condition that is tailored to solve the error.

According to an embodiment, the identifying includes accessing an erroneous signatures data structure that stores information about erroneous signatures and accuracy solving measures associated with the erroneous signatures.

The method according claim wherein one or more accuracy solving measures of the accuracy solving measures involves acquiring, by the sensing unit, the new SIU under the desired acquisition condition.

The method according claim wherein one or more accuracy solving measures of the accuracy solving measures differs from acquiring, by the sensing unit, the new SIU under the desired acquisition condition.

The method according claim wherein one or more accuracy solving measures of the accuracy solving measures involve selecting a part of an adaptable artificial intelligence (AI) system that is dedicated to solving an accuracy of a certain erroneous signature.

According to an embodiment, the current acquisition condition is at least one of a focus of the sensor, a depth of field of the sensor, an exposure period of the sensor.

According to an embodiment, the method further includes receiving, by the controller, a signature of the new SIU; and determining, by the controller, whether the signature of the new SIU is erroneous.

According to an embodiment, the method further includes: identifying, by the controller, that the signature of the new SIU is erroneous; finding, by the controller, that the source of an error in the new SIU is the sensing unit; and triggering an acquisition of a further SIU, under a further desired acquisition condition that is tailored to solve the error.

According to an embodiment, there is provided a non-transitory computer readable medium storing instructions that, when executed by at least one processor, cause the at least one processor to perform operations for improving an accuracy of object detection, includes: (a) identifying, by a controller, an erroneous signature of at least a part of a sensed information unit (SIU) for use in the object detection, wherein a source of an error of the erroneous signature is a sensing unit that generated the SIU under a current acquisition condition, wherein the at least part of the SIU captured an object; and (b) triggering an acquisition of a new SIU, under a desired acquisition condition that is tailored to solve the error.

According to an embodiment, there is provided a method that is computer implemented and is for solving an error related to an object captured in a sensed information unit (SIU), the method includes (a) obtaining a cluster signature that is identified as introducing an error in relation to an object associated with a cluster, the cluster is represented by the cluster signature, the cluster signature is for used for at least partially automatically driving a vehicle; (b) obtaining a compressed version of the cluster signature; and (c) determining whether the compressed version of the cluster signature resolves the error. When determined that the compressed version of the cluster signature resolves the error, automatically replacing the signature by the compressed version of the cluster signature. When determined that the compressed version of the cluster signature does not resolve the accuracy, then triggering a generation of an error resolving process that differs from the compressing of the cluster signature.

According to an embodiment, the method includes wherein the cluster signature is calculated based on object signatures of the cluster, wherein the object signatures are generated by a signature generator that was fed with readout information provided by a readout circuit, the readout information was extracted from a deep neural network (DNN).

According to an embodiment, the method further includes identifying the cluster signature as introducing the error.

According to an embodiment, the cluster signature includes cluster signature elements, wherein the compressing includes reducing a number of cluster signature elements.

According to an embodiment, the cluster signature elements are indexes for retrieving values that are intermediate results of a signature generation process.

According to an embodiment, the method includes wherein the cluster signature includes cluster signature elements, wherein the compressing includes reducing a number of non-zero cluster signature elements According to an embodiment, the method further includes applying the error resolving process that differs from the compressing of the cluster signature.

According to an embodiment, the cluster signature was generated by an object detection process, wherein the triggering of the error resolving process includes triggering a generation of another object detection process for managing a detection of the object.

According to an embodiment, the triggering of the error resolving process includes triggering an addition of an error resolving portion of an adaptable artificial intelligence (AI) system.

According to an embodiment, there is provided a non-transitory computer readable medium storing instructions that, when executed by at least one processor, cause the at least one processor to perform operations for solving an error related to an object captured in a sensed information unit (SIU), includes (a) obtaining a cluster signature that is identified as introducing an error in relation to an object associated with a cluster, the cluster is represented by the cluster signature, the cluster signature is for used for at least partially automatically driving a vehicle; (b) obtaining a compressed version of the cluster signature; ad (c) determining whether the compressed version of the cluster signature resolves the error. When determined that the compressed version of the cluster signature resolves the error, automatically replacing the signature by the compressed version of the cluster signature. When determined that the compressed version of the cluster signature does not resolve the accuracy, then triggering a generation of an error resolving process that differs from the compressing of the cluster signature.

According to an embodiment, there is provided a method that is computer implemented and is for solving inaccuracies associated with object detection, the method includes (a) automatically evaluating, by a controller, an accuracy of signatures for use in the object detection, the signatures were generated by an adaptable artificial intelligence (AI) system; and (b) when finding an erroneous signature of the signatures, by the controller, triggering a generation of a router that routes a sensed information unit (SIU) that is associated with the erroneous signature to a current error resolving part of the adaptable AI system, the current error resolving part of the adaptable AI system is currently associated with resolving at least one other error associated with at least one other erroneous signature.

According to an embodiment, the method further includes selecting the current error resolving part of the adaptable AI system out of a first plurality of current error resolving parts of the adaptable AI system.

According to an embodiment, the first plurality of current error resolving parts of the adaptable AI system are associated with a second plurality of signatures.

According to an embodiment, the selection is based on similarities between the erroneous signature and the second plurality of signatures.

According to an embodiment, the erroneous signature is associated with a certain context, wherein the second plurality of signatures are associated with contexts, wherein the selecting is based on similarities between the certain context and the contexts.

According to an embodiment, the erroneous signature is associated with a certain object, wherein the second plurality of signatures are associated with multiple objects, wherein the selecting is based on similarities between the certain object and the multiple objects.

According to an embodiment, the second plurality of signatures are erroneous signatures allocated to the first plurality of current error resolving parts.

According to an embodiment, when finding the erroneous signature, selecting between (i) triggering a generation of a new error resolving part of the adaptable AI, and (ii) triggering a usage of the current error resolving part of the adaptable AI.

According to an embodiment, the selection is responsive to a cost function.

According to an embodiment, the current error resolving part of the adaptable AI includes a narrow AI agent.

According to an embodiment, there is provided a non-transitory computer readable medium storing instructions that, when executed by at least one processor, cause the at least one processor to perform operations for solving inaccuracies associated with object detection, includes (a) automatically evaluating, by a controller, an accuracy of signatures for use in the object detection, the signatures were generated by an adaptable artificial intelligence (AI) system; and (b) when finding an erroneous signature of the signatures, by the controller, triggering a generation of a router that routes a sensed information unit (SIU) that is associated with the erroneous signature to a current error resolving part of the adaptable AI system, the current error resolving part of the adaptable AI system is currently associated with resolving at least one other error associated with at least one other erroneous signature.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the perception unit, narrow AI agents, driving decision unit may be implemented in hardware and/or code, instructions and/or commands stored in a non-transitory computer readable medium, may be included in a vehicle, outside a vehicle, in a mobile device, in a server, and the like.

The vehicle may be any type of vehicle such as a ground transportation vehicle, an airborne vehicle, or a water vessel.

The specification and/or drawings may refer to sensed information unit (SIU). The SIU may be an image, a media unit and the like. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor. An SIU may be any arrangement of sensed information—may be of any size and/or format—for example an image, one or more image, an audio packet, a chunk of sensed information, and the like.

Any reference to a SIU should be applied, mutatis mutandis to a processed SIU. A processed SIU may be generated by processing an SIU, processing a previously processed SIU, and the like. The processing may include any operation—such as—filtering, noise reduction, SIU manipulation, padding, and the like.

Any reference to a cluster should be applied mutatis mutandis to a cluster structure. A concept structure may include one or more clusters. Each cluster may include signatures and related metadata.

Any reference to obtaining a content may include receiving the content, generating the content, participating in a processing of the content, processing only a part of the content and/or receiving only another part of the content. Examples of content include one or more signatures, an SIU and the like.

The obtaining of the content include object detection or may be executed without performing object detection.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

A situation may be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

An erroneous signature is a signatures that once used may introduce an error related to object detection. According to an embodiment, the erroneous signature is an ambiguous signature that when used for the object detection, results in inconsistent detection of objects. According to an embodiment, the erroneous signature when used for the object detection, results in at least one of (i) a false negative detection or (ii) a false positive detection. Any reference to an ambiguous signature should be applied mutatis mutandis to any other erroneous signature. Any reference to a false positive signature should be applied mutatis mutandis to any other erroneous signature. Any reference to a false negative signature should be applied mutatis mutandis to any other erroneous signature.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms “front,” “back,” “top,” “bottom,” “over,” “under” and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms “assert” or “set” and “negate” (or “deassert” or “clear”) are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the systems depicted herein are merely exemplary, and that in fact many other system s may be implemented which achieve the same functionality.

Any arrangement of components to achieve the same functionality is effectively “associated” such that the desired functionality is achieved. Hence, any two components herein combined to achieve a particular functionality may be seen as “associated with” each other such that the desired functionality is achieved, irrespective of system s or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by people skilled in the art that the embodiments of the disclosure are not limited by what has been particularly shown and described hereinabove. Rather the scope of the embodiments of the disclosure is defined by the appended claims and equivalents thereof.

We claim:

1. A method that is computer implemented and is for signature generation, the method comprising:

receiving readout information, by a signature generator, the readout information is provided by a readout circuit and was extracted from a layer of a deep neural network (DNN) following a provision of a processed sensed information unit (SIU) to the DNN; wherein the layer comprises a group of cells that (i) have an actual receptive field that exceeds a bounding shape and (ii) output features related to (a) SIU elements surrounded by the bounding shape and (b) SIU elements located outside the bounding shape; the bounding shape provides information about dimensions of an object captured by the SIU, wherein the processed SIU consists essentially of (i) the SIU elements that are surrounded by the bounding, and (ii) padding SIU elements; wherein the padding SIU elements replace the SIU elements located outside the bounding shape;

generating, by the signature generator and based on the readout information, a signature of the object for use in an at least partially autonomous driving of a vehicle.

2. The method according to claim 1, comprising generating the processed SIU, wherein the generating comprises receiving from a bounding shape generation process the SIU and the bounding shape.

3. The method according to claim 1 further comprising searching for one or more matching clusters, whereas finding one or more matching clusters provides information about the object.

4. The method according to claim 1, wherein the generating of the signature comprises identifying one or more feature vectors outputted by the group of cells.

5. The method according to claim 1, comprising executing the at least partially autonomous driving operation based on the signature.

6. The method according to claim 1, wherein the bounding shape is located at a location within the SIU, wherein the generating of the processed SIU comprises positioning the bounding shape at an other location within the processed SIU.

7. The method according to claim 6, comprising calculating the other position based on a center of the bounding shape within the SIU, a rows stride, a columns stride, a height of the feature map, and a width of the feature map.

8. The method according to claim 1, wherein the SIU is an image and a value of the padding SIU elements is determined based on values of pixels of training images that were used to train the DNN.

9. The method according to claim 1, wherein the SIU is an image, and a value of the padding SIU elements equals a mean pixel value of training images that were used to train the DNN.

10. The method according to claim 1, wherein the signature generation is executed during a search for one or more objects of one or more types; wherein the padding SIU elements represent content that differs from any object of the one or more types.

11. A non-transitory computer readable medium storing instructions that, when executed by at least one processor, cause the at least one processor to perform operations for signature generation, comprising:

receiving readout information, by a signature generator, the readout information is provided by a readout circuit and was extracted from a layer of a deep neural network (DNN) following a provision of a processed sensed information unit (SIU) to the DNN; wherein the layer comprises a group of cells that (i) have an actual receptive field that exceeds a bounding shape and (ii) output features related to (a) SIU elements surrounded by the bounding shape and (b) SIU elements located outside the bounding shape; the bounding shape provides information about dimensions of an object captured by the SIU, wherein the processed SIU consists essentially of (i) the SIU elements that are surrounded by the bounding, and (ii) padding SIU elements; wherein the padding SIU elements replace the SIU elements located outside the bounding shape;

generating, by the signature generator and based on the readout information, a signature of the object for use in at least partially autonomous driving operation of a vehicle.

12. The non-transitory computer readable medium according to claim 11, that further stores instructions for generating the processed SIU, wherein the generating comprises receiving from a bounding shape generation process the SIU and the bounding shape.

13. The non-transitory computer readable medium according to claim 11, that further stores instructions for searching for one or more matching clusters, whereas finding one or more matching clusters provides information about the object.

14. The non-transitory computer readable medium according to claim 11, wherein the generating of the signature comprises identifying one or more feature vectors outputted by the group of cells.

15. The non-transitory computer readable medium according to claim 11, that further stores instructions for executing the at least partially autonomous driving operation based on the signature.

16. The non-transitory computer readable medium according to claim 11, wherein the bounding shape is located at a location within the SIU, wherein the generating of the processed SIU comprises positioning the bounding shape at an other location within the processed SIU.

17. The non-transitory computer readable medium according to claim 16, storing information for calculating the other position based on a center of the bounding shape within the SIU, a rows stride, a columns stride, a height of the feature map, and a width of the feature map.

18. The non-transitory computer readable medium according to claim 11, wherein the SIU is an image and a value of the padding SIU elements is determined based on values of pixels of training images that were used to train the DNN.

19. The non-transitory computer readable medium according to claim 11, wherein the SIU is an image, and a value of the padding SIU elements equals a mean pixel value of training images that were used to train the DNN.

20. The non-transitory computer readable medium according to claim 11, wherein the padding SIU elements replace original SIU elements that are located outside the desired receptive field but within an actual receptive field of the DNN, thereby preventing content outside the bounding shape from contributing to the signature.

* * * * *